(12) United States Patent
Rahman et al.

(10) Patent No.: US 10,749,584 B2
(45) Date of Patent: Aug. 18, 2020

(54) UPLINK MIMO CODEBOOK FOR ADVANCED WIRELESS COMMUNICATION SYSTEMS

(71) Applicant: Samsung Electronics Co., Ltd., Suwon-si (KR)

(72) Inventors: Md Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 76 days.

(21) Appl. No.: 15/844,292

(22) Filed: Dec. 15, 2017

(65) Prior Publication Data

US 2018/0183503 A1  Jun. 28, 2018

Related U.S. Application Data

(60) Provisional application No. 62/593,478, filed on Dec. 1, 2017, provisional application No. 62/591,364, filed
(Continued)

(51) Int. Cl.
 *H04B 7/04* (2017.01)
 *H04B 7/0456* (2017.01)
(Continued)

(52) U.S. Cl.
 CPC ........ *H04B 7/0486* (2013.01); *H04W 72/042* (2013.01); *H04B 7/063* (2013.01);
(Continued)

(58) Field of Classification Search
 CPC .... H04B 7/0486; H04B 7/0628; H04B 7/024; H04B 7/0639; H04B 7/0413;
(Continued)

(56) References Cited

U.S. PATENT DOCUMENTS

| | | | |
|---|---|---|---|
| 2011/0170427 A1* | 7/2011 | Koivisto | H04B 7/022 370/252 |
| 2011/0243079 A1 | 10/2011 | Chen et al. | |

(Continued)

FOREIGN PATENT DOCUMENTS

| | | |
|---|---|---|
| WO | 2010/095884 A2 | 8/2010 |
| WO | 2016109926 A1 | 7/2016 |

OTHER PUBLICATIONS

3GPP, "3GPP TS 38.331 V1.0.1 3rd Generation Partnership Project; Technical Specification Group Radio Access Network; Evolved Universal Terrestrial Radio Access (E-UTRA); Multiplexing and channel coding", Sep. 2016, 3GPP, Release 14, pp. 124-126 (Total Pages: 3) (Year: 2016).*

(Continued)

*Primary Examiner* — Un C Cho
*Assistant Examiner* — Shah M Rahman

(57) ABSTRACT

Methods and apparatuses for a codebook for uplink MIMO in advanced wireless communication systems. A user equipment (UE) includes a processor and a transceiver operably connected to the processor. The transceiver is configured to transmit, to a base station (BS), a message reporting a coherence capability of the UE for an indication of a transmit precoding matrix indicator (TPMI) and a number of layers. The transceiver is configured to receive, from the BS, the indication of the TPMI and the number of layers via downlink control information (DCI) signaling. The transceiver is configured to transmit, to the BS, uplink (UL) data via a physical uplink shared channel (PUSCH) based on the received indication of the TPMI and the number of layers. A number of bits in the DCI signaling for the indication of the TPMI and the number of layers is determined by a coherence state that depends on the coherence capability reported by the UE.

19 Claims, 9 Drawing Sheets

Related U.S. Application Data on Nov. 28, 2017, provisional application No. 62/590,907, filed on Nov. 27, 2017, provisional application No. 62/581,600, filed on Nov. 3, 2017, provisional application No. 62/579,562, filed on Oct. 31, 2017, provisional application No. 62/576,868, filed on Oct. 25, 2017, provisional application No. 62/575,026, filed on Oct. 20, 2017, provisional application No. 62/569,914, filed on Oct. 9, 2017, provisional application No. 62/569,069, filed on Oct. 6, 2017, provisional application No. 62/563,717, filed on Sep. 27, 2017, provisional application No. 62/520,707, filed on Jun. 16, 2017, provisional application No. 62/455,263, filed on Feb. 6, 2017, provisional application No. 62/437,836, filed on Dec. 22, 2016.

(51) Int. Cl.
*H04W 72/04* (2009.01)
*H04B 7/06* (2006.01)

(52) U.S. Cl.
CPC .......... *H04B 7/0617* (2013.01); *H04B 7/0628* (2013.01); *H04B 7/0639* (2013.01)

(58) Field of Classification Search
CPC ... H04B 7/0617; H04B 7/063; H04W 72/042; H04W 72/046; H04W 72/0413
See application file for complete search history.

(56) References Cited

U.S. PATENT DOCUMENTS

| | | | |
|---|---|---|---|
| 2012/0082102 A1* | 4/2012 | Kang | H04B 7/0639 370/329 |
| 2012/0127948 A1* | 5/2012 | Chung | H04L 5/0053 370/329 |
| 2012/0328031 A1 | 12/2012 | Pajukoski et al. | |
| 2013/0194943 A1* | 8/2013 | Davydov | H04W 4/70 370/252 |
| 2013/0286956 A1* | 10/2013 | Lee | H04W 72/10 370/329 |
| 2015/0009845 A1* | 1/2015 | Takano | H04W 52/0206 370/252 |
| 2015/0055576 A1 | 2/2015 | Zhang et al. | |
| 2015/0215017 A1* | 7/2015 | Yum | H04B 7/0473 370/328 |
| 2016/0020929 A1 | 1/2016 | Yamazaki et al. | |
| 2016/0021565 A1* | 1/2016 | Kim | H04L 5/005 370/329 |
| 2016/0269158 A1* | 9/2016 | Soriaga | H04L 5/0048 |
| 2017/0026953 A1* | 1/2017 | Wang | H04L 1/0026 |
| 2017/0331670 A1* | 11/2017 | Parkvall | H04W 52/0274 |
| 2017/0338874 A1* | 11/2017 | Pratt | H04B 7/0862 |
| 2018/0006863 A1 | 1/2018 | Li et al. | |
| 2018/0026769 A1* | 1/2018 | Lee | H04L 1/00 370/329 |
| 2019/0081667 A1* | 3/2019 | Yang | H04B 7/0456 |
| 2019/0081671 A1* | 3/2019 | Yang | H04B 7/0482 |
| 2019/0200359 A1* | 6/2019 | Choi | H04L 5/00 |
| 2019/0222277 A1* | 7/2019 | Park | H04B 7/0486 |

OTHER PUBLICATIONS

3GPP, "3GPP TS 36.212 V14.0.0 3rd Generation Partnership Project Technical Specification Group Radio Access Network NR Radio Resource Control (RRC) Protocol specification", Dec. 2017, 3GPP, Draft Release 15, Total Pages: 210 (Year: 2017).*

Park et al. "Hierarchical UL precoding for new RAT systems", Nov. 2016, U.S. Appl. No. 62/416,682, pp. 2-19 (Total Pages: 18) (Year: 2016).*

Yang et al., "5G uplink codebook design", Sep. 12, 2017, MediaTek Inc., U.S. Appl. No. 62/557,194, Total Pages: 38 (Year: 2017).*

"3rd Generation Partnership Project; Technical Specification Group Radio Access Network; Evolved Universal Terrestrial Radio Access (E-UTRA); Physical channels and modulation (Release 14)", 3GPP TS 36.211 V14.4.0, Sep. 2017, 197 pages.

"3rd Generation Partnership Project; Technical Specification Group Radio Access Network; Evolved Universal Terrestrial Radio Access (E-UTRA); Multiplexing and channel coding (Release 14)", 3GPP TS 36.212 V14.4.0, Sep. 2017, 198 pages.

"3rd Generation Partnership Project; Technical Specification Group Radio Access Network; Evolved Universal Terrestrial Radio Access (E-UTRA); Physical layer procedures (Release 14)", 3GPP TS 36.213 V14.4.0, Sep. 2017, 462 pages.

"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.4.0, Sep. 2017, 108 pages.

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, 753 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"Final Report of 3GPP TSG RAN WG1 #89 v1.0.0 (Hangzhou, China, May 15-19, 2017)", 3GPP TSG RAN WG1 Meeting #90, R1-1712031,Aug. 2017, 164 pages.

"3rd Generation Partnership Project; Technical Specification Group Radio Access Network; NR; Physical layer procedures for data (Release 15)", 3GPP TS 38.214 V1.1.0, Oct. 2017, 36 pages.

ISR/KR, "International Search Report," International Application No. PCT/KR2017/015352, dated Mar. 23, 2018, 3 pages.

Supplementary European Search Report dated Oct. 15, 2019 in connection with European Patent Application No. 17 88 4044, 9 pages.

* cited by examiner

UPLINK MIMO CODEBOOK FOR ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/437,836, filed on Dec. 22, 2016; U.S. Provisional Patent Application Ser. No. 62/455,263, filed on Feb. 6, 2017; U.S. Provisional Patent Application Ser. No. 62/520,707, filed on Jun. 16, 2017; U.S. Provisional Patent Application Ser. No. 62/563,717, filed on Sep. 27, 2017; U.S. Provisional Patent Application Ser. No. 62/569,069, filed on Oct. 6, 2017; U.S. Provisional Patent Application Ser. No. 62/569,914, filed on Oct. 9, 2017; U.S. Provisional Patent Application Ser. No. 62/575,026, filed on Oct. 20, 2017; U.S. Provisional Patent Application Ser. No. 62/576,868, filed on Oct. 25, 2017; U.S. Provisional Patent Application Ser. No. 62/579,562, filed on Oct. 31, 2017; U.S. Provisional Patent Application Ser. No. 62/581,600, filed on Nov. 3, 2017; U.S. Provisional Patent Application Ser. No. 62/590,907, filed on Nov. 27, 2017; U.S. Provisional Patent Application Ser. No. 62/591,364, filed on Nov. 28, 2017; and U.S. Provisional Patent Application Ser. No. 62/593,478, filed on Dec. 1, 2017. The content of the above-identified patent documents is incorporated herein by reference.

TECHNICAL FIELD

The present application relates generally to wireless communication systems. More specifically, this disclosure relates to a codebook for uplink (UL) multiple-input multiple-output (MIMO) communication in advanced wireless communication systems.

BACKGROUND

5th generation (5G) mobile communications, initial commercialization of which is expected around 2020, is recently gathering increased the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide an UL MIMO codebook for advanced wireless communication systems.

In one embodiment, a user equipment (UE) is provided. The UE includes a processor and a transceiver operably connected to the processor. The transceiver is configured to transmit, to a base station (BS), a message reporting a coherence capability of the UE for an indication of a transmit precoding matrix indicator (TPMI) and a number of layers. The transceiver is configured to receive, from the BS, the indication of the TPMI and the number of layers via downlink control information (DCI) signaling. The transceiver is configured to transmit, to the BS, UL data via a physical uplink shared channel (PUSCH) based on the received indication of the TPMI and the number of layers. A number of bits in the DCI signaling for the indication of the TPMI and the number of layers is determined by a coherence state that depends on the coherence capability reported by the UE.

In another embodiment, a BS is provided. The BS includes a processor and a transceiver operably connected to the processor. The transceiver is configured to receive, from a UE, a message reporting a coherence capability of the UE for an indication of a TPMI and a number of layers. The transceiver is configured to transmit, to the UE, the indication of the TPMI and the number of layers via DCI signaling. The transceiver is configured to receive, from the UE, UL data via a PUSCH based on the transmitted indication of the TPMI and the number of layers. A number of bits in the DCI signaling for the indication of the TPMI and the number of layers is determined by a coherence state that depends on the coherence capability reported by the UE.

In another embodiment, a method for operating a UE is provided. The method includes transmitting, to a BS, a message reporting a coherence capability of the UE for an indication of a transmit precoding matrix indicator (TPMI) and a number of layers. The method includes receiving, from the BS, the indication of the TPMI and the number of layers via DCI signaling. The method includes transmitting, to the BS, UL data via a PUSCH based on the received indication of the TPMI and the number of layers. A number of bits in the DCI signaling for the indication of the TPMI and the number of layers is determined by a coherence state that depends on the coherence capability reported by the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v14.4.0, "E-UTRA, Physical channels and modulation (REF 1);" 3GPP TS 36.212 v14.4.0, "E-UTRA, Multiplexing and Channel coding; (REF 2);" 3GPP TS 36.213 v14.4.0, "E-UTRA, Physical Layer Procedures (REF 3);" 3GPP TS 36.321 v14.4.0, "E-UTRA, Medium Access Control (MAC) protocol specification (REF 4);" 3GPP TS 36.331 v14.4.0, "Radio Resource Control (RRC) Protocol Specification (REF 5);" and 3GPP TR 22.891 v1.2.0, "Technical Specification Group Services and System Aspects; Feasibility Study on New Services and Markets Technology; Enablers; Stage 1; (Release 14);" 3GPP RAN 1 meeting #89, "Chairman's notes;" and 3GPP TS 38.214 v1.1.0, "NR, Physical layer Procedures for data." To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
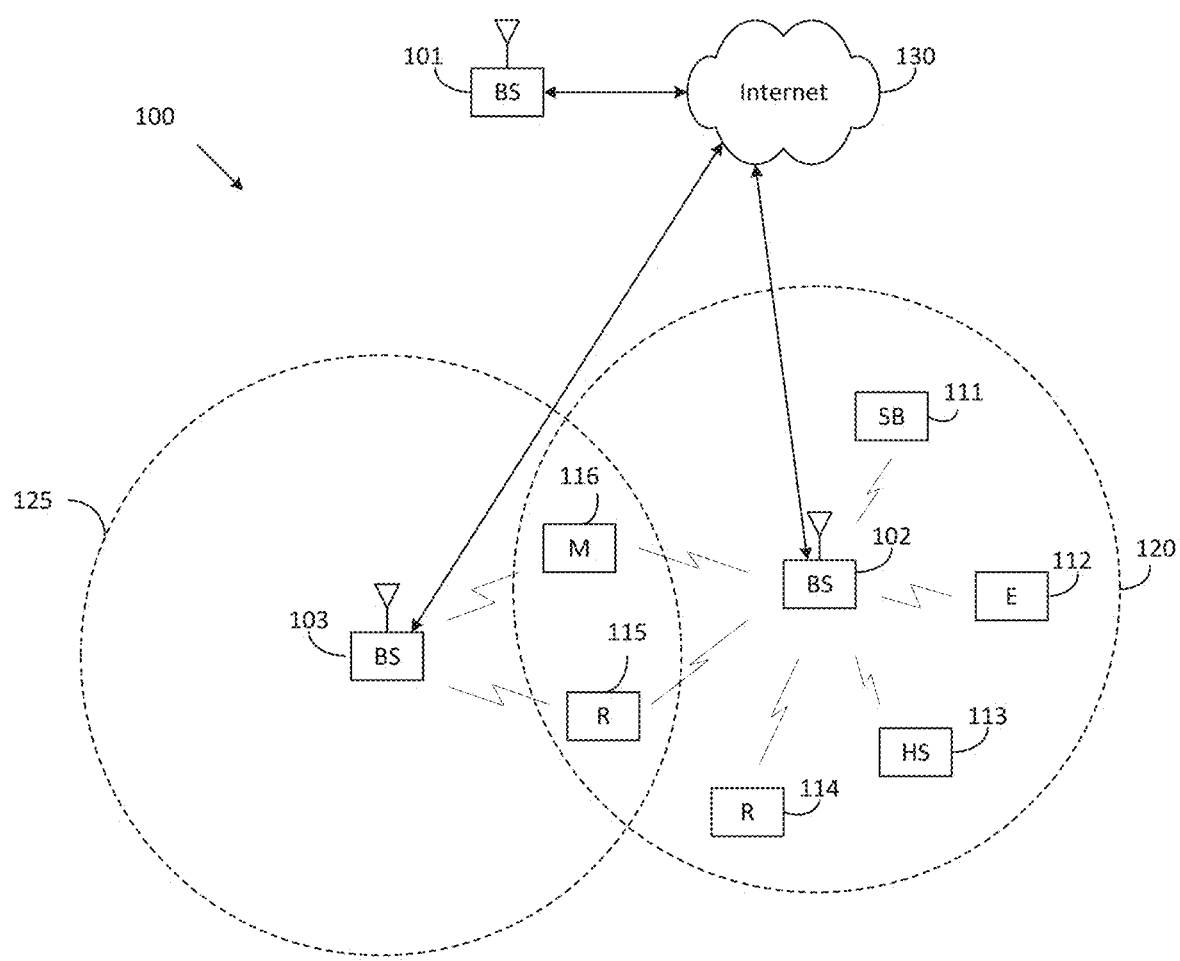
FIG. 1 illustrates an example wireless network according to embodiments of the present disclosure.
Figure 2:
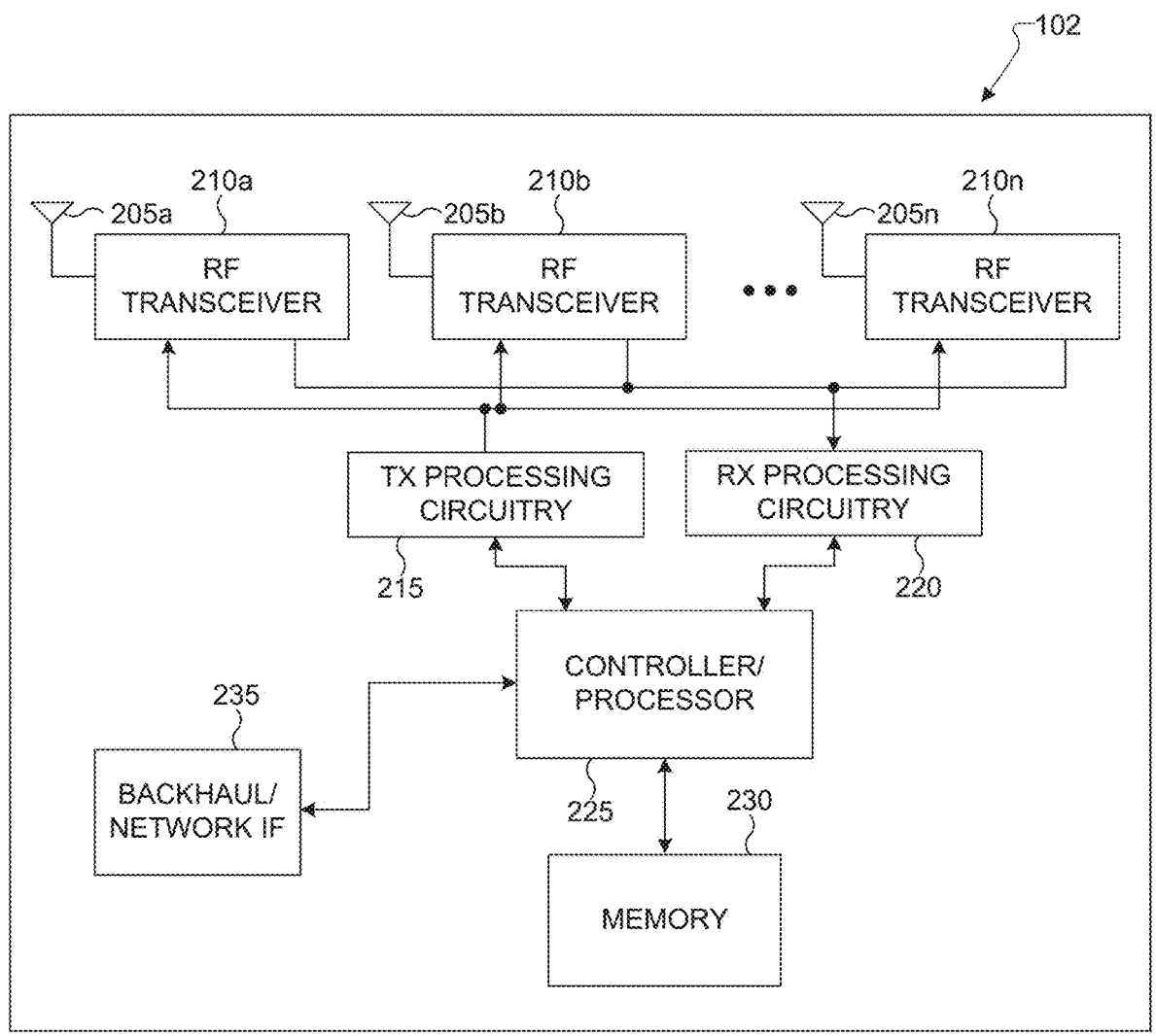
FIG. 2 illustrates an example eNB according to embodiments of the present disclosure.
Figure 3:
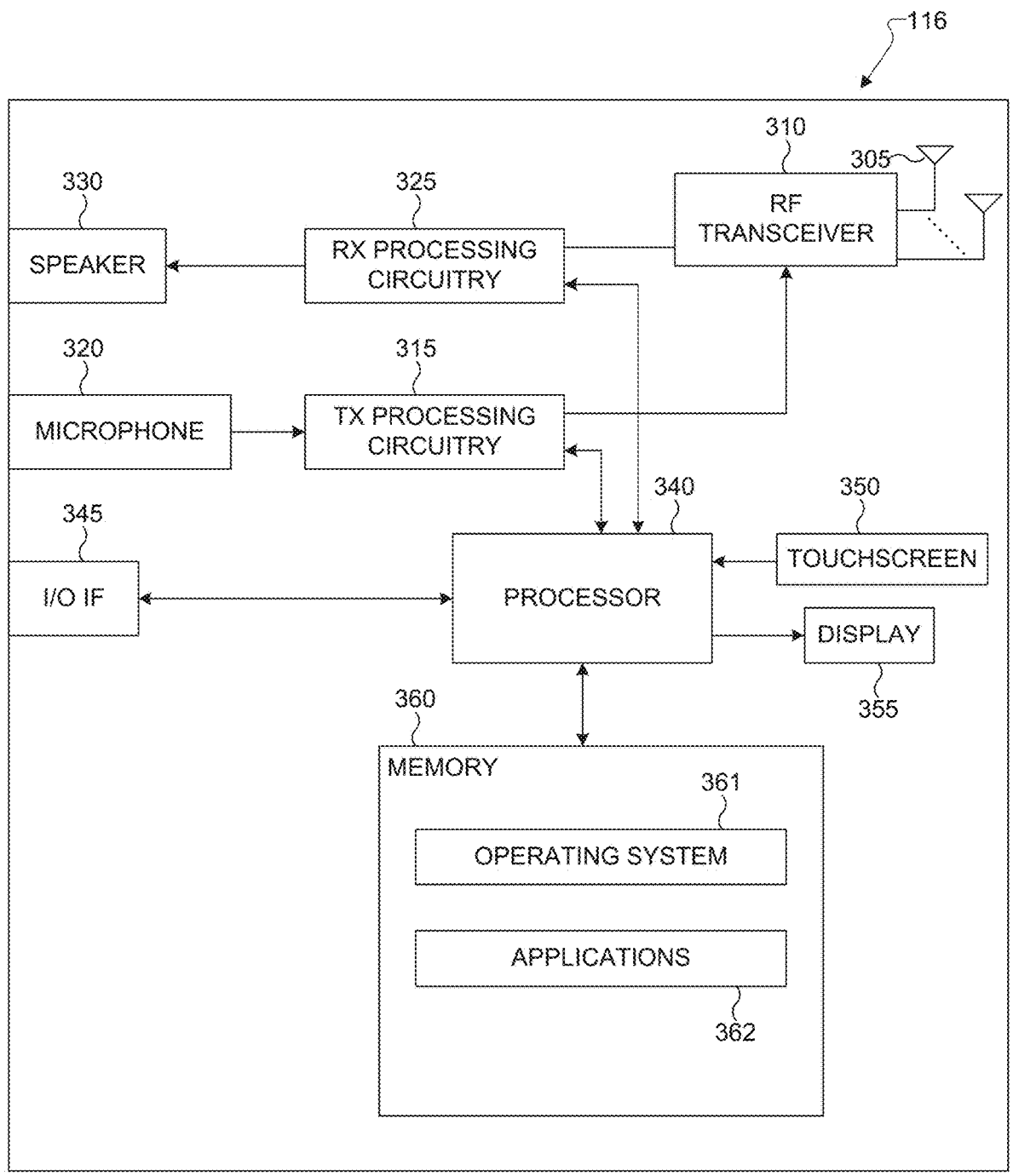
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a subband (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for uplink MIMO codebook in an advanced wireless communication system. In certain embodiments, and one or more of the eNBs 101-103 includes circuitry, programming, or a combination thereof, for uplink MIMO codebook in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
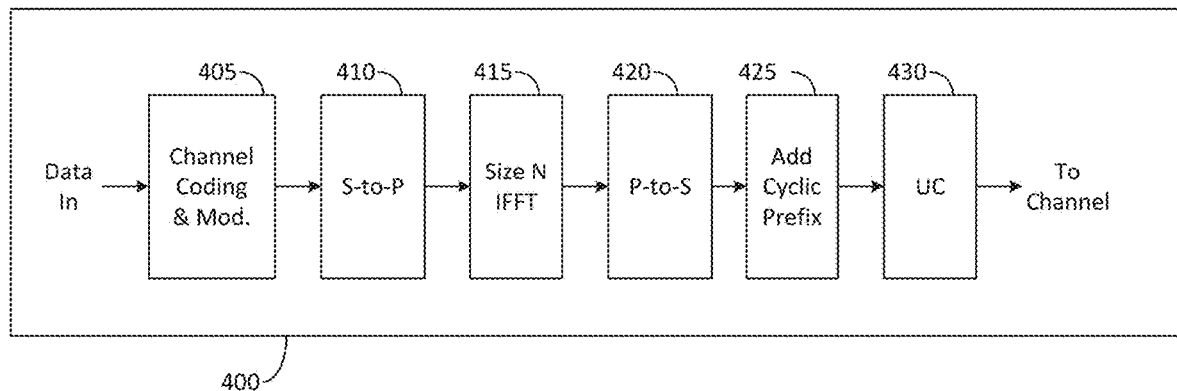
FIG. 4A illustrates an example high-level diagram of an orthogonal frequency division multiple access transmit path according to embodiments of the present disclosure.
Figure 4B:
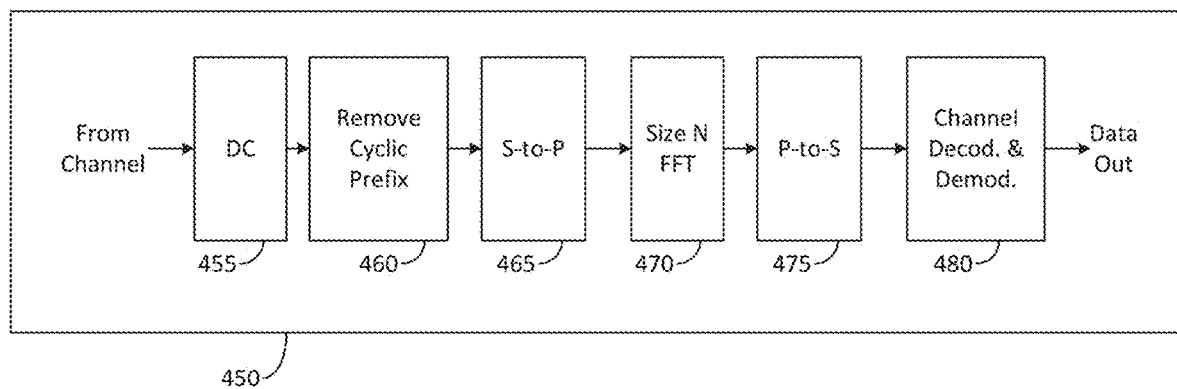
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the fast Fourier transform and the inverse fast Fourier transform, this is by way of illustration only and may not be construed to limit the scope of the disclosure. It will be appreciated that in an alternate embodiment of the disclosure, the fast Fourier transform functions and the Inverse Fast Fourier Transform functions may easily be replaced by discrete Fourier transform (DFT) functions and inverse discrete Fourier transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
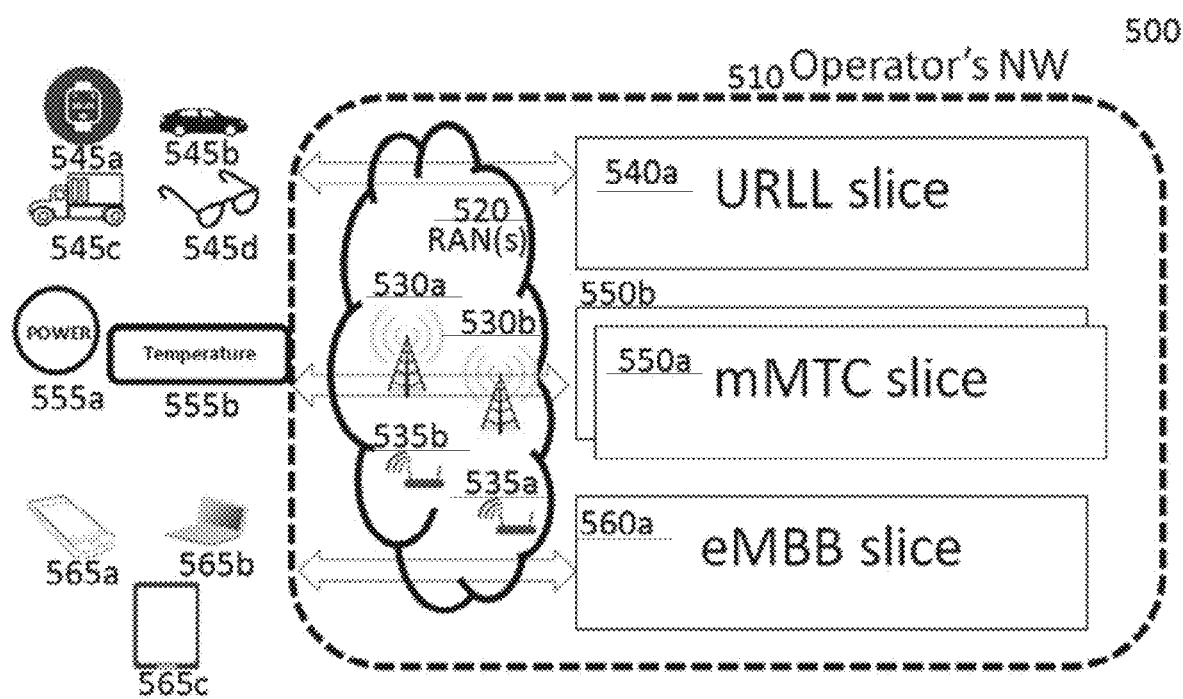
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530*a*, 530*b*, a plurality of small cell base stations 535*a*, 535*b*, a URLL slice 540*a*, a smart watch 545*a*, a car 545*b*, a, truck 545*c*, a smart glasses 545*d*, a power 555*a*, a temperature 555*b*, an mMTC slice 550*a*, an eMBB slice 560*a*, a smart phone (e.g., cell phones) 565*a*, a laptop 565*b*, and a tablet 565*c* (e.g., tablet PCs).

The operator's network 510 includes a number of radio access network(s) 520—RAN(s)—that are associated with network devices, e.g., eNBs 530*a* and 530*b*, small cell base stations (femto/pico eNBs or Wi-Fi access points) 535*a* and 535*b*, etc. The operator's network 510 can support various services relying on the slice concept. In one example, four slices, 540*a*, 550*a*, 550*b* and 560*a*, are supported by the network. The URLL slice 540*a* to serve UEs requiring URLL services, e.g., cars 545*b*, trucks 545*c*, smart watches 545*a*, smart glasses 545*d*, etc. Two mMTC slices 550*a* and 550*b* serve UEs requiring mMTC services such as power meters and temperature control (e.g., 555*b*), and one eMBB slice 560*a* requiring eMBB serves such as cells phones 565*a*, laptops 565*b*, tablets 565*c*.

In short, network slicing is a method to cope with various different qualities of services (QoS) in the network level. For supporting these various QoS efficiently, slice-specific PHY optimization may also be necessary. Devices 545*a/b/c/d*, 555*a/b* are 565*a/b/c* examples of user equipment (UE) of different types. The different types of user equipment (UE) shown in FIG. 5 are not necessarily associated with particular types of slices. For example, the cell phone 565*a*, the laptop 565*b* and the tablet 565*c* are associated with the eMBB slice 560*a*, but this is just for illustration and these devices can be associated with any types of slices.

In some embodiments, one device is configured with more than one slice. In one embodiment, the UE, (e.g., 565*a/b/c*) is associated with two slices, the URLL slice 540*a* and the eMBB slice 560*a*. This can be useful for supporting online gaming application, in which graphical information are transmitted through the eMBB slice 560*a*, and user interaction related information are exchanged through the URLL slice 540*a*.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
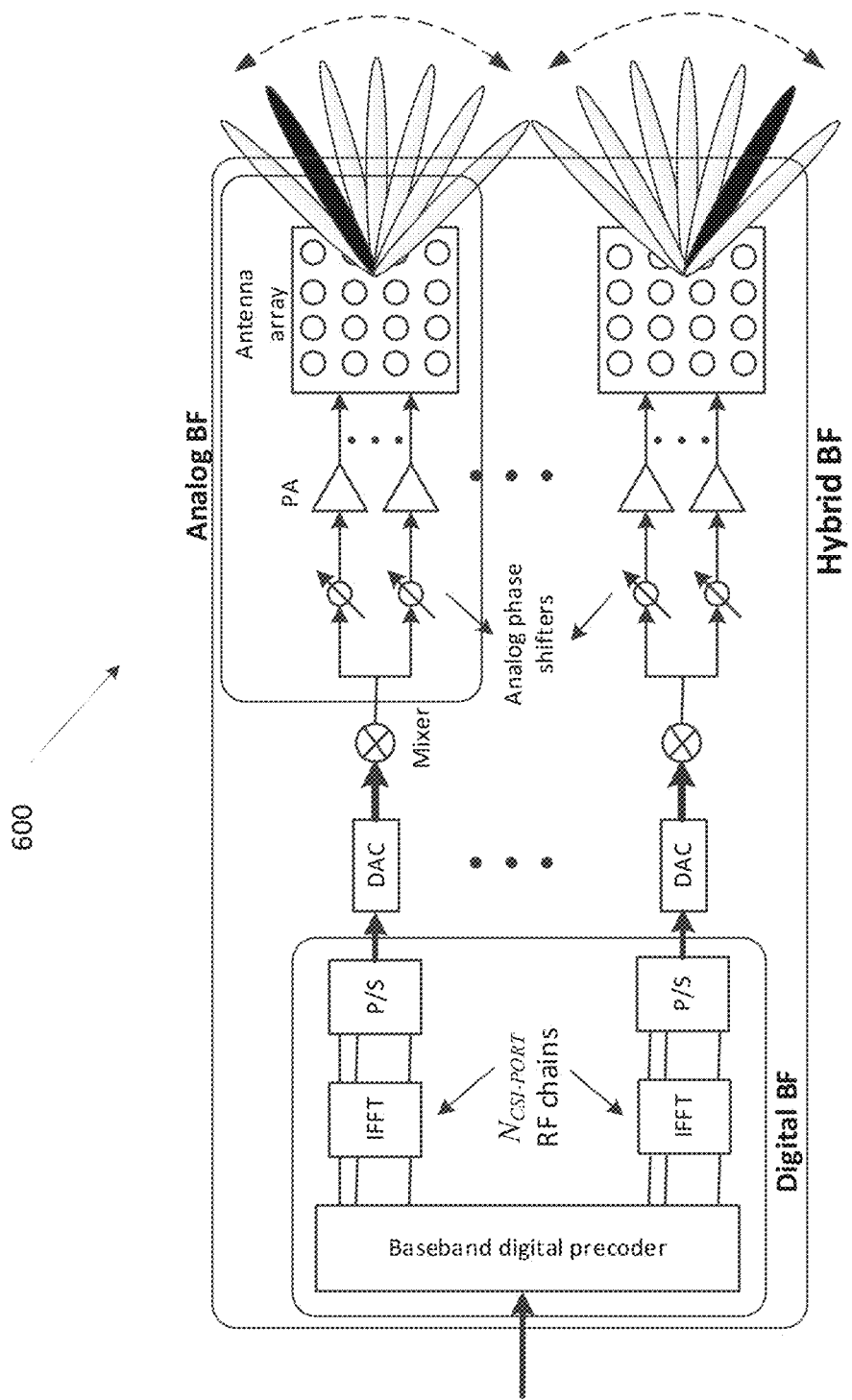
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports N CSI-PORT. A digital beamforming unit 610 performs a linear combination across N CSI-PORT analog beams to further increase precoding gain. While analog beams are wideband (hence not frequency-selective), digital precoding can be varied across frequency sub-bands or resource blocks.

To enable digital precoding, an efficient design of CSI-RS is a crucial factor. For this reason, three types of CSI reporting mechanism corresponding to three types of CSI-RS measurement behavior are supported in LTE specification) "CLASS A" CSI reporting which corresponds to non-precoded CSI-RS, 2) "CLASS B" reporting with K=1 CSI-RS resource which corresponds to UE-specific beamformed CSI-RS, 3) "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Here, different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation of the DL-long-term channel statistics). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, UL SU-MIMO transmission is supported using a codebook-based transmission scheme. That is, an UL grant (containing DCI format 4) includes a single PMI field (along with RI) which indicates the single precoding vector or matrix (from a predefined codebook) a UE may use for the scheduled UL transmission. Therefore, when multiple PRBs are allocated to the UE, a single precoding matrix indicated by the PMI implies that wideband UL precoding is utilized.

Despite its simplicity, this is clearly sub-optimal since typical UL channel is frequency-selective and a UE is frequency scheduled to transmit using multiple PRBs. Yet another drawback of LTE UL SU-MIMO is a lack of support for scenarios where accurate UL-CSI is unavailable at the eNB (which is essential for properly operating codebook-based transmission). This situation can happen in scenarios with high-mobility UEs or bursty inter-cell interference in cells with poor isolation.

Therefore, there is a need for designing new components to enable more efficient support for UL MIMO for the following reasons. First, the support for frequency-selective (or subband) precoding for UL MIMO is desired whenever possible. Second, UL MIMO may offer competitive performance even when accurate UL-CSI is unavailable at the eNB. Third, the proposed UL MIMO solution may be able to exploit UL-DL reciprocity where CSI-RS is utilized by the UE to provide UL-CSI estimation for TDD scenarios.

In LTE UL codebook, pre-coders with antenna selection has been supported in order to keep peak-to-average power ratio (PAPR) low and cubic-metric (CM) for rank>1 small. Antenna selection offers performance improvement in some scenarios, especially for SC-FDMA based UL in LTE. However, for 5G NR systems, it has been agreed in 3GPP RAN1 that UL is primarily going to be CP-OFDM based, although SC-FDMA based may also be supported. It is unclear that antenna selection may show any performance gain in case of CP-OFDM based UL. Whether antenna selection is considered or not, there are several alternatives for UL codebook in 5G NR. The present disclosure proposes a few of those alternatives.

Figure 7:
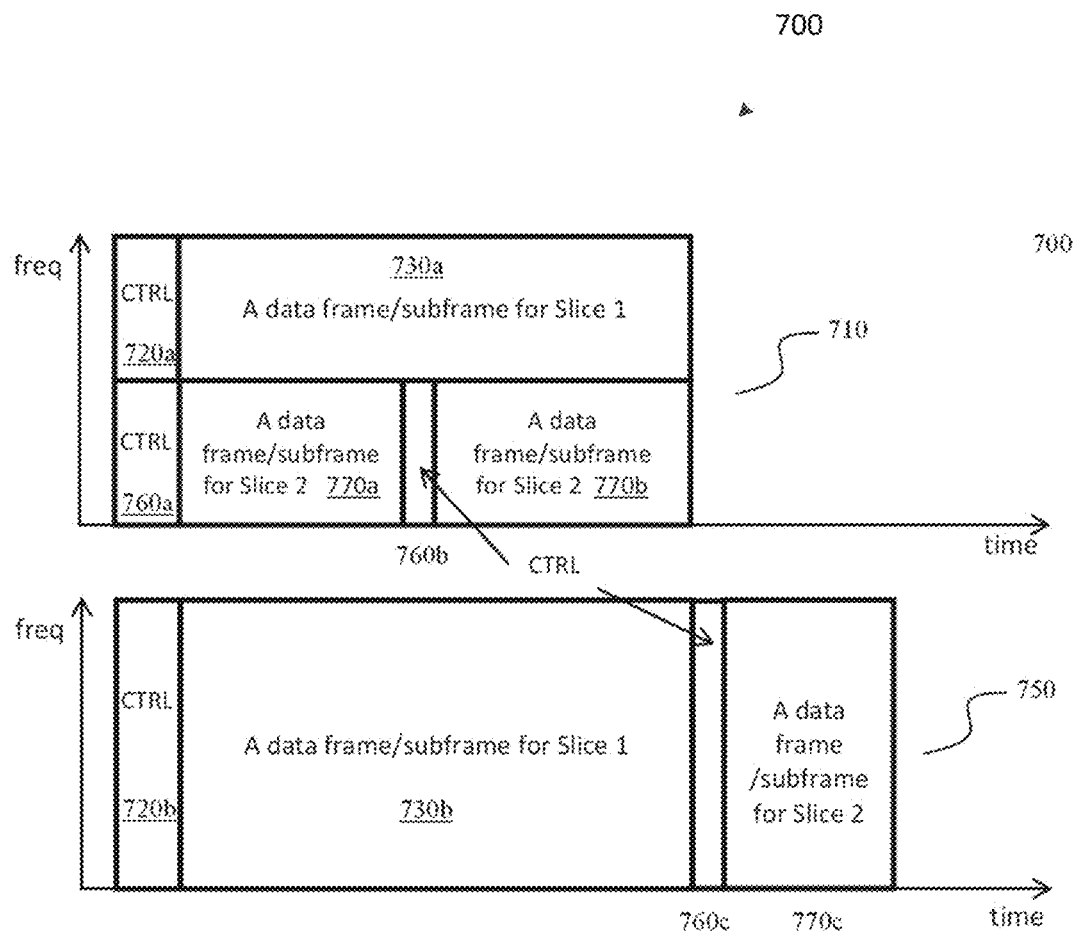
FIG. 7 illustrates an example multiplexing two slices according to embodiments of the present disclosure.

FIG. 7 illustrates an example multiplexing two slices 700 according to embodiments of the present disclosure. An embodiment of the multiplexing two slices 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure.

To utilize PHY resources efficiently and multiplex various slices (with different resource allocation schemes, numerologies, and scheduling strategies) in DL-SCH, a flexible and self-contained frame or subframe design is utilized. Two exemplary instances of multiplexing two slices within a common subframe or frame are depicted in FIG. 7. In FIG. 7, a slice can be composed of one or two transmission instances where one transmission instance includes a control (CTRL) component (720a, 760a, 760b, 720b, and 760c) and a data component (730a, 770a, 770b, 730b, and 770c). In FIG. 7, the two slides (e.g., 710) are multiplexed in frequency domain whereas slices are multiplexed in time domain (e.g., 750).

In the present disclosure, brevity, both FDD and TDD are considered as the duplex method for both DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM). The present disclosure covers several components which can be used in conjunction or in combination with one another, or can operate as standalone schemes.

LTE UL codebooks for 2 and 4 antenna ports are provided TABLEs 1-5, where the scaling factor a=$\sqrt{2}$ for 2 antenna ports, and a=2 for 4 antenna ports. Note that for 2 ports, rank 1, Codebook indices 4 and 5 correspond to antenna selection (with half power), and rank 2 corresponds to antenna selection for each layer, i.e., layer 0 transmitted from antenna port 20 and layer 1 transmitted from antenna port 21. Antenna selection for 4 antenna ports follows similarly.

TABLE 1

Codebook for transmission on antenna ports {20,21}

| Codebook index | Number of layers | |
|---|---|---|
| | v = 1 | v = 2 |
| 0 | $\frac{1}{a}\begin{bmatrix}1\\1\end{bmatrix}$ | $\frac{1}{a}\begin{bmatrix}1 & 0\\0 & 1\end{bmatrix}$ |
| 1 | $\frac{1}{a}\begin{bmatrix}1\\-1\end{bmatrix}$ | — |
| 2 | $\frac{1}{a}\begin{bmatrix}1\\j\end{bmatrix}$ | — |
| 3 | $\frac{1}{a}\begin{bmatrix}1\\-j\end{bmatrix}$ | — |
| 4 | $\frac{1}{a}\begin{bmatrix}1\\0\end{bmatrix}$ | — |
| 5 | $\frac{1}{a}\begin{bmatrix}0\\1\end{bmatrix}$ | — |

TABLE 2

Codebook for transmission on antenna ports {40,41,42,43} with v = 1

| Codebook index | Number of layers v = 1 |
|---|---|
| 0-7 | $\frac{1}{a}\begin{bmatrix}1\\1\\1\\-1\end{bmatrix}$ $\frac{1}{a}\begin{bmatrix}1\\1\\j\\j\end{bmatrix}$ $\frac{1}{a}\begin{bmatrix}1\\1\\-1\\1\end{bmatrix}$ $\frac{1}{a}\begin{bmatrix}1\\1\\-j\\-j\end{bmatrix}$ $\frac{1}{a}\begin{bmatrix}1\\j\\1\\j\end{bmatrix}$ $\frac{1}{a}\begin{bmatrix}1\\j\\j\\1\end{bmatrix}$ $\frac{1}{a}\begin{bmatrix}1\\j\\-1\\-j\end{bmatrix}$ $\frac{1}{a}\begin{bmatrix}1\\j\\-j\\-1\end{bmatrix}$ |

TABLE 2-continued

Codebook for transmission on antenna ports {40,41,42,43} with v = 1

| Codebook index | Number of layers v = 1 |
|---|---|
| 8-15 | $\frac{1}{a}\begin{bmatrix}1\\-1\\1\\1\end{bmatrix}$ $\frac{1}{a}\begin{bmatrix}1\\-1\\j\\-j\end{bmatrix}$ $\frac{1}{a}\begin{bmatrix}1\\-1\\-1\\-1\end{bmatrix}$ $\frac{1}{a}\begin{bmatrix}1\\-1\\-j\\j\end{bmatrix}$ $\frac{1}{a}\begin{bmatrix}1\\-j\\1\\-j\end{bmatrix}$ $\frac{1}{a}\begin{bmatrix}1\\-j\\j\\-1\end{bmatrix}$ $\frac{1}{a}\begin{bmatrix}1\\-j\\-1\\j\end{bmatrix}$ $\frac{1}{a}\begin{bmatrix}1\\-j\\-j\\-1\end{bmatrix}$ |
| 16-23 | $\frac{1}{a}\begin{bmatrix}1\\0\\1\\0\end{bmatrix}$ $\frac{1}{a}\begin{bmatrix}1\\0\\-1\\0\end{bmatrix}$ $\frac{1}{a}\begin{bmatrix}1\\0\\j\\0\end{bmatrix}$ $\frac{1}{a}\begin{bmatrix}1\\0\\-j\\0\end{bmatrix}$ $\frac{1}{a}\begin{bmatrix}0\\1\\0\\1\end{bmatrix}$ $\frac{1}{a}\begin{bmatrix}0\\1\\0\\-1\end{bmatrix}$ $\frac{1}{a}\begin{bmatrix}0\\1\\0\\j\end{bmatrix}$ $\frac{1}{a}\begin{bmatrix}0\\1\\0\\-j\end{bmatrix}$ |

TABLE 3

Codebook for transmission on antenna ports {40,41,42,43} with v = 2

| Codebook index | Number of layers v = 2 |
|---|---|
| 0-3 | $\frac{1}{a}\begin{bmatrix}1&0\\1&0\\0&1\\0&-j\end{bmatrix}$ $\frac{1}{a}\begin{bmatrix}1&0\\1&0\\0&1\\0&j\end{bmatrix}$ $\frac{1}{a}\begin{bmatrix}1&0\\-j&0\\0&1\\0&1\end{bmatrix}$ $\frac{1}{a}\begin{bmatrix}1&0\\-j&0\\0&1\\0&-1\end{bmatrix}$ |
| 4-7 | $\frac{1}{a}\begin{bmatrix}1&0\\-1&0\\0&1\\0&-j\end{bmatrix}$ $\frac{1}{a}\begin{bmatrix}1&0\\-1&0\\0&1\\0&j\end{bmatrix}$ $\frac{1}{a}\begin{bmatrix}1&0\\j&0\\0&1\\0&1\end{bmatrix}$ $\frac{1}{a}\begin{bmatrix}1&0\\j&0\\0&1\\0&-1\end{bmatrix}$ |
| 8-11 | $\frac{1}{a}\begin{bmatrix}1&0\\0&1\\1&0\\0&1\end{bmatrix}$ $\frac{1}{a}\begin{bmatrix}1&0\\0&1\\1&0\\0&-1\end{bmatrix}$ $\frac{1}{a}\begin{bmatrix}1&0\\0&1\\-1&0\\0&1\end{bmatrix}$ $\frac{1}{a}\begin{bmatrix}1&0\\0&1\\-1&0\\0&-1\end{bmatrix}$ |
| 12-15 | $\frac{1}{a}\begin{bmatrix}1&0\\0&1\\0&1\\1&0\end{bmatrix}$ $\frac{1}{a}\begin{bmatrix}1&0\\0&1\\0&-1\\1&0\end{bmatrix}$ $\frac{1}{a}\begin{bmatrix}1&0\\0&1\\0&1\\-1&0\end{bmatrix}$ $\frac{1}{a}\begin{bmatrix}1&0\\0&1\\0&-1\\-1&0\end{bmatrix}$ |

TABLE 4

Codebook for transmission on antenna ports {40,41,42,43} with v = 3

| Codebook index | Number of layers v = 3 |
|---|---|
| 0-3 | $\frac{1}{a}\begin{bmatrix}1&0&0\\1&0&0\\0&1&0\\0&0&1\end{bmatrix}$ $\frac{1}{a}\begin{bmatrix}1&0&0\\-1&0&0\\0&1&0\\0&0&1\end{bmatrix}$ $\frac{1}{a}\begin{bmatrix}1&0&0\\0&1&0\\1&0&0\\0&0&1\end{bmatrix}$ $\frac{1}{a}\begin{bmatrix}1&0&0\\0&1&0\\-1&0&0\\0&0&1\end{bmatrix}$ |
| 4-7 | $\frac{1}{a}\begin{bmatrix}1&0&0\\0&1&0\\0&0&1\\1&0&0\end{bmatrix}$ $\frac{1}{a}\begin{bmatrix}1&0&0\\0&1&0\\0&0&1\\-1&0&0\end{bmatrix}$ $\frac{1}{a}\begin{bmatrix}0&1&0\\1&0&0\\1&0&0\\0&0&1\end{bmatrix}$ $\frac{1}{a}\begin{bmatrix}0&1&0\\1&0&0\\-1&0&0\\0&0&1\end{bmatrix}$ |
| 8-11 | $\frac{1}{a}\begin{bmatrix}0&1&0\\1&0&0\\0&0&1\\1&0&0\end{bmatrix}$ $\frac{1}{a}\begin{bmatrix}0&1&0\\1&0&0\\0&0&1\\-1&0&0\end{bmatrix}$ $\frac{1}{a}\begin{bmatrix}0&1&0\\0&0&1\\1&0&0\\1&0&0\end{bmatrix}$ $\frac{1}{a}\begin{bmatrix}0&1&0\\0&0&1\\1&0&0\\-1&0&0\end{bmatrix}$ |

TABLE 5

Codebook for transmission on antenna ports {40,41,42,43} with v = 4

| Codebook index | Number of layers v = 4 |
|---|---|
| 0 | $\frac{1}{a}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

In the following, we assume that $N_1$ and $N_2$ are the number of antenna ports with the same polarization in the first and second dimensions, respectively. For 2D antenna port layouts, we have $N_1>1$, $N_2>1$, and for 1D antenna port layouts, we either have $N_1>1$ and $N_2=1$ or $N_2>1$ and $N_1=1$. In the rest of the present disclosure, 1D antenna port layouts with $N_1>1$ and $N_2=1$ is considered. The present disclosure, however, is applicable to the other 1D port layouts with $N_2>1$ and $N_1=1$. For a (single-polarized) co-polarized antenna port layout, the total number of antenna ports is $N_1N_2$ and for a dual-polarized antenna port layout, the total number of antenna ports is $2N_1N_2$. An illustration of antenna port layouts for {2, 4, 8} antenna ports at UE is shown in FIG. 8.

Figure 8:
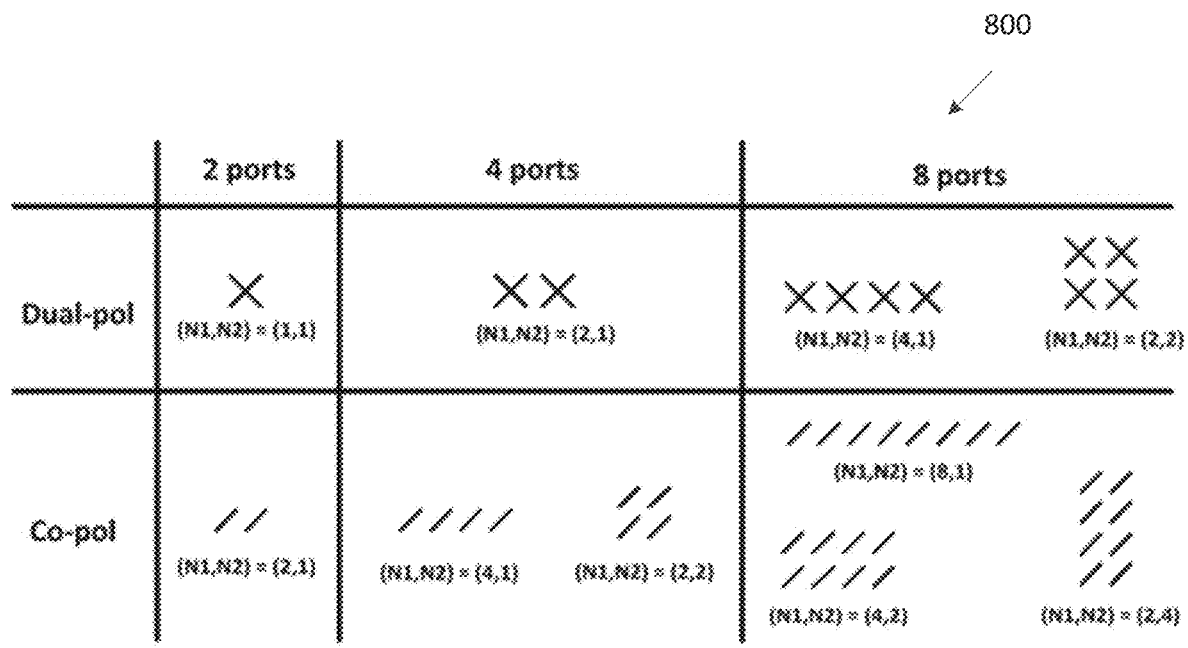
FIG. 8 illustrates an example antenna port layout at UE according to embodiments of the present disclosure.

FIG. 8 illustrates an example antenna port layout 800 at UE according to embodiments of the present disclosure. An embodiment of the antenna port layout 800 shown in FIG. 8 is for illustration only. One or more of the components illustrated in FIG. 7 can be implemented in specialized circuitry configured to perform the noted functions or one or more of the components can be implemented by one or more processors executing instructions to perform the noted functions. Other embodiments are used without departing from the scope of the present disclosure. In the present disclosure, UL antenna ports refer to SRS ports.

In some embodiments 0, the UL codebook W for {2, 4, 8} ports is based on pre-coding vectors which are according to one of the four alternatives in TABLE 6 where $d_{m_1}$ and $d_{m_2}$ are pre-coding vectors of lengths $N_1$ and $N_2$, respectively, and $$\phi_n = e^{\frac{j\pi n}{2}}$$

is a co-phase for dual-polarized antenna port layouts.

TABLE 6

| | Pre-coding vectors | |
|---|---|---|
| | 1D | 2D |
| Co-pol | $v_{m_1} = \dfrac{d_{m_1}}{\sqrt{N_1}}$ | $v_{m_1,m_2} = \dfrac{d_{m_1} \otimes d_{m_2}}{\sqrt{N_1 N_2}}$ |
| Dual-pol | $v_{m_1,n} = \dfrac{1}{\sqrt{2N_1}} \begin{bmatrix} d_{m_1} \\ \phi_n d_{m_1} \end{bmatrix}$ | $v_{m_1,m_2,n} = \dfrac{1}{\sqrt{2N_1 N_2}} \begin{bmatrix} d_{m_1} \otimes d_{m_2} \\ \phi_n d_{m_1} \otimes d_{m_2} \end{bmatrix}$ |

In one example, pre-coding vectors are oversampled DFT vectors, i.e., $$d_{m_1} = \begin{bmatrix} 1 & e^{j\frac{2\pi m_1}{O_1 N_1}} & e^{j\frac{4\pi m_1}{O_1 N_1}} & \ldots & e^{j\frac{2\pi(N_1-1)m_1}{O_1 N_1}} \end{bmatrix}^T$$

$$d_{m_2} = \begin{bmatrix} 1 & e^{j\frac{2\pi m_2}{O_2 N_2}} & e^{j\frac{4\pi m_2}{O_2 N_2}} & \ldots & e^{j\frac{2\pi(N_2-1)m_2}{O_2 N_2}} \end{bmatrix}^T,$$

where $O_1$ and $O_2$ are oversampling factors in two dimensions and can take values from the set {2, 4, 8}. $O_1$ and $O_2$ can take the same values as in DL codebook. Alternatively, they take different values from DL codebook.

In another example, pre-coding vectors include antenna "turn-off" similar to LTE UL codebook (TABLE 1-5), in which a subset of antenna ports are turned off and corresponding components of pre-coding vectors are set to zero.

In one alternative, the maximum number of layers for UL transmission is equal to the number of antenna ports at the UE. In another alternative, the maximum number of layers for UL transmission is up to 4 layers, i.e., up to 2 layers for 2 antenna ports, and up to 4 layers for 4 and 8 antenna ports.

In the rest of the present disclosure, dual-polarized antenna ports are assumed. The embodiments of the present disclosure, however, are general and are applicable to single or co-polarized antenna ports.

In sub-embodiment 0-0, the UL codebook (CB0) is a dual-stage codebook $W=W_1W_2$, where $W_1$ codebook is for the WB component of the codebook which includes beam/pre-coder groups, and $W_2$ codebook is for the SB component of the codebook which includes beam/pre-coder and co-phase selection. Note that the same dual-stage codebook can also be used as the DL codebook, for example, if both DL and UL transmissions are based on CP-OFDM. Note also that for 2 dual-polarized antenna ports, $W_1$ is identity. In one example of dual-stage codebook is DL LTE codebooks (as shown in LTE specification codebooks).

In sub-embodiment 0-1, the UL codebook (CB1) is the same as LTE UL codebook for 2 and 4 antenna ports (TABLE 1-5). For 8 antenna ports, a few alternatives for the UL codebook are as follows. In one example of Alt 0 (without antenna turn-off), the UL codebook is the same as the DL codebook for 8 ports. In another example of Alt 1 (with antenna turn-off), the UL codebook is based on the following two steps. In such example of antenna turn-off, assuming dual-polarized antenna ports, 2 out of 4 dual-polarized antenna port pairs are turned off. There are six such combinations. In such example of codebook, for the remaining 4 ports (which are not turned off), either DL codebook for 4 ports or LTE UL codebook for 4 ports is used. In yet another example of Alt 2, a new codebook for 8 ports is used.

In one alternative, the codebook for this sub-embodiment is a dual-stage codebook $W=W_1W_2$ similar to Sub-embodiment 0-0, where $W_1$ codebook is used for antenna turn-off and $W_2$ codebook is used for pre-coding vectors for the remaining antenna ports (which are not turned off). Note that in this alternative, antenna turnoff can be WB or SB. In another alternative, the codebook for this sub-embodiment is a dual-stage codebook $W=W_1W_2$ in which $W_1$ is identity and $W_2$ is for both antenna turn-off and pre-coding vectors for the remaining antenna ports (which are not turned off).

In sub-embodiment 0-2, the UL codebook (CB2) is a union of UL codebooks in Sub-embodiments 0-0 and 0-1 (CB0 and CB1). In this sub-embodiment, the codebook can be a dual-stage codebook $W=W_1W_2$ in which $W_1$ and $W_2$ codebooks respectively are unions of $W_1$ and $W_2$ codebooks of CB0 and CB1 (in Sub-embodiments 0-0 and 0-1, respectively).

In sub-embodiment 0-3, the UL codebook is rank-dependent in which one of CB0, CB1 and CB2 is used for a given rank r. A few examples of such codebooks are as follows: the rank 1 codebook is according to CB0 (Sub-embodiment 0-0), and rank>1 codebooks are according to CB1 (Sub-embodiment 0-1); the rank 1 codebook is according to CB1 (Sub-embodiment 0-1), and rank>1 codebooks are according to CB0 (Sub-embodiment 0-0); the rank 1 codebook is according to CB0 (Sub-embodiment 0-0), and rank>1 codebooks are according to CB2 (Sub-embodiment 0-2); the rank 1 codebook is according to CB2 (Sub-embodiment 0-2), and rank>1 codebooks are according to CB0 (Sub-embodiment 0); the rank 1 codebook is according to CB1 (Sub-embodiment 0-1), and rank>1 codebooks are according to CB2 (Sub-embodiment 0-2); and the rank 1 codebook is according to CB2 (Sub-embodiment 0-2), and rank>1 codebooks are according to CB1 (Sub-embodiment 0-1).

In sub-embodiment 0-4, the UL codebook is extended to multi-panel case in which there are more than one antenna panels at the UE where each antenna panel corresponds to a 1D or 2D antenna ports as shown in FIG. 8. The extension of UL codebooks CB0, CB1, and CB2, can be similar to the DL codebook for multi-panel. For antenna turn-off, there may be following alternatives. In one example of antenna panel turn-off, each antenna panel is either turned ON or OFF. In another example of antenna port turn-off, antenna ports in each antenna panel are either turned ON or OFF. The antenna port turn-offs may be the same or different for different panel.

In sub-embodiment 0-5, the UL codebook is extended to hybrid beamforming in which pre-coding is in both RF (analog) and digital (baseband) domains. Such hybrid beamforming is necessary for millimeter wave communication systems. In this hybrid setup, antenna turn-off can be in at least one of RF and digital domains. In one alternative, the antenna turn-off is only in RF domain, i.e., each RF chain is either turned ON or OFF. In another alternative, the antenna turn-off is only in digital domain, i.e., (digital) antenna ports associated with each RF chain can be turned off.

The following embodiments (embodiments 1-5) are examples of UL codebook configurations. Similar examples based on the combination of a few of these embodiments can be constructed in a straightforward manner.

In some embodiments 1, the UL codebook configuration is the same as DL codebook configuration, for example, based on RRC, MAC CE, or DCI signaling.

In some embodiments 2, the UL codebook is parameterized by at least one of the codebook parameters such as $N_1$ and $N_2$ for the number of antenna ports in two dimensions, and $O_1$ and $O_2$ for the oversampling factors in two dimensions, and a UE is configured with at least one of these codebook parameters via RRC, MAC CE, or DCI signaling. A few alternatives of UL codebook parameter configuration are as follows. In one example 0, $N_1$, $N_2$, $O_1$ and $O_2$ are fixed, hence don't require signaling for configuration. In one example 1, all of $N_1$, $N_2$, $O_1$ and $O_2$ are configured. In one example 2, some of $N_1$, $N_2$, $O_1$ and $O_2$ are configured. In such example, $N_1$ and $N_2$ are fixed, for example, to 1D port layouts; and $O_1$ and $O_2$ are configured. In such example, $O_1$ and $O_2$ are fixed, for example, to (4, 4) or (8, 8) for 2D port layouts, and (4, 1) or (8, 1) for 1D port layouts; and $N_1$, $N_2$ are configured.

In some embodiments 3, a UE is configured with UL antenna turn-off parameter AntennaTurnOffEnabled to enable/disable antenna turn-off. Such a configuration can be via RRC, MAC CE based, or DCI signaling. If AntennaTurnOffEnabled is set to 'ON', then both pre-coders with and without antenna turn-offs are considered in PMI selection. Alternatively, if AntennaTurnOffEnabled is set to 'OFF', then only pre-coders without antenna turn-offs are considered in PMI selection. In addition, the UE may also be configured with antenna ports to be turned OFF and may also be configured to report a PMI indicating a pre-coding vector according to the configured antenna port turn-offs.

In some embodiments 4, a UE is configured with UL codebook via higher-layer RRC signaling or more dynamic MAC CE based or DCI signaling according to at least one of the following alternatives. In one example, one of CB0, CB1, and CB2 can be configured. In another example, one of CB0 and CB2 can be configured. In yet another example, one of CB1 and CB2 can be configured. In yet another example, one of CB0 and CB1 can be configured.

In some embodiments 5, a UE is configured with CB2 as the UL codebook, and one of the following three types of UL codebooks can be configured via RRC, MAC CE based, or DCI signaling. In one example, CB0 is fixed, and CB1 is configured. In another example, CB1 is fixed, and CB0 is configured. In yet another example, both CB0 and CB1 are configured.

In some embodiments 6, a UE is configured with UL antenna turn-off (cf. the aforementioned embodiments 3), then PMI/TPMI selection/indication is according to at least one of the following alternatives. In one example of Alt 6-0, antenna turn-off is configured for all ranks. In one example of Alt 6-1, antenna turn-off is configured for some rank(s), for example, the antenna turn-off is configured for rank 1 only. In one example of Alt 6-2, antenna turn-off is configured if UL transmission is DFT-S-OFSM based. In one example of Alt 6-3, antenna turn-off is configured if UL transmission is CP-OFDM based. In one example of Alt 6-4, antenna turn-off is configured regardless of whether UL transmission is DFT-S-OFSM or CP-OFDM based. In one example of Alt 6-5, a combination of at least two of Alt 6-0 to Alt 6-4.

Figure 9:
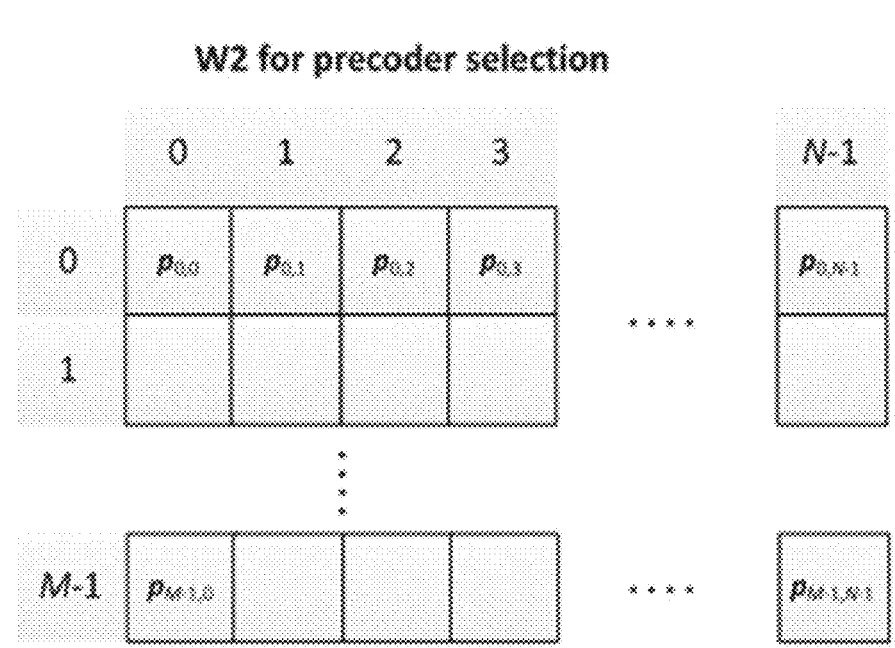
FIG. 9 illustrates an example uplink codebook structure according to embodiments of the present disclosure.

In some embodiments 7, a UE is configured with an UL codebook whose structure is as shown in FIG. 9 in which there are M (or $K_1$) groups of precoders and a pre-coder group comprises of N (or $K_2$) precoders, where the value N is either the same for all precoder groups or different for different precoder groups. Since for precoder cycling based UL transmission (in which a group of precoders are cycled in frequency domain, e.g., either RE level or RB level), TPMI indicates a group of precoders, precoders in UL codebook needs to be grouped for cycling.

According to proposed UL codebook structure, which can be similar to DL codebook structure, a dual-stage codebook $W=W_1W_2$ is proposed for UL, where the first stage codebook $W_1$ is used to form precoder groups. The dual-stage codebook can also be used for frequency-selective (a single precoder is selected for each SB) or frequency non-selective (a single precoder is selected WB) precoder selection based UL transmission scheme, for example, to reduce the number of candidate precoders for selection, where precoder selection is performed using the second stage codebook $W_2$.

Two examples of UL codebook W are LTE UL codebook for 2 and 4 ports, and DL CSI codebook for 2, 4, (and 8 if supported) ports in NR or 5G. In a variation of this embodiment, $W_1$ codebook performs grouping of beams (same for two polarizations assuming dual-polarized antenna ports at UE), e.g. DFT beams, and $W_2$ codebook performs beam selection (and co-phase selection for two polarizations).

FIG. 9 illustrates an example uplink codebook structure 900 according to embodiments of the present disclosure. An embodiment of the uplink codebook structure 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions. Other embodiments are used without departing from the scope of the present disclosure.

An example of precoder grouping for LTE rank 1 UL codebook for 4 ports is shown in TABLE 7. in which there are six precoder groups (M=6), which are as follows: group 0: comprises of Codebook index 0-3; group 1: comprises of Codebook index 4-7; group 2: comprises of Codebook index 8-11; group 3: comprises of Codebook index 12-15; group 4: comprises of Codebook index 16-19; and group 5: comprises of Codebook index 20-23.

TABLE 7

An example of precoder grouping for rank 1

| Codebook index | Number of layers v = 1 |
|---|---|
| 0-7 | $\frac{1}{2}\begin{bmatrix}1\\1\\1\\-1\end{bmatrix} \frac{1}{2}\begin{bmatrix}1\\1\\j\\j\end{bmatrix} \frac{1}{2}\begin{bmatrix}1\\1\\-1\\1\end{bmatrix} \frac{1}{2}\begin{bmatrix}1\\1\\-j\\-j\end{bmatrix} \frac{1}{2}\begin{bmatrix}1\\j\\1\\j\end{bmatrix} \frac{1}{2}\begin{bmatrix}1\\j\\j\\1\end{bmatrix} \frac{1}{2}\begin{bmatrix}1\\j\\-1\\-j\end{bmatrix} \frac{1}{2}\begin{bmatrix}1\\j\\-j\\-1\end{bmatrix}$ |
| 8-15 | $\frac{1}{2}\begin{bmatrix}1\\-1\\1\\1\end{bmatrix} \frac{1}{2}\begin{bmatrix}1\\-1\\j\\-j\end{bmatrix} \frac{1}{2}\begin{bmatrix}1\\-1\\-1\\-1\end{bmatrix} \frac{1}{2}\begin{bmatrix}1\\-1\\-j\\j\end{bmatrix} \frac{1}{2}\begin{bmatrix}1\\-j\\1\\-j\end{bmatrix} \frac{1}{2}\begin{bmatrix}1\\-j\\j\\-1\end{bmatrix} \frac{1}{2}\begin{bmatrix}1\\-j\\-1\\j\end{bmatrix} \frac{1}{2}\begin{bmatrix}1\\-j\\-j\\1\end{bmatrix}$ |
| 16-23 | $\frac{1}{2}\begin{bmatrix}1\\0\\1\\0\end{bmatrix} \frac{1}{2}\begin{bmatrix}1\\0\\-1\\0\end{bmatrix} \frac{1}{2}\begin{bmatrix}1\\0\\j\\0\end{bmatrix} \frac{1}{2}\begin{bmatrix}1\\0\\-j\\0\end{bmatrix} \frac{1}{2}\begin{bmatrix}0\\1\\0\\1\end{bmatrix} \frac{1}{2}\begin{bmatrix}0\\1\\0\\-1\end{bmatrix} \frac{1}{2}\begin{bmatrix}0\\1\\0\\j\end{bmatrix} \frac{1}{2}\begin{bmatrix}0\\1\\0\\-j\end{bmatrix}$ |

An example of pre-coder grouping for LTE rank 1-2 UL codebook for 2 ports is shown in TABLEs 8 and 9. Let i be the Codebook index in LTE UL codebook tables (TABLE 1), then the first and second TPMIs can be obtained as $$i_1 = \left\lfloor \frac{i}{4} \right\rfloor,$$

and $i_2 = i \bmod 4$. Likewise, from the first and the second TPMIs, the Codebook index (i) in LTE UL codebook tables can be obtained as $i = 4i_1 + i_2$.

TABLE 8

Example of pre-coder grouping for 2 antenna ports (W1)

| Rank or number of layers, v | W1 for first TPMI (WB) | | |
|---|---|---|---|
| | Number of pre-coder groups, $K_1$ | Number of bits, $\lceil \log_2 K_1 \rceil$ | $i_1 = 0, 1, \ldots, K_1 - 1$ |
| 1 | 2 | 1 | 0 |
| | | | 1 |
| 2 | 1 | 0 | 0 |

TABLE 9

Example of pre-coder grouping for 2 antenna ports (W2)

| Rank or number of layers, v | W2 for second TPMI (SB) | | |
|---|---|---|---|
| | Number of pre-coders in a group, $K_2$ | Number of bits, $\lceil \log_2 K_2 \rceil$ | $i_2 = 0, 1, \ldots, K_2 - 1$ |
| 1 | 4 | 2 | 0, 1, 2, 3 |
| | 2 | 1 | 0, 1 |
| 2 | 1 | 0 | 0 |

Two examples of precoder grouping for LTE rank 1-4 UL codebook for 4 ports are shown in TABLE 10 and TABLE 11 in which there are $K_1$ pre-coder groups (that comprise the W1 component of the codebook) and each pre-coder group comprises $K_2$ pre-coders (that comprise the W2 component of the codebook). A pre-coder group is indicated/configured using a first TPMI $i_1$ (which is configured WB), and a pre-coder within the pre-coder group (that is configured/indicated) is indicated/configured using a second TPMI $i_2$ (which is configured SB). The indication of the first TPMI is either via higher-layer signaling (e.g. RRC) or via dynamic DCI based signaling. Similarly, the indication of the second TPMI is either via higher-layer signaling (e.g. RRC) or via dynamic DCI based signaling. Also, the indication of the first and the second TPMIs is either joint (via a single signaling) or separate (via two separate signaling).

Let i be the Codebook index in LTE UL codebook tables (TABLE 2-TABLE 5), then the first and second TPMIs can be obtained as $$i_1 = \left\lfloor \frac{i}{K_1} \right\rfloor,$$

and $i_2 = i \bmod K_2$. Likewise, from the first and the second TPMIs, the Codebook index (i) in LTE UL codebook tables can be obtained as $i = K_1 i_1 + i_2$.

TABLE 10

Example of pre-coder grouping for 4 antenna ports

| | W1 for first TPMI (WB) | | | W2 for second TPMI (SB) | | |
|---|---|---|---|---|---|---|
| Rank or number of layers, v | Number of pre-coder groups, $K_1$ | $i_1 = 0, 1,$ $\ldots, K_1 - 1$ | Number of bits, $\lceil \log_2 K_1 \rceil$ | Number of pre-coders in each group, $K_2$ | $i_2 = 0, 1,$ $\ldots, K_2 - 1$ | Number of bits, $\lceil \log_2 K_2 \rceil$ |
| 1 | 6 | 0, 1, ..., 5 | 3 | 4 | 0, 1, 2, 3 | 2 |
| 2 | 8 | 0, 1, ..., 7 | 3 | 2 | 0, 1 | 1 |
| 3 | 6 | 0, 1, ..., 5 | 3 | 2 | 0, 1 | 1 |
| 4 | 1 | 0 | 0 | 1 | 0 | 0 |

TABLE 11

Example of pre-coder grouping for 4 antenna ports

| | W1 for first TPMI (WB) | | | W2 for second TPMI (SB) | | |
|---|---|---|---|---|---|---|
| Rank or number of layers, v | Number of pre-coder groups, $K_1$ | $i_1 = 0, 1,$ $\ldots, K_1 - 1$ | Number of bits, $\lceil \log_2 K_1 \rceil$ | Number of pre-coders in each group, $K_2$ | $i_2 = 0, 1,$ $\ldots, K_2 - 1$ | Number of bits, $\lceil \log_2 K_2 \rceil$ |
| 1 | 6 | 0, 1, ..., 5 | 3 | 4 | 0, 1, 2, 3 | 2 |
| 2 | 4 | 0, 1, 2, 3 | 2 | 4 | 0, 1, 2, 3 | 2 |
| 3 | 3 | 0, 1, 2 | 2 | 4 | 0, 1, 2, 3 | 2 |
| 4 | 1 | 0 | 0 | 1 | 0 | 0 |

In some embodiments 7A, a UE is configured with an UL codebook, which is an extension of the UL codebook in Embodiment 7, wherein N additional pre-coders are included in addition to the pre-coders in the LTE UL codebook table (TABLE 2-TABLE 5), at least one of rank 1 to rank 4.

In one example 7A-0, for 1-layer or rank 1, the following N=8 additional pre-coders are included in the UL codebook. Note that number of pre-coder groups is $K_1$=8 now, which requires 3 bits for the first TPMI indication.

$$24\text{-}31 \quad \frac{1}{2}\begin{bmatrix}1\\1\\0\\0\end{bmatrix} \frac{1}{2}\begin{bmatrix}1\\-1\\0\\0\end{bmatrix} \frac{1}{2}\begin{bmatrix}1\\j\\0\\0\end{bmatrix} \frac{1}{2}\begin{bmatrix}1\\-j\\0\\0\end{bmatrix} \frac{1}{2}\begin{bmatrix}0\\0\\1\\1\end{bmatrix} \frac{1}{2}\begin{bmatrix}0\\0\\1\\-1\end{bmatrix} \frac{1}{2}\begin{bmatrix}0\\0\\1\\j\end{bmatrix} \frac{1}{2}\begin{bmatrix}0\\0\\1\\-j\end{bmatrix}$$

In one example 7A-1, for 1-layer or rank 1, the following N=8 additional pre-coders are included in the UL codebook. Note that number of pre-coder groups is $K_1$=8 now, which requires 3 bits for the first TPMI indication.

$$24\text{-}31 \quad \frac{1}{2}\begin{bmatrix}1\\0\\0\\0\end{bmatrix} \frac{1}{2}\begin{bmatrix}0\\1\\0\\0\end{bmatrix} \frac{1}{2}\begin{bmatrix}0\\0\\1\\0\end{bmatrix} \frac{1}{2}\begin{bmatrix}0\\0\\0\\1\end{bmatrix} \frac{1}{2}\begin{bmatrix}1\\1\\1\\0\end{bmatrix} \frac{1}{2}\begin{bmatrix}1\\1\\0\\1\end{bmatrix} \frac{1}{2}\begin{bmatrix}1\\0\\1\\1\end{bmatrix} \frac{1}{2}\begin{bmatrix}0\\1\\1\\1\end{bmatrix}$$

In some embodiments 8, a UE is configured with a dual-stage UL codebook $W=W_1W_2$, where the first stage codebook $W_1$ is used to select a precoder group, and the second stage $W_2$ codebook is used to select a precoder from the selected precoder group. In such embodiments, for precoder cycling based UL transmission, $W_1$ codebook is used. In such embodiments, for frequency selective or frequency non-selective precoder selection based UL transmission, at least one of the following alternatives is considered.

In one example of Alt 8-0, both $W_1$ and $W_2$ codebooks are used. In this case, two PMI, PMI1 and PMI2 for W1 and W2 respectively are indicated where PMI1 indicates a precoder group and PMI2 indicates a precoder in the selected precoder group. Alternatively, PMI1 and PMI2 indicated jointly as a single PMI.

In another example of Alt 8-1, overall codebook W is used. In this case, a single PMI is indicated.

In some embodiments 9, a UE is configured with a dual-stage UL codebook $W=W_1W_2$, which is the same as the dual-stage DL codebook in which it is referred to as Type I SP codebook for 2, 4, and 8 ports), which is parameterized by parameters such as number of ports in two dimensions, $(N_1, N_2)$, oversampling factors in two dimensions, $(O_1, O_2)$, and number of beams (L=1, 4) for $W_1$ beam group selection. For UL codebook, $(N_1, N_2)$ and $(O_1, O_2)$ are fixed as follows:

| Number of SRS ports | $(N_1, N_2)$ | $(O_1, O_2)$ |
|---|---|---|
| 4 | (2, 1) | (4, —) |
| 8 | (2, 2) | (4, 4) |
|   | (4, 1) | (4, —) | where the number of beams is either fixed (for example L=1) or configured from L=1 and 4.

In sub-embodiment 9-0, if the UE is configured with frequency selective precoding in UL, then the number of beams is fixed to 1, i.e., L=1. This is to reduce SB TPMI signaling overhead in UL related DCI signaling.

In sub-embodiment 9-1, if the UE is configured with frequency non-selective precoding in UL, then the number of beams is either fixed (for example L=1) or is configured from L=1 and 4 using 1-bit signaling in UL related DCI, or via higher layer RRC, or MAC CE based signaling.

In sub-embodiment 9-2, if the UE is configured with pre-coder group signaling using $W_1$ codebook, then the number of beams is fixed to L=4.

In some embodiments 10, a UE is configured with a port selection codebook in UL (similar to LTE specification Class B, K=1 codebook). The use case of such a codebook is when SRS is pre-coded/beam-formed. The UL port selection codebook is according to at least one of the following alternatives. In one example of Alt 10-0, one port is selected per layer and ports are not shared across layers. For example, for 2 ports, the rank 1 and rank 2 codebooks are $$\left\{ \begin{bmatrix} 1 \\ 0 \end{bmatrix}, \begin{bmatrix} 0 \\ 1 \end{bmatrix} \right\} \text{ and } \left\{ \begin{bmatrix} 1 & 0 \\ 0 & 1 \end{bmatrix} \right\},$$

respectively. In another example of Alt 10-1, a subset of antenna ports is selected or combined per layer, and ports are shared across layers. An example of such a codebook is LTE UL codebook. Another example is LTE specification Class B, K=1 codebook. In one example of Alt 10-2, all antenna ports are selected or combined per layer, and ports are shared across layers. An example of such a codebook is LTE DL codebooks. In one example of Alt 10-3, a combination of Alt 10-0 and Alt 10-2.

In some embodiments 11, a UE is configured with frequency selective precoding in UL according to at least one of the following schemes. In one example of scheme 0, the number of SB TPMI is fixed (N) where the size of each SB (in number of PRBs) is fixed regardless of the UL scheduling. For example, if B is the size (number of SBs) of UL BW and if N divides B, then the SB size is $$\frac{B}{N},$$

otherwise the SB size is $$\left\lfloor \frac{B}{N} \right\rfloor$$

for N−n SBs and $$\left\lfloor \frac{B}{N} \right\rfloor + 1$$

for remaining n SBs, where n is the remainder of $$\frac{B}{N}.$$

In one example of scheme 1, the number of SB TPMI is fixed (N) where the size of each SB (in number of PRBs) is variable depending on the UL scheduling. For example, if B is the number of scheduled SBs in UL and if N divides B, then the SB size is $$\frac{B}{N},$$

otherwise the SB size is $$\left\lfloor \frac{B}{N} \right\rfloor$$

for N−n SBs and $$\left\lfloor \frac{B}{N} \right\rfloor + 1$$

for remaining n SBs, where n is the remainder of $$\frac{B}{N}.$$

In one of example of scheme 2, the number of SB TPMIs is 2; the first TPMI is associated with the best M selected SBs, and the second TPMI is associated with the remaining B−M SBs, where B is the number of scheduled SBs in UL. The value M is either fixed or configured to the UE or the value M depends on B, for example M=min(1, B/2). In one example of scheme 3, the extension of Scheme 2 to more than 2 SB TPMIs. In one example of scheme 4, the number of SB TPMIs is M+1; the first M TPMIs are associated with the best M selected SBs (1 TPMI for each SB) and 1 TPMI is associated with the remaining B−M SBs, where B is the number of scheduled SBs in UL. The value M is either fixed or configured to the UE or the value M depends on B. In one example of scheme 5, the number of TPMIs is equal to the number of scheduled SBs in UL.

In aforementioned schemes 2, 3, and 4, the information about the location of best M selected SBs need to be signaled. In one alternative, this information is signaled in the same UL related DCI which contains TPMI. In another alternative, this information is signaled separately either in another UL related DCI signaling or in another UL transmission, whose information in contained in the first UL related DCI.

In some embodiment 12, a 1-bit signaling is used to configure UL codebook with or without antenna turnoff. In one example, this 1-bit signaling is applicable for rank 1 only. At least one of the following alternatives is used. In one example of Alt 12-0, the 1-bit signaling corresponds to the signaling for UL waveform, CP-OFDM or DFT-S-OFDM. Ex: If CP-OFDM UL waveform is signaled, then codebook without turn-off is used; otherwise (DFT-S-OFDM), codebook with antenna turn-off is used. 1-bit signaling can be signaled via higher layer RRC signaling. Alternatively, 1-bit signaling is signaled via MAC CE based signaling. Alternatively, 1-bit signaling is signaled via UL related DCI signaling.

In one example 1 of Alt 12-0, LTE UL codebook is partitioned into two parts (part 1 and part 2), and part 1 of LTE UL codebook without antenna-off is used for CP-OFDM and part 2 of LTE UL codebook with antenna turn-off is used for DFT-S-OFDM. For 2 ports, the former requires 2 bits TPMI signaling for rank 1, and the later 1 bit. Similarly, for 4 ports, the former requires 4 bits for TPMI signaling for rank 1, and the latter requires 3 bits.

In one example 2 of Alt 12-9, LTE UL codebook is partitioned into two parts (part 1 and part 2), and part 1 of LTE UL codebook without antenna-off is used for CP-OFDM and the whole (part 1 and part 2) of LTE UL codebook is used for DFT-S-OFDM. For 2 ports, the former requires 2 bits TPMI signaling for rank 1, and the later 3 bits. Similarly, for 4 ports, the former requires 4 bits for TPMI signaling for rank 1, and the latter requires 5 bits.

In one example of Alt 12-1, the 1-bit signaling is separate for UL codebook in addition to the signaling for the UL waveform. In one example of Alt 12-2, the 1-bit signaling is reported by the UE as a WB CSI component, for example, as part of WB first TPMI (i1).

In some embodiments 13, a UE is configured with an UL codebook that is based on a codebook for $N_g \geq 1$ antenna panels or multiple antenna groups, wherein each antenna panel or antenna group comprises P=1 (e.g. co-pol) or 2 antenna ports (e.g. dual-pol). In such embodiments, the same codebook is used for both single and multiple antenna panels at the UE. For example: for 2 ports, $(N_g, N_1, N_2, P)=(1, 1, 1, 2), (2, 1, 1, 1)$; for 4 ports, $(N_g, N_1, N_2, P)=(2, 1, 1, 2), (4, 1, 1, 1)$; and for 8 ports, $(N_g, N_1, N_2, P)=(4, 1, 1, 2), (8, 1, 1, 1)$.

In one alternative, the UL codebook comprises pre-coders which have a Kronecker product structure. A few examples are as follows: [1,a,b,ab], [1,a,b,−(ab)*], [1,a,b,(ab)*], [1,a,b,−(ab)], [1,a,b,ab*], [1,a,b,−a*b], [1,a,b,a*b], and [1,a,b,−a*b], where a and b belong to QPSK alphabet $\{1, j, -1, -j\}$, where "*" indicates complex conjugate.

In another alternative, the UL codebook has a pre-coder structure [1, a, b, c] where a, b, and c belong to QPSK alphabet $\{1, j, -1, -j\}$. In another alternative, the UL codebook has a pre-coder structure [1, a, $b_2c_2$, $b_3c_3$], where a belongs to QPSK alphabet $\{1, j, -1, -j\}$, $b_2$ and $b_3$ belong to either QPSK alphabet $\{1, j, -1, -j\}$ or alphabet $$\{e^{\frac{j\pi}{4}}, e^{\frac{j3\pi}{4}}, e^{\frac{j5\pi}{4}}, e^{\frac{j7\pi}{4}}\},$$

and $c_2$ and $c_3$ belong to $$\{e^{\frac{j\pi}{4}}, e^{-\frac{j\pi}{4}}\}.$$

In another alternative, the UL codebook has pre-coder structure [1, $b_1c_1$, $b_2c_2$, $b_3c_3$], where $b_1$, $b_2$ and $b_3$ belong to either QPSK alphabet $\{1, j, -1, -j\}$ or alphabet $$\{e^{\frac{j\pi}{4}}, e^{\frac{j3\pi}{4}}, e^{\frac{j5\pi}{4}}, e^{\frac{j7\pi}{4}}\},$$

and $c_1$, $c_2$ and $c_3$ belong to $$\{e^{\frac{j\pi}{4}}, e^{-\frac{j\pi}{4}}\}.$$

In some embodiments 14, the UL codebook has a pre-coder structure including an amplitude scaling component a wherein the amplitude scaling is either fixed or configured (e.g. via higher layer RRC signaling). For 2-Tx or 2 port UL codebook, the amplitude scaling a is according to at least one of the following alternatives:

$$a \in \left\{ \begin{bmatrix} 1 \\ \sqrt{0.5} \end{bmatrix}, \begin{bmatrix} 1 \\ 1 \end{bmatrix} \right\},$$

where 1-bit is used to indicate a;

$$a \in \left\{ \begin{bmatrix} 1 \\ \sqrt{0.5} \end{bmatrix}, \begin{bmatrix} 1 \\ 0 \end{bmatrix} \right\},$$

where 1-bit is used to indicate a; and $$a \in \left\{ \begin{bmatrix} 1 \\ \sqrt{0.5} \end{bmatrix}, \begin{bmatrix} 1 \\ 0 \end{bmatrix}, \begin{bmatrix} 0 \\ 1 \end{bmatrix}, \begin{bmatrix} 1 \\ 1 \end{bmatrix} \right\},$$

where 2-bits are used to indicate a.

For 4-Tx or 4 port UL codebook, the amplitude scaling a is according to at least one of the following alternatives:

$$a \in \left\{ \begin{bmatrix} 1 \\ \sqrt{0.5} \\ 1 \\ \sqrt{0.5} \end{bmatrix}, \begin{bmatrix} 1 \\ 1 \\ 1 \\ 1 \end{bmatrix} \right\},$$

where 1-bit is used to indicate a;

$$a \in \left\{ \begin{bmatrix} 1 \\ \sqrt{0.5} \\ 1 \\ \sqrt{0.5} \end{bmatrix}, \begin{bmatrix} 1 \\ 0 \\ 1 \\ 0 \end{bmatrix} \right\},$$

where 1-bit is used to indicate a; and $$a \in \left\{ \begin{bmatrix} 1 \\ \sqrt{0.5} \\ 1 \\ \sqrt{0.5} \end{bmatrix}, \begin{bmatrix} 1 \\ 0 \\ 1 \\ 0 \end{bmatrix}, \begin{bmatrix} 0 \\ 1 \\ 0 \\ 1 \end{bmatrix}, \begin{bmatrix} 1 \\ 1 \\ 1 \\ 1 \end{bmatrix} \right\},$$

where 2-bits are used to indicate a. The indication of a is WB either as a separate WB TPMI component or joint with the WB TPMI. Also, in case of rank>1 TPMI indication, this indication is either common for all layers, or this indication is independent for all layers.

In some embodiments 15A, a UE is configured with a 4-Tx UL codebook for 1 SRS resource comprising 4 ports, wherein pre-coders comprise at least one of the following structures. In one example of Alt 15A-0 (with antenna selection), for each layer, a subset of ports are selected and the selected ports are combined to obtain the pre-coder for that layer. For example, for each layer, a half of the ports (i.e. 2 ports) are selected. An example is pre-coders in LTE UL codebook.

In another example of Alt 15A-1 (without antenna selection), for each layer, all ports are selected and combined to obtain the pre-coder. Two examples are NR Type I CSI codebook for single panel and NR Type I CSI codebook for multi-panel (MP). In yet another example of Alt 15A-2 (both with and without antenna selection): a combination of Alt 15A-0 and Alt 15A-1.

In some embodiments 15B, a UE is configured with a 4-Tx UL codebook for 2 SRS resources with 2 ports per resource or 2 panels each with 2 ports, wherein pre-coders comprise at least one of the following structures. In one example of Alt 15B-0 (coherent pre-coders), a single TPMI indicates a pre-coder across 2 resources or 2 panels. Two examples of such pre-coders are NR Type I CSI codebook for MP and LTE UL codebook. The coherent pre-coders are either for all ranks or for some ranks (e.g. rank 1 only). In another example of Alt 15B-1 (non-coherent pre-coders), one of the 2 resources or 2 panels is selected per layer, and 2-Tx codebook (DL or UL 2-Tx codebook) is used for pre-coder for the selected ports, where the selection of resource or panel is either based on SRI (SRS resource indicator) or based on the codebook as part of the PMI. The coherent pre-coders are either for all ranks or for some ranks (e.g. rank>1). In yet another example of Alt 15B-2 (both coherent and non-coherent pre-coders), a combination of the coherent (Alt 15B-0) and non-coherent pre-coders (Alt 15B-1), where this combination is either for all ranks or only for some ranks (for example, rank 1 only).

Also, in addition to coherent and/or non-coherent pre-coders, antenna port selection is considered wherein the port selection is either restricted to within a resource or is unrestricted from both resources.

In some embodiments 15C, a UE is configured with a 4-Tx UL codebook for 4 SRS resources with 1 port per resource or 4 panels each with 1 port, wherein pre-coders comprise at least one of the following structures. In one example of Alt 15C-0 (coherent pre-coders), a single TPMI indicates a pre-coder across 4 resources or 4 panels. Two examples of such pre-coders are NR Type I CSI codebook for MP and LTE UL codebook. The coherent pre-coders are either for all ranks or for some ranks (e.g. rank 1 only). In another example of Alt 15C-1 (non-coherent pre-coders), a subset of the 4 resources or 4 panels is selected per layer. In one example, a single resource or panel is selected per layer. Alternatively, 2 resources or panels are selected, and 2-Tx codebook (DL or UL 2-Tx codebook) is used for pre-coder for the selected ports. The selection of resource or panel is either based on SRI (SRS resource indicator) or based on the codebook as part of the PMI. The coherent pre-coders are either for all ranks or for some ranks (e.g. rank>1). In yet another example of Alt 15C-2 (both coherent and non-coherent pre-coders), a combination of the coherent (Alt 15C-0) and non-coherent pre-coders (Alt 15C-1), where this combination is either for all ranks or only for some ranks (for example, rank 1 only).

In some embodiments 16, a UE is configured with a N-Tx codebook for N ports in at least one resource where the higher rank (rank>1) codebook is designed using all or a subset of pre-coders in the rank-1 (or 1 layer) codebook. In one example, for DL, $N \in \{2, 4, 8, 12, 16, 24, 32\}$ and the at least one resource corresponds to CSI-RS resource. In another example, for UL, $N \in \{2, 4, 8\}$ and the at least one resource corresponds to SRS resource. For UL, the N ports correspond to one or more SRS resources according to at least one of the following alternatives: a single SRS resource comprising N ports; N/2 SRS resources each comprising 2 ports; and N SRS resources each comprising 1 port.

Also, the rank-1 codebook can be the same regardless of the waveform (e.g. DFT-S-OFDM or CP-OFDM) used for transmission. For example, for UL, the rank-1 codebook can be the same for both DFT-S-OFDM and CP-OFDM waveforms. Alternatively, the rank-1 codebooks for two UL waveforms (e.g. DFT-S-OFDM or CP-OFDM) are the same except that the scaling factor a to normalize the columns of pre-coding matrices are different for the two waveforms. In one example, for DFT-S-OFDM, the scaling factor is the same as in LTE UL codebook, i.e., $a=\sqrt{2}$ for 2 antenna ports, and $a=2$ for 4 antenna ports, and for CP-OFDM, the scaling factor $a=\sqrt{rn}$, where r corresponds to rank and n corresponds to the number of non-zero entries in the pre-coding matrix. In another example, for DFT-S-OFDM, the scaling factor is $a=1$ or $\sqrt{2}$ for 2 antenna ports, and $a=1$ or $\sqrt{2}$ or 2 for 4 antenna ports, and for CP-OFDM, the scaling factor is the same as in previous example.

The codebook for N=4 is according to at least one of the following alternatives. In one example of Alt 16-0, for N=4, the rank-1 codebook is the LTE UL 4-Tx rank-1 codebook, where the scaling (or power normalization) factor (a) in pre-coders is either $a=1$ or $a=2$ or $a=\sqrt{2}$. Note that $a=2$ is used in LTE UL 4-Tx codebook. An example of the rank-1 codebook table is a part of the rank-1 codebook (with Codebook indices 0-23) shown in TABLE 12. The total number of pre-coders in the rank-1 codebook is 24. The rank-1 codebook can be partitioned into two types of codebooks (CB). In one example of CB0, the first codebook comprises 16 pre-coders that combine all 4 ports (all 4 entries in a pre-coder are non-zero). In other words, the pre-coders assume full coherence that all ports can be transmitted coherently. In another example of CB1, the second codebook comprises 8 pre-coders that combine 2 ports (2 entries in a pre-coder are non-zero and the remaining 2 entries are zero). In other words, the pre-coders assume partial coherence that port pairs can be transmitted coherently.

The rank 2-4 codebooks are constructed using all pre-coders in the rank-1 codebook. Similar to rank-1, rank 2-4 codebooks can also be partitioned into two types of codebooks (CB). For example, for rank-2, the total number of rank-2 pre-coding matrices is 12 which can be partitioned as follows. In one instance of CB0, the first codebook comprises 8 rank-2 pre-coding matrices that combines all 4 ports per layer (i.e., all 4 entries in a pre-coder for each layer are non-zero). In another instance of CB1, the second codebook comprises 4 rank-2 pre-coding matrices that combines 2 ports per layer (i.e., 2 entries in a pre-coder for each layer are non-zero and the remaining 2 entries are zero).

An example of the rank-2 codebook table is a part of the rank-2 codebook (with Codebook indices 0-11) shown in TABLE 13. For rank-3, the total number of rank-3 pre-coding matrices is 12 which can be partitioned as follows. In one instance of CB0, the first codebook comprises 8 rank-3 pre-coding matrices that combines all 4 ports per layer (i.e., all 4 entries in a pre-coder for each layer are non-zero). In another instance of CB1, the second codebook comprises 4 rank-3 pre-coding matrices that combines 2 ports per layer (i.e., 2 entries in a pre-coder for each layer are non-zero and the remaining 2 entries are zero).

An example of the rank-3 codebook table is a part of the rank-3 codebook (with Codebook indices 0-11) shown in TABLE 14. For rank-4, the total number of rank-4 pre-coding matrices is 6 which can be partitioned as follows. In one instance of CB0, the first codebook comprises 4 rank-4 pre-coding matrices that combines all 4 ports per layer (i.e., all 4 entries in a pre-coder for each layer are non-zero). In another instance of CB1, the second codebook comprises 2 rank-4 pre-coding matrices that combines 2 ports per layer (i.e., 2 entries in a pre-coder for each layer are non-zero and the remaining 2 entries are zero).

An example of the rank-4 codebook table is a part of the rank-4 codebook (with Codebook indices 0-5) shown in TABLE 15. The total number of rank 1-4 pre-coders/pre-coding matrices is 24+12+12+6=54. So, if the codebook is used for UL transmission, then the codebook requires 6 bits for joint TRI and TPMI indication.

In a variation of Alt 16-0, the rank-4 codebook includes an additional pre-coding matrix $$\frac{1}{a}\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

and the corresponding rank-4 codebook table is as shown in TABLE 15. So, the total number of rank 1-4 pre-coders/pre-coding matrices is 55.

The scaling factor (a) in rank 1-4 codebooks for this alternative is according to at least one of the following alternatives. In one example of Alt 16-0A, the scaling factor is the same (e.g., a=2) regardless of the UL waveform (DFT-S-OFDM or CP-OFDM) used for UL transmission and rank 1-4. In another example of Alt 16-0B, the scaling factor is the same (e.g., a=2) regardless of the UL waveform (DFT-S-OFDM or CP-OFDM) used for UL transmission for rank 1 only, and the scaling factor for at least one of rank 2-4 can be different from that for rank 1 (e.g. for CP-OFDM). For example, a=√n where n is the number of non-zero entries in a column of a pre-coding matrix, which for codebooks TABLE 13, TABLE 14, and TABLE 15 implies the following. In one example of Rank 2, a=2 is used for Codebook index 0-7 and a=√2 is used for Codebook index 8-11 in TABLE 13. In another example of Rank 3, a=2 is used for Codebook index 0-7 and a=√2 V is used for Codebook index 8-11 in TABLE 14. In yet another example of Rank 4, a=2 is used for Codebook index 0-3 and a=√2 is used for Codebook index 4-5 in TABLE 15. If the rank-4 codebook includes the additional pre-coding matrix $$\frac{1}{a}\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

then a=2 is used.

In one example of Alt 16-0C, the scaling factor can be different for the two UL waveforms (DFT-S-OFDM or CP-OFDM) for rank 1. At least one of the following examples is used independently for DFT-S-OFDM and CP-OFDM. In one instance of Ex 16-0A, a=2 is used for Codebook index 0-23 in TABLE 12. In one instance of Ex 16-0B, a=2 is used for Codebook index 0-15 and a=√2 is used for Codebook index 16-23 in TABLE 12. For example, Ex 16-0A is used for DFT-S-OFDM and Ex 16-0B is used for CP-OFDM. The scaling factor for at least one of rank 2-4 can be same or different from that for rank 1 (e.g. for CP-OFDM). If the scaling factor is different, then the scaling factor is according to the example in Alt 16-0B.

In one example of Alt 16-1, the rank-1 codebook is the same as in Alt 16-0, and at least one of rank 2-4 codebooks is constructed using a subset of the pre-coders in the rank-1 codebook. At least of the following sub-alternatives is used. In one instance of Alt 16-1A, the rank-2 codebook is a subset of either CB0, CB1 or CB0∪CB1, where CB0 and CB1 are rank-2 codebook partitions explained in Alt 16-0, and the notation A∪B indicates the union of sets A and B. In one instance of Alt 16-1B, the rank-3 codebook is a subset of either CB0, CB1, or CB0∪CB1, where CB0 and CB1 are rank-3 codebook partitions explained in Alt 16-0. In one instance of Alt 16-1C, the rank-4 codebook is a subset of either CB0, CB1 or CB0∪CB1, where CB0 and CB1 are rank-4 codebook partitions explained in Alt 16-0. In one instance of Alt 16-1D, a combination of Alt 16-1A and Alt 16-1B. In one instance of Alt 16-1E, a combination of Alt 16-1A and Alt 16-1C. In one instance of Alt 16-1F, a combination of Alt 16-1B and Alt 16-1C. In one instance of Alt 16-1G: a combination of Alt 16-1A, Alt 16-1B, and Alt 16-1C.

The rank 2, rank-3, and rank-4 codebook tables according to any of these sub-alternatives are obtained by selecting a subset of pre-coding matrices (or a subset of Codebook-indices) in TABLE 13, TABLE 14, and TABLE 15, respectively.

In a variation of Alt 16-1, the rank-4 codebook includes an additional pre-coding matrix $$\frac{1}{a}\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

The scaling factor (a) in rank 1-4 codebook for this alternative is according to at least one of Alt 16-0A, 16-0B, and 16-0C.

In one example of Alt 16-2, for N=4, the rank-1 codebook includes all pre-coders in the LTE UL 4-Tx rank-1 codebook, where the scaling (or power normalization) factor (a) in pre-coders is either a=1 or a=2 or a=√2. Note that a=2 is used in LTE UL 4-Tx codebook. In addition, the rank-1 codebook also includes the four single port selection pre-coders $$\left\{ \frac{1}{a}\begin{bmatrix} 1 \\ 0 \\ 0 \\ 0 \end{bmatrix}, \frac{1}{a}\begin{bmatrix} 0 \\ 1 \\ 0 \\ 0 \end{bmatrix}, \frac{1}{a}\begin{bmatrix} 0 \\ 0 \\ 1 \\ 0 \end{bmatrix}, \frac{1}{a}\begin{bmatrix} 0 \\ 0 \\ 0 \\ 1 \end{bmatrix} \right\},$$

An example of the rank-1 codebook table is shown in TABLE 12. The total number of pre-coders in the rank-1 codebook is 24+4=28. The rank-1 codebook can be partitioned into three types of codebooks (CB). In one instance of CB0, the same as rank-1 CB0 in Alt 16-0. In one instance of CB1, the same as rank-1 CB1 in Alt 16-0. In one instance of CB2, the third codebook comprises 4 port selection pre-coders that select 1 out of 4 ports (1 entry in a pre-coder is non-zero and the remaining 3 entries are zero). In other words, the pre-coders assume non-coherence that no port pairs can be transmitted coherently.

The rank 2-4 codebooks are constructed using all pre-coders in the rank-1 codebook. Similar to rank-1, rank 2-4 codebooks can also be partitioned into three types of codebooks (CB). For example, for rank-2, the total number of rank-2 pre-coding matrices is 16 which can be partitioned as follows. In one instance of CB0, the same as rank-2 CB0 in Alt 16-0. In one instance of CB1, the same as rank-2 CB1 in Alt 16-0. In one instance of CB2, the third codebook comprises 4 rank-2 pre-coding matrices that select 1 out of 4 ports per layer. At least one of the following examples is used for the four rank-2 pre-coding matrices: In one example of Ex 16-2A, $$\left\{ \frac{1}{\sqrt{2}}\begin{bmatrix} 1 & 0 \\ 0 & 1 \\ 0 & 0 \\ 0 & 0 \end{bmatrix}, \frac{1}{\sqrt{2}}\begin{bmatrix} 0 & 0 \\ 1 & 0 \\ 0 & 1 \\ 0 & 0 \end{bmatrix}, \frac{1}{\sqrt{2}}\begin{bmatrix} 0 & 0 \\ 1 & 0 \\ 0 & 0 \\ 0 & 1 \end{bmatrix}, \frac{1}{\sqrt{2}}\begin{bmatrix} 1 & 0 \\ 0 & 0 \\ 0 & 0 \\ 0 & 1 \end{bmatrix} \right\}.$$

In one example of Ex 16-2B, $$\left\{ \frac{1}{\sqrt{2}}\begin{bmatrix} 1 & 0 \\ 0 & 1 \\ 0 & 0 \\ 0 & 0 \end{bmatrix}, \frac{1}{\sqrt{2}}\begin{bmatrix} 0 & 0 \\ 1 & 0 \\ 0 & 1 \\ 0 & 0 \end{bmatrix}, \frac{1}{\sqrt{2}}\begin{bmatrix} 0 & 0 \\ 0 & 0 \\ 1 & 0 \\ 0 & 1 \end{bmatrix}, \frac{1}{\sqrt{2}}\begin{bmatrix} 1 & 0 \\ 0 & 0 \\ 0 & 0 \\ 0 & 1 \end{bmatrix} \right\}.$$

In one example of Ex 16-2C, any 4 from the set $$\left\{ \frac{1}{\sqrt{2}}\begin{bmatrix} 1 & 0 \\ 0 & 1 \\ 0 & 0 \\ 0 & 0 \end{bmatrix}, \frac{1}{\sqrt{2}}\begin{bmatrix} 0 & 0 \\ 1 & 0 \\ 0 & 1 \\ 0 & 0 \end{bmatrix}, \frac{1}{\sqrt{2}}\begin{bmatrix} 0 & 0 \\ 1 & 0 \\ 0 & 0 \\ 0 & 1 \end{bmatrix}, \right.$$

$$\left. \frac{1}{\sqrt{2}}\begin{bmatrix} 1 & 0 \\ 0 & 0 \\ 0 & 0 \\ 0 & 1 \end{bmatrix}, \frac{1}{\sqrt{2}}\begin{bmatrix} 0 & 0 \\ 1 & 0 \\ 0 & 0 \\ 0 & 1 \end{bmatrix}, \frac{1}{\sqrt{2}}\begin{bmatrix} 1 & 0 \\ 0 & 0 \\ 0 & 1 \\ 0 & 0 \end{bmatrix} \right\}.$$

For Ex 16-2A, the rank-2 codebook table is shown in TABLE 13. For Ex 16-2B, the rank-2 pre-coding matrix corresponding to Codebook index 14 in TABLE 13 is replaced with $p_{26,27}$. For Ex 16-2C, the rank-2 pre-coding matrices corresponding to Codebook indices 12-15 in TABLE 13 are replaced with any four of $p_{24,25}$, $p_{24,26}$, $p_{25,26}$, $p_{25,27}$, $p_{24,27}$, and $p_{26,27}$.

For rank-3, the total number of rank-3 pre-coding matrices is 16 which can be partitioned as follows. In one example of CB0, the same as rank-3 CB0 in Alt 16-0. In one example of CB1, the same as rank-3 CB1 in Alt 16-0. In one example of CB2, the third codebook comprises 4 rank-3 pre-coding matrices that select 1 out of 4 ports per layer. The four rank-3 pre-coding matrices are $$\left\{ \frac{1}{\sqrt{3}}\begin{bmatrix} 1 & 0 & 0 \\ 0 & 1 & 0 \\ 0 & 0 & 1 \\ 0 & 0 & 0 \end{bmatrix}, \frac{1}{\sqrt{3}}\begin{bmatrix} 1 & 0 & 0 \\ 0 & 1 & 0 \\ 0 & 0 & 0 \\ 0 & 0 & 1 \end{bmatrix}, \right.$$

$$\left. \frac{1}{\sqrt{3}}\begin{bmatrix} 1 & 0 & 0 \\ 0 & 0 & 0 \\ 0 & 1 & 0 \\ 0 & 0 & 1 \end{bmatrix}, \frac{1}{\sqrt{3}}\begin{bmatrix} 0 & 0 & 0 \\ 1 & 0 & 0 \\ 0 & 1 & 0 \\ 0 & 0 & 1 \end{bmatrix} \right\}.$$

An example of the rank-3 codebook table is shown in TABLE 14. For rank-4, the total number of rank-4 pre-coding matrices is 7 which can be partitioned as follows. In one example of CB0, the same as rank-4 CB0 in Alt 16-0. In one example of CB1, the same as rank-4 CB1 in Alt 16-0. In one example of CB2, the third codebook comprises 1 rank-4 pre-coding matrix $$\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

that selects 1 out of 4 ports per layer.

An example of the rank-4 codebook table is shown in TABLE 15. The total number of rank 1-4 pre-coders/pre-coding matrices is 28+16+16+7=67. So, if the codebook is used for UL transmission, then the codebook requires 7 bits for joint TRI and TPMI indication.

In a variation of Alt 16-2, the CB2 of rank-2 codebook comprises less than 4 pre-coding matrices, and the CB2 of rank-3 codebook comprises less than 4 pre-coding matrices. For example, the CB2 of rank-2 codebook comprises 3 pre-coding matrices, e.g., $$\left\{ \frac{1}{\sqrt{2}}\begin{bmatrix} 1 & 0 \\ 0 & 1 \\ 0 & 0 \\ 0 & 0 \end{bmatrix}, \frac{1}{\sqrt{2}}\begin{bmatrix} 0 & 0 \\ 1 & 0 \\ 0 & 1 \\ 0 & 0 \end{bmatrix}, \frac{1}{\sqrt{2}}\begin{bmatrix} 0 & 0 \\ 0 & 0 \\ 1 & 0 \\ 0 & 1 \end{bmatrix} \right\}$$

and the CB2 of rank-3 codebook comprises 2 pre-coding matrices, e.g. $\left\{ \frac{1}{\sqrt{3}} \begin{bmatrix} 1 & 0 & 0 \\ 0 & 1 & 0 \\ 0 & 0 & 1 \\ 0 & 0 & 0 \end{bmatrix}, \frac{1}{\sqrt{3}} \begin{bmatrix} 0 & 0 & 0 \\ 1 & 0 & 0 \\ 0 & 1 & 0 \\ 0 & 0 & 1 \end{bmatrix} \right\}.$ So, the total number of rank 1-4 pre-coders/pre-coding matrices is 28+15+14+7=64. So, if the codebook is used for UL transmission, then the codebook requires 6 bits for joint TRI and TPMI indication. The corresponding rank-2 codebook table is obtained from TABLE 13 by replacing the pre-coding matrices corresponding to Codebook indices 12-14 with $p_{24,25}$, $p_{25,26}$ and $p_{26,27}$, respectively, and removing the pre-coding matrix corresponding to Codebook index=15. The corresponding rank-3 codebook table is obtained from TABLE 14 by replacing the pre-coding matrices corresponding to Codebook indices 12-13 with $p_{24,25,26}$ and $p_{25,26,27}$ respectively, and removing the pre-coding matrices corresponding to Codebook indices 14-15.

The scaling factor (a) in rank 1-4 codebooks for this alternative is according to at least one of the following alternatives. In one example of Alt 16-2A, the scaling factor is the same (e.g., a=2) regardless of the UL waveform (DFT-S-OFDM or CP-OFDM) used for UL transmission and rank 1-4. In another example of Alt 16-2B, the scaling factor is the same (e.g., a=2) regardless of the UL waveform (DFT-S-OFDM or CP-OFDM) used for UL transmission for rank 1 only, and the scaling factor for at least one of rank 2-4 can be different from that for rank 1 (e.g. for CP-OFDM). For example, a=$\sqrt{n}$ where n is the number of non-zero entries in a column of a pre-coding matrix, which for codebooks TABLE 13, TABLE 14, and TABLE 15 implies the following. In one instance of Rank 2, a=2 is used for Codebook index 0-7, a=$\sqrt{2}$ is used for Codebook index 8-11, and a=1 is used for Codebook index 12-15 in TABLE 13. IN one instance of Rank 3, a=2 is used for Codebook index 0-7, a=$\sqrt{2}$ is used for Codebook index 8-11, and a=1 is used for Codebook index 12-15 in TABLE 14. In one instance of Rank 4, a=2 is used for Codebook index 0-3, a=$\sqrt{2}$ is used for Codebook index 4-5, and a=1 is used for Codebook index 6 in TABLE 15.

In one example of Alt 16-2C, the scaling factor can be different for the two UL waveforms (DFT-S-OFDM or CP-OFDM) for rank 1. At least one of the following examples is used independently for DFT-S-OFDM and CP-OFDM. In one instance of Ex 16-2A, a=2 is used for Codebook index 0-27 in TABLE 12. In one instance of Ex 16-2B, a=2 is used for Codebook index 0-23, a=$\sqrt{2}$ is used for Codebook index 24-27 in TABLE 12. In one instance of Ex 16-2C, a=2 is used for Codebook index 0-23, a=1 is used for Codebook index 24-27 in TABLE 12. In one instance of Ex 16-2D, a=2 is used for Codebook index 0-15, a=$\sqrt{2}$ is used for Codebook index 16-23, and a=1 is used for Codebook index 24-27 in TABLE 12.

For example, Ex 16-2A is used for DFT-S-OFDM and Ex 16-2D is used for CP-OFDM. The scaling factor for at least one of rank 2-4 can be same or different from that for rank 1 (e.g. for CP-OFDM). If the scaling factor is different, then the scaling factor is according to the example in Alt 16-2B.

In some embodiments Alt 16-3, the rank-1 codebook is the same as in Alt 16-2, and at least one of rank 2-4 codebooks is constructed using a subset of the pre-coders in the rank-1 codebook. At least of the following sub-alternatives is used.

In one example of Alt 16-3A, the rank-2 codebook is a subset of either CB0, CB1, CB2, CB0∪CB1, CB1∪CB2, or CB0∪CB2 where CB0, CB1, and CB2 are rank-2 codebook partitions explained in Alt 16-2. In another example of Alt 16-3B, the rank-3 codebook is a subset of either CB0, CB1, CB2, CB0∪CB1, CB1∪CB2, or CB0∪CB2 where CB0, CB1, and CB2 are rank-3 codebook partitions explained in Alt 16-2. In yet another example of Alt 16-3C, the rank-4 codebook is a subset of either CB0, CB1, CB2, CB0∪CB1, CB1∪CB2, or CB0∪CB2 where CB0, CB1, and CB2 are rank-4 codebook partitions explained in Alt 16-2. In yet another example of Alt 16-3D, a combination of Alt 16-3A and Alt 16-3B. In yet another example of Alt 16-13E, a combination of Alt 16-3A and Alt 16-3C. In yet another example of Alt 16-3F, a combination of Alt 16-3B and Alt 16-3C. In yet another example of Alt 16-3G, a combination of Alt 16-3A, Alt 16-3B, and Alt 16-3C.

The rank 2, rank-3, and rank-4 codebook tables according to any of these sub-alternatives are obtained by selecting a subset of pre-coding matrices (or a subset of Codebook-indices) in TABLE 13, TABLE 14, and TABLE 15, respectively. The scaling factor (a) in rank 1-4 codebook for this alternative is according to at least one of Alt 16-2A, 16-2B, and 16-2C.

TABLE 12

Codebook for transmission on 4 antenna ports {3000,3001,3002,3003} with v = 1

| Codebook (or TPMI) index | Number of layers v = 1 (ordered from left to right in increasing order of TPMI index) |
|---|---|
| 0-7 | $\frac{1}{a}\begin{bmatrix}1\\1\\1\\-1\end{bmatrix}$ $\frac{1}{a}\begin{bmatrix}1\\1\\1\\j\end{bmatrix}$ $\frac{1}{a}\begin{bmatrix}1\\1\\-1\\1\end{bmatrix}$ $\frac{1}{a}\begin{bmatrix}1\\1\\-j\\-j\end{bmatrix}$ $\frac{1}{a}\begin{bmatrix}1\\j\\1\\j\end{bmatrix}$ $\frac{1}{a}\begin{bmatrix}1\\j\\j\\1\end{bmatrix}$ $\frac{1}{a}\begin{bmatrix}1\\j\\-1\\-j\end{bmatrix}$ $\frac{1}{a}\begin{bmatrix}1\\j\\-j\\-1\end{bmatrix}$ |
| 8-15 | $\frac{1}{a}\begin{bmatrix}1\\-1\\1\\1\end{bmatrix}$ $\frac{1}{a}\begin{bmatrix}1\\-1\\j\\-j\end{bmatrix}$ $\frac{1}{a}\begin{bmatrix}1\\-1\\-1\\-1\end{bmatrix}$ $\frac{1}{a}\begin{bmatrix}1\\-1\\-j\\j\end{bmatrix}$ $\frac{1}{a}\begin{bmatrix}1\\-j\\1\\-j\end{bmatrix}$ $\frac{1}{a}\begin{bmatrix}1\\-j\\j\\-1\end{bmatrix}$ $\frac{1}{a}\begin{bmatrix}1\\-j\\-1\\j\end{bmatrix}$ $\frac{1}{a}\begin{bmatrix}1\\-j\\-j\\1\end{bmatrix}$ |
| 16-23 | $\frac{1}{a}\begin{bmatrix}1\\0\\1\\0\end{bmatrix}$ $\frac{1}{a}\begin{bmatrix}1\\0\\-1\\0\end{bmatrix}$ $\frac{1}{a}\begin{bmatrix}1\\0\\j\\0\end{bmatrix}$ $\frac{1}{a}\begin{bmatrix}1\\0\\-j\\0\end{bmatrix}$ $\frac{1}{a}\begin{bmatrix}0\\1\\0\\1\end{bmatrix}$ $\frac{1}{a}\begin{bmatrix}0\\1\\0\\-1\end{bmatrix}$ $\frac{1}{a}\begin{bmatrix}0\\1\\0\\j\end{bmatrix}$ $\frac{1}{a}\begin{bmatrix}0\\1\\0\\-j\end{bmatrix}$ |

TABLE 12-continued

Codebook for transmission on 4 antenna ports {3000,3001,3002,3003} with v = 1

| Codebook (or TPMI) index | Number of layers v = 1 (ordered from left to right in increasing order of TPMI index) |
|---|---|
| 24-27 | $\frac{1}{a}\begin{bmatrix}1\\0\\0\\0\end{bmatrix}$ $\frac{1}{a}\begin{bmatrix}0\\1\\0\\0\end{bmatrix}$ $\frac{1}{a}\begin{bmatrix}0\\0\\1\\0\end{bmatrix}$ $\frac{1}{a}\begin{bmatrix}0\\0\\0\\1\end{bmatrix}$ |

TABLE 13

Codebook for transmission on 4 antenna ports {3000,3001,3002,3003} with v = 2

| Codebook (or TPMI) index | Number of layers v = 2 (ordered from left to right in increasing order of TPMI index) |
|---|---|
| 0-7 | $p_{0,2}$ $p_{1,3}$ $p_{4,6}$ $p_{5,7}$ $p_{8,10}$ $p_{9,11}$ $p_{12,14}$ $p_{13,15}$ |
| 8-15 | $p_{16,17}$ $p_{18,19}$ $p_{20,21}$ $p_{22,23}$ $p_{24,25}$ $p_{25,26}$ $p_{25,27}$ $p_{24,27}$ | where $p_{m,n} = \frac{1}{\sqrt{2}}[v_m \ v_n]$ and $v_m$ and $v_n$ are the rank-1 pre-coders corresponding to Codebook indices m and n, respectively in TABLE 12

TABLE 14

Codebook for transmission on 4 antenna ports {3000,3001,3002,3003} with v = 3

| Codebook (or TPMI) index | Number of layers v = 3 (ordered from left to right in increasing order of TPMI index) |
|---|---|
| 0-7 | $p_{0,2,8}$ $p_{0,2,10}$ $p_{1,3,9}$ $p_{1,3,11}$ $p_{4,6,12}$ $p_{4,6,14}$ $p_{5,7,13}$ $p_{5,7,15}$ |
| 8-15 | $p_{16,17,20}$ $p_{16,17,21}$ $p_{18,19,22}$ $p_{18,19,23}$ $p_{24,25,26}$ $p_{24,25,27}$ $p_{24,26,27}$ $p_{25,26,27}$ | where $p_{m,n,p} = \frac{1}{\sqrt{3}}[v_m \ v_n \ v_p]$ and $v_m$, $v_n$, and $v_p$ are the rank-1 pre-coders corresponding to Codebook indices m, n, and p, respectively in TABLE 12

TABLE 15

Codebook for transmission on antenna ports {3000,3001,3002,3003} with v = 4

| Codebook (or TPMI) index | Number of layers v = 4 (ordered from left to right in increasing order of TPMI index) |
|---|---|
| 0-6 | $p_{0,2,8,10}$ $p_{1,3,9,11}$ $p_{4,6,12,14}$ $p_{5,7,13,15}$ $p_{16,17,20,21}$ $p_{18,19,22,23}$ $p_{24,25,26,27}$ | where $p_{m,n,p,q} = \frac{1}{2}[v_m \ v_n \ v_p \ v_q]$ and $v_m$, $v_n$, $v_p$, and $v_q$ are the rank-1 pre-coders corresponding to Codebook indices m, n, p, and q, respectively in TABLE 12

In some embodiments 16A, the rank-3 and rank-4 codebooks in Embodiment 16 are replaced with the codebooks that are constructed using only BPSK alphabet {1, −1} for pre-coding matrices that select more than 1 ports per layer. The example rank-3 and rank-4 codebook tables are shown in TABLE 16 and TABLE 17, respectively. The scaling factor (a) in these rank 3-4 codebook is according to at least one of Alt 16-0A, 16-0B, 16-0C, Alt 16-2A, 16-2B, and 16-2C.

TABLE 16

Codebook for transmission on 4 antenna ports {3000,3001,3002,3003} with v = 3

| Codebook (or TPMI) index | Number of layers v = 3 (ordered from left to right in increasing order of TPMI index) | | | | | | |
|---|---|---|---|---|---|---|---|
| 0-7 | $P_{0,2,8}$ | $P_{0,2,10}$ | $P_{0,8,10}$ | $P_{2,8,10}$ | $P_{16,17,20}$ | $P_{16,17,21}$ | $P_{16,20,21}$ $P_{17,20,21}$ |
| 8-11 | $P_{24,25,26}$ | $P_{24,25,27}$ | $P_{24,26,27}$ | $P_{25,26,27}$ | | | | where $p_{m,n,p} = \frac{1}{\sqrt{3}}[v_m \ v_n \ v_p]$ and $v_m$, $v_n$, and $v_p$ are the rank-1 pre-coders corresponding to Codebook indices m, n, and p, respectively in TABLE 12

TABLE 17

Codebook for transmission on 4 antenna ports {3000,3001,3002,3003} with v = 4

| Codebook (or TPMI) index | Number of layers v = 4 (ordered from left to right in increasing order of TPMI index) | | |
|---|---|---|---|
| 0-2 | $P_{0,2,8,10}$ | $P_{16,17,20,21}$ | $P_{24,25,26,27}$ | where $p_{m,n,p,q} = \frac{1}{2}[v_m \ v_n \ v_p \ v_q]$ and $v_m$, $v_n$, $v_p$, and $v_q$ are the rank-1 pre-coders corresponding to Codebook indices m, n, p, and q, respectively in TABLE 12

In some embodiment 16B, the codebook partition type (from CB0, CB1, and CB2) in rank 1-4 codebooks as explained in embodiment 16 is determined/configured according to at least one of the following alternatives. In one example of Alt 16B-0, the codebook partition type is fixed for rank 1-4, where the codebook type is either the same for rank 1-4, for example CB0, or different for rank 1-4, for example, CB0 for rank 1, CB1 for rank 2-3, and CB2 for rank 4. In another example of Alt 16B-1, the codebook partition type is fixed for a subset of rank value(s). For example, the codebook type is fixed for rank>r, where r=2 for example. The subset of rank value(s) is either fixed or configured via higher layer (RRC) signaling or MAC CE based signaling or dynamic DCI based signaling. In yet another example of Alt 16B-2, the codebook partition type is configured for all rank via higher layer (RRC) signaling or MAC CE based signaling or dynamic DCI based signaling. This configuration is either common (1 or 2 bits signaling) for all rank or independent for each rank (1 or 2 bits signaling per rank, so 4 or 8 bits for rank 1-4). In yet another example of Alt 16B-3, the codebook partition type is configured for a subset of rank value(s) via higher layer (RRC) signaling or MAC CE based signaling or dynamic DCI based signaling. This configuration is either common (1 or 2 bits signaling) for some rank values(s) or independent for each rank (1 or 2 bits signaling per rank). The subset of rank value(s) is either fixed or configured via higher layer (RRC) signaling or MAC CE based signaling or dynamic DCI based signaling.

In a variation of this embodiment (e.g., embodiment 16X), the codebook partition type (from CB0, CB1, and CB2) in rank 1-4 codebooks as explained in Embodiment 16 is determined/configured using a bitmap B or a field F via either higher layer (RRC) signaling or MAC CE based signaling or dynamic DCI based signaling. If configured via higher layer (e.g. RRC) signaling, then this configuration is an example of a codebook subset restriction on codebook partition type by a gNB to a UE for an uplink codebook through RRC signaling, where the TPMI-related signaling field size (number of bits) in an UL-related DCI is determined according to the number of pre-coding matrices after applying the codebook subset restriction to the UL codebook.

If the bitmap B is common for all rank 1-4, then at least one of the following alternatives is used. In one example of Alt 16B-0, 2-bit bitmap $B=b_0b_1$ is used for the codebook partition type pair (CBx, CBy), where (x, y) is either (0,1), (1,2), or (1,2), where either $b_0$ is the most significant bit (MSB) and $b_1$ is the least significant bit (LSB) or $b_0$ is the LSB and $b_1$ is the MSB. In one example of Alt 16B-1, 3-bit bitmap $B=b_0b_1b_2$ is used the codebook partition type triple (CB0, CB1, CB2), where either $b_0$ is the MSB and $b_2$ is the LSB or $b_0$ is the LSB and $b_2$ is the MSB.

If a bit $b_i=0$, then the corresponding codebook partition type CBi is not used for TPMI indication, and if a bit $b_i=1$, then the corresponding codebook partition type CBi is used for TPMI indication. Alternatively, if a bit $b_i=1$, then the corresponding codebook partition type CBi is not used for TPMI indication, and if a bit $b_i=0$, then the corresponding codebook partition type CBi is used for TPMI indication.

If the bitmap B is independent for all or a subset of rank 1-4, then the bitmap B is a concatenation of R bitmaps $B_0 \ldots B_{R-1}$, where R is the number of rank values that we have independent bitmap for. For example, R=4, then the bitmap B is a concatenation of 4 bitmaps $B_0 \ldots B_3$, where $B_0$ is the bitmap for rank value 1, and $B_3$ is the bitmap for rank value 4, or, $B_0$ is the bitmap for rank value 4, and $B_3$ is the bitmap for rank value 1. For each bitmap $B_1$, at least one of Alt 16B-0 or Alt 16B-1 is used. So, the maximum length of the bitmap is 8 bits (Alt 16B-0) or 12 bits (Alt 16B-1).

For TPMI indication in the UL-related DCI, the TPMI payload (number of bits) can remain the same (unaffected) regardless of whether all of or a subset of the three codebook partition types (CB0, CB1, CB2) are used to determine the pre-coding matrix indicate by the TPMI. For example, for the TPMI payload, it can be assumed that pre-coding matrices for all three types of codebook partition types are used. Alternatively, the TPMI payload is adjusted according to the codebook partition types that are used. An example TPMI and transmit rank indicator (TRI) payload size table (assuming CB0, CB1, CB2 can be used for TPMI indication) is shown in TABLE 18 where the rank 1-4 codebooks are assumed to be TABLE 12, TABLE 13, TABLE 14, and TABLE 15. If any two of CB0, CB1, CB2 can be used for TPMI indication, then the table reduces to 3 rows from TABLE 18 (2 for one of the two codebook partition types and 1 for both codebook partition types).

In one alternative (Alt 16X-1-0), if the UE is capable of partial coherence, then it is also capable of non-coherence. Therefore, a 2-bit bitmap B can be used to configure one of the 3 possible sets of pre-coders (or codebook partition type combinations). Two example tables for this configuration and corresponding TPMI overhead (number of bits) are

TABLE 18

TPMI and TRI payload

| Bitmap | | | Separate TPMI and TRI indication bits (2 bits for TRI) | | | | Joint TPMI and |
| --- | --- | --- | --- | --- | --- | --- | --- |
| CB2 | CB1 | CB0 | Rank 1 | Rank 2 | Rank 3 | Rank 4 | TRI indication bits |
| 0 | 0 | 1 | $\lceil \log_2(16) \rceil = 4$ | $\lceil \log_2(8) \rceil = 3$ | $\lceil \log_2(8) \rceil = 3$ | $\lceil \log_2(4) \rceil = 2$ | $\lceil \log_2(16 + 8 + 8 + 4) \rceil = 5$ |
| 0 | 1 | 0 | $\lceil \log_2(8) \rceil = 3$ | $\lceil \log_2(4) \rceil = 2$ | $\lceil \log_2(4) \rceil = 2$ | $\lceil \log_2(2) \rceil = 1$ | $\lceil \log_2(8 + 4 + 4 + 2) \rceil = 5$ |
| 1 | 0 | 0 | $\lceil \log_2(4) \rceil = 2$ | $\lceil \log_2(4) \rceil = 2$ | $\lceil \log_2(4) \rceil = 2$ | $\lceil \log_2(1) \rceil = 0$ | $\lceil \log_2(4 + 4 + 4 + 1) \rceil = 4$ |
| 0 | 1 | 1 | $\lceil \log_2(16 + 8) \rceil = 5$ | $\lceil \log_2(8 + 4) \rceil = 4$ | $\lceil \log_2(8 + 4) \rceil = 4$ | $\lceil \log_2(4 + 2) \rceil = 3$ | $\lceil \log_2(24 + 12 + 12 + 6) \rceil = 6$ |
| 1 | 0 | 1 | $\lceil \log_2(16 + 4) \rceil = 5$ | $\lceil \log_2(8 + 4) \rceil = 4$ | $\lceil \log_2(8 + 4) \rceil = 4$ | $\lceil \log_2(4 + 1) \rceil = 3$ | $\lceil \log_2(20 + 12 + 12 + 5) \rceil = 6$ |
| 1 | 1 | 0 | $\lceil \log_2(8 + 4) \rceil = 4$ | $\lceil \log_2(4 + 4) \rceil = 3$ | $\lceil \log_2(4 + 4) \rceil = 3$ | $\lceil \log_2(2 + 1) \rceil = 2$ | $\lceil \log_2(12 + 8 + 8 + 3) \rceil = 5$ |
| 1 | 1 | 1 | $\lceil \log_2(16 + 8 + 4) \rceil = 5$ | $\lceil \log_2(8 + 4 + 4) \rceil = 4$ | $\lceil \log_2(8 + 4 + 4) \rceil = 4$ | $\lceil \log_2(4 + 2 + 1) \rceil = 3$ | $\lceil \log_2(28 + 16 + 16 + 7) \rceil = 7$ |

Note that in this variation (16X), the bitmap to configure codebook partition types remains the same regardless of the UE capability for UL transmission. As an example, the UE can be capable of at least one of the following UL transmission. In one example of full coherence, all ports can be transmitted coherently. In one example of partial coherence, port pairs can be transmitted coherently. In one example of non-coherence, no port pairs can be transmitted coherently.

A variation in which the bitmap B depends on the UE capability is provided next. The rank 1 codebook TABLE 12 is assumed for TPMI as an example in the variations (16X-1 and 16X-2) below. For rank>1 TPMI, codebook tables for rank>1 proposed in the present disclosure can be used.

In a variation of this embodiment (e.g., embodiment 16X-1), the codebook configuration or partition type (from CB0, CB1, and CB2) in rank 1-4 codebooks as explained in embodiment 16 is determined/configured based on UE capability (indicated by the UE) for UL transmission using a bitmap B via either higher layer (RRC) signaling or MAC CE based signaling or dynamic DCI based signaling. If configured via higher layer (e.g. RRC) signaling, then this configuration is an example of a codebook subset restriction on codebook partition type by a gNB to a UE for an uplink codebook through RRC signaling, where the TPMI-related signaling field size (number of bits) in an UL-related DCI is determined according to the number of pre-coding matrices after applying the codebook subset restriction to the UL codebook. At least one of the following alternatives can be used for CBSR via RRC signaling.

In one alternative (Alt 16X-1-0), if the UE is capable of full coherence, then it is also capable of partial coherence and non-coherence. Therefore, a 3-bit bitmap B can be used to configure one of the 7 possible sets of pre-coders (or codebook partition type combinations). Two example tables for this configuration and corresponding TPMI overhead (number of bits) are shown in TABLE 19 and TABLE 20. Alternatively, a 2-bit field F is used to configure one of the three codebook partition types (CB0, CB1, and CB2) where, for example, CB0, CB1, and CB2 are indicated by F=00, 01, 10, or 10, 01, 00, respectively.

shown in TABLE 21 and TABLE 22. Alternatively, a 1-bit field F is used to configure one of the two codebook partition types (CB1 and CB2) where, for example, CB1 and CB2 are indicated by F=0 and 1 or 1 and 0, respectively.

In one alternative (Alt 16X-1-0), if the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

TABLE 19

Codebook configuration and TPMI payload

| | Bitmap for TPMI index (TABLE 12) | | | |
| --- | --- | --- | --- | --- |
| CBSR bitmap field | CB2: 24-27 | CB1: 16-23 | CB0: 0-15 | TPMI bits |
| 0 | 0 | 0 | 1 | 4 |
| 1 | 0 | 1 | 0 | 3 |
| 2 | 1 | 0 | 0 | 2 |
| 3 | 0 | 1 | 1 | 5 |
| 4 | 1 | 0 | 1 | 5 |
| 5 | 1 | 1 | 0 | 4 |
| 6 | 1 | 1 | 1 | 5 |

TABLE 20

Codebook configuration and TPMI payload

| | Bitmap for TPMI index (TABLE 12) | | | |
| --- | --- | --- | --- | --- |
| CBSR bitmap field | CB0: 0-15 | CB1: 16-23 | CB2: 24-27 | TPMI bits |
| 0 | 0 | 0 | 1 | 2 |
| 1 | 0 | 1 | 0 | 3 |
| 2 | 1 | 0 | 0 | 4 |
| 3 | 0 | 1 | 1 | 4 |
| 4 | 1 | 0 | 1 | 5 |
| 5 | 1 | 1 | 0 | 5 |
| 6 | 1 | 1 | 1 | 5 |

TABLE 21

Codebook configuration and TPMI payload

| CBSR bitmap field | Bitmap for TPMI index (TABLE 12) | | TPMI bits |
| --- | --- | --- | --- |
| | CB2: 24-27 | CB1: 16-23 | |
| 0 | 0 | 1 | 3 |
| 1 | 1 | 0 | 2 |
| 2 | 1 | 1 | 4 |

TABLE 22

Codebook configuration and TPMI payload

| CBSR bitmap field | Bitmap for TPMI index (TABLE 12) | | TPMI bits |
| --- | --- | --- | --- |
| | CB1: 16-23 | CB2: 24-27 | |
| 0 | 0 | 1 | 2 |
| 1 | 1 | 0 | 3 |
| 2 | 1 | 1 | 4 |

In another alternative (Alt 16X-1-1), if the UE is capable of full coherence, then it is also capable of partial coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 23 and TABLE 24. Alternatively, a 1-bit field F is used to configure one of the two codebook partition types (CB0 and CB1) where, for example, CB0 and CB1 are indicated by F=0 and 1 or 1 and 0, respectively.

In another alternative (Alt 16X-1-1), if the UE is capable of partial coherence, then it is also capable of non-coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 21 and TABLE 22. Alternatively, a 1-bit field F is used to configure one of the two codebook partition types (CB1 and CB2) where, for example, CB1 and CB2 are indicated by F=0 and 1 or 1 and 0, respectively.

In another alternative (Alt 16X-1-1), if the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

TABLE 23

Codebook configuration and TPMI payload

| CBSR bitmap field | Bitmap for TPMI index (TABLE 12) | | TPMI bits |
| --- | --- | --- | --- |
| | CB1: 16-23 | CB0: 0-15 | |
| 0 | 0 | 1 | 4 |
| 1 | 1 | 0 | 3 |
| 2 | 1 | 1 | 5 |

TABLE 24

Codebook configuration and TPMI payload

| CBSR bitmap field | Bitmap for TPMI index (TABLE 12) | | TPMI bits |
| --- | --- | --- | --- |
| | CB0: 0-15 | CB1: 16-23 | |
| 0 | 0 | 1 | 3 |
| 1 | 1 | 0 | 4 |
| 2 | 1 | 1 | 5 |

In another alternative (Alt 16X-1-2), if the UE is capable of full coherence, then it is also capable of partial coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 23 and TABLE 24. Alternatively, a 1-bit field F is used to configure one of the two codebook partition types (CB0 and CB1) where, for example, CB0 and CB1 are indicated by F=0 and 1 or 1 and 0, respectively.

In another alternative (Alt 16X-1-2), if the UE is capable of non-coherence, then it is only capable, if the UE is capable of partial coherence, then it is only capable of partial coherence. Hence, the set of pre-coders (or codebook partition type) is fixed (CB1), and there is no need for additional signaling for codebook or partition type configuration via RRC. Note that TPMI payload is 3 bits in this case.

In another alternative (Alt 16X-1-2), if the UE is capable of non-coherence, then it is only capable, if the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

In another alternative (Alt 16X-1-3), if the UE is capable of partial coherence, then it is also capable of non-coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 21 and TABLE 22. Alternatively, a 1-bit field F is used to configure one of the two codebook partition types (CB1 and CB2) where, for example, CB1 and CB2 are indicated by F=0 and 1 or 1 and 0, respectively.

In another alternative (Alt 16X-1-3), if the UE is capable of full coherence, then it is only capable of full coherence. Hence, the set of pre-coders (or codebook partition type) is fixed (CB0), and there is no need for additional signaling for codebook or partition type configuration via RRC. Note that TPMI payload is 4 bits in this case.

In another alternative (Alt 16X-1-3), if the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

In a variation of the embodiment (embodiment 16X-2), the codebook configuration or partition type (from CB0, CB1, and CB2) in rank 1-4 codebooks as explained in embodiment 16 is determined based on UE capability (indicated by the UE) for UL transmission without any signaling/configuration. The PMI payload is adjusted based on the UE capability. At least one of the following alternatives is used.

In one example of Alt 16X-2-0, the codebook partition type is one-to-one mapped to the UE capability for UL transmission. For example, if the UE is capable of full coherence, then CB0 is used as the UL codebook and the TPMI payload is 4 bits, if the UE is capable of partial coherence, then CB1 is used as the UL codebook and the TPMI payload is 3 bits, and if the UE is capable of non-coherence, then CB2 is used as the UL codebook and the TPMI payload is 2 bits.

In another example of Alt 16X-2-1, the codebook partition type is either (CB0, CB1) for full and partial coherence or CB2 for non-coherence where the TPMI payload is fixed to be 5 bits for the former and 2 bits for the later.

In yet another example of Alt 16X-2-2, the codebook partition type is either (CB1, CB2) for partial and non-coherence or CB0 for full coherence where the TPMI payload is fixed to be 4 bits for the former as well as for the later. In yet another example of Alt 16X-2-3, the codebook partition type is either (CB0, CB2) for full and non-coherence or CB1 for partial coherence where the TPMI payload is fixed to be 5 bits for the former and 3 bits for the later.

In a variation of this embodiment (embodiment 16Y), a codebook subset restriction (CBSR) is configured by a gNB to a UE on an UL codebook (e.g. rank 1-4 codebook in embodiment 16) using a bitmap B via RRC signaling, where the bitmap restricts the use of each pre-coding matrix in the codebook for TPMI indication. In on example, the bitmap B is a concatenation of R bitmaps $B_0 \ldots B_{R-1}$, where R is the number of rank values that we have CBSR for. For example, R=4, then the bitmap B is a concatenation of 4 bitmaps $B_0 \ldots B_3$, where $B_0$ is the bitmap for rank value 1, and $B_3$ is the bitmap for rank value 4, or, $B_0$ is the bitmap for rank value 4, and $B_3$ is the bitmap for rank value 1. So, the total length of the bitmap is $N=\Sigma_{i=1}^{4} N_i$ where $N_i$ is the number of pre-coding matrices in rank-i codebook. In another example, TPMI-related signaling field size (number of bits) in an UL-related DCI is determined according to the number of pre-coding matrices after applying the codebook subset restriction to the UL codebook.

In a variation of this embodiment (embodiment 16Z), a codebook subset restriction (CBSR) is configured by a gNB to a UE on an UL codebook (e.g. rank 1-4 codebook in embodiment 16) using a bitmap B or a state configuration S via RRC signaling, where the bitmap or the state configuration restricts the use of a group of pre-coding matrices in the codebook for TPMI indication. An example of pre-coder grouping is explained in embodiment 7, where the first TPMI ($i_1$) is used for pre-coder groups, and the second TPMI ($i_2$) is used for pre-coders in each pre-coder group. The CBSR then restricts the first TPMI ($i_1$).

In embodiment 16C, the rank 2-4 codebooks are the same as in embodiment 16, and the rank-1 codebook table includes 4 additional rank-2 pre-coders (Codebook indices 28-31). A few examples of four additional pre-coders are as follows:

$$\left\{ \frac{1}{b}\begin{bmatrix}1\\1\\1\\0\end{bmatrix}, \frac{1}{b}\begin{bmatrix}1\\1\\0\\1\end{bmatrix}, \frac{1}{b}\begin{bmatrix}1\\0\\1\\1\end{bmatrix}, \frac{1}{b}\begin{bmatrix}0\\1\\1\\1\end{bmatrix} \right\}$$

where the normalization factor b=2 or $\sqrt{3}$;

$$\left\{ \frac{1}{b}\begin{bmatrix}1\\1\\0\\0\end{bmatrix}, \frac{1}{b}\begin{bmatrix}1\\-1\\0\\0\end{bmatrix}, \frac{1}{b}\begin{bmatrix}1\\j\\0\\0\end{bmatrix}, \frac{1}{b}\begin{bmatrix}1\\-j\\0\\0\end{bmatrix} \right\}$$

where the normalization factor b=2 or $\sqrt{2}$; and $$\left\{ \frac{1}{b}\begin{bmatrix}0\\0\\1\\1\end{bmatrix}, \frac{1}{b}\begin{bmatrix}0\\0\\1\\-1\end{bmatrix}, \frac{1}{b}\begin{bmatrix}0\\0\\1\\j\end{bmatrix}, \frac{1}{b}\begin{bmatrix}0\\0\\1\\-j\end{bmatrix} \right\}$$

where the normalization factor b=2 or $\sqrt{2}$.

In some embodiments 17, the rank 2 codebook comprises at least one of the following four types of codebooks (CB). In one example, CB0 is either a subset or all of rank-2 precoding matrices $$p_{m,n} = \frac{1}{c}[v_m \ v_n]$$

in CB0 in embodiment 16/16A/16B/16C, and the example of normalization factor is c=2 or $\sqrt{2}$. In another example, CB1 is either a subset or all of rank-2 precoding matrices $$p_{m,n} = \frac{1}{c}[v_m \ v_n]$$

in CB1 in embodiment 16/16A/16B/16C and the example of normalization factor is c=2 or $\sqrt{2}$. In yet another example, CB2 is either a subset or all of rank-2 precoding matrices $$p_{m,n} = \frac{1}{c}[v_m \ v_n]$$

in CB2 in embodiment 16/16A/16B/16C and the example of normalization factor is c=2 or $\sqrt{2}$. In yet another example, CB3 is either a subset or all of rank-2 precoding matrices in the LTE UL 4-Tx rank-2 codebook and where the pre-coder for each layer (columns of the pre-coding matrix) is normalized to $$\frac{1}{\sqrt{2}} \text{ or } \frac{1}{2}.$$

In such examples $v_m$ and $v_n$ are the rank-1 pre-coders corresponding to Codebook indices m and n, respectively.

The rank-2 codebook table is according to at least one of the following alternatives. In one example of Alt 17-0, a subset or all of rank-2 precoding matrices in CB0 and CB3. An example rank-2 codebook table is shown in TABLE 25. In another example of Alt 17-1, a subset or all of rank-2 precoding matrices in CB0, CB2, and CB3. Four example rank-2 codebook tables are shown in TABLEs 26-31.

TABLE 25

Codebook for transmission on 4 antenna ports {3000, 3001, 3002, 3003} with ν = 2

| Codebook (or TPMI) index | Number of layers ν = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{8,10}$ | $p_{9,11}$ | $p_{12,14}$ | $p_{13,15}$ |
| 24-31 | $p_{0,8}$ | $p_{1,9}$ | $p_{2,10}$ | $p_{3,11}$ | $p_{4,12}$ | $p_{5,13}$ | $p_{6,14}$ | $p_{7,15}$ |

TABLE 26

Codebook for transmission on 4 antenna ports {3000, 3001, 3002, 3003} with ν = 2

| Codebook (or TPMI) index | Number of layers ν = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{8,10}$ | $p_{9,11}$ | $p_{12,14}$ | $p_{13,15}$ |
| 24-31 | $p_{0,8}$ | $p_{1,9}$ | $p_{2,10}$ | $p_{3,11}$ | $p_{4,12}$ | $p_{5,13}$ | $p_{6,14}$ | $p_{7,15}$ |

TABLE 27

Codebook for transmission on 4 antenna ports {3000, 3001, 3002, 3003} with ν = 2

| Codebook (or TPMI) index | Number of layers ν = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{8,10}$ | $p_{9,11}$ | $p_{12,14}$ | $p_{13,15}$ |
| 24-31 | $p_{0,8}$ | $p_{1,9}$ | $p_{2,10}$ | $p_{3,11}$ | $p_{24,25}$ | $p_{25,26}$ | $p_{25,27}$ | $p_{24,27}$ |

TABLE 28

Codebook for transmission on 4 antenna ports {3000, 3001, 3002, 3003} with ν = 2

| Codebook (or TPMI) index | Number of layers ν = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{8,10}$ | $p_{9,11}$ | $p_{12,14}$ | $p_{13,15}$ |
| 24-27 | $p_{24,25}$ | $p_{24,27}$ | $p_{24,26}$ | $p_{25,26}$ | | | | |

TABLE 29A

Codebook for transmission on 4 antenna ports {3000, 3001, 3002, 3003} with ν = 2

| Codebook (or TPMI) index | Number of layers ν = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{8,10}$ | $p_{9,11}$ | $p_{12,14}$ | $p_{13,15}$ |
| 24-29 | $p_{24,25}$ | $p_{24,27}$ | $p_{24,26}$ | $p_{25,26}$ | $p_{25,27}$ | $p_{26,27}$ | | |

TABLE 29B

Codebook for transmission on 4 antenna ports {3000, 3001, 3002, 3003} with v = 2

| Codebook (or TPMI) index | Number of layers v = 2 (ordered from left to right in increasing order of TPMI index) | | | | | | | |
|---|---|---|---|---|---|---|---|---|
| 0-15 | Rank-2 pre-coding matrices in LTE UL 4-Tx Codebook | | | | | | | |
| 16-23 | $p_{0,2}$ | $p_{1,3}$ | $p_{4,6}$ | $p_{5,7}$ | $p_{24,25}$ | $p_{25,26}$ | $p_{25,27}$ | $p_{24,27}$ |

TABLE 30

Codebook for transmission on 4 antenna ports {3000, 3001, 3002, 3003} with v = 2

| Codebook (or TPMI) index | Number of layers v = 2 (ordered from left to right in increasing order of TPMI index) | | | | | | | |
|---|---|---|---|---|---|---|---|---|
| 0-7 | Codebook indices 0-7 in rank-2 pre-coding matrices in LTE UL 4-Tx Codebook | | | | | | | |
| 8-15 | $p_{0,2}$ | $p_{1,3}$ | $p_{4,6}$ | $p_{5,7}$ | $p_{24,25}$ | $p_{25,26}$ | $p_{25,27}$ | $p_{24,27}$ |

TABLE 31

Codebook for transmission on 4 antenna ports {3000, 3001, 3002, 3003} with v = 2

| Codebook (or TPMI) index | Number of layers v = 2 (ordered from left to right in increasing order of TPMI index) | | | | | | | |
|---|---|---|---|---|---|---|---|---|
| 0-7 | Codebook indices {0, 1, 4, 5, 8, 9, 12, 13} in rank-2 pre-coding matrices in LTE UL 4-Tx Codebook | | | | | | | |
| 8-15 | $p_{0,2}$ | $p_{1,3}$ | $p_{4,6}$ | $p_{5,7}$ | $p_{24,25}$ | $p_{25,26}$ | $p_{25,27}$ | $p_{24,27}$ |

In some embodiments 18, the rank 3 codebook comprises at least one of the following four types of codebooks (CB). In one example, CB0 is either a subset or all of rank-3 precoding matrices $$p_{m,n,p} = \frac{1}{c}[v_m \ v_n \ v_p]$$

in CB0 in embodiment 16/16A/16B/16C, and the example of normalization factor is c=2 or $\sqrt{3}$. In another example, CB1 is either a subset or all of rank-3 precoding matrices $$p_{m,n,p} = \frac{1}{c}[v_m \ v_n \ v_p]$$

in CB1 in embodiment 16/16A/16B/16C and the example of normalization factor is c=2 or $\sqrt{3}$. In yet another example, CB2 is either a subset or all of rank-3 precoding matrices $$p_{m,n,p} = \frac{1}{c}[v_m \ v_n \ v_p]$$

in CB2 in embodiment 16/16A/16B/16C and the example of normalization factor is c=2 or $\sqrt{3}$. In yet another example, CB3 is either a subset or all of rank-3 precoding matrices in the LTE UL 4-Tx rank-3 codebook and where the pre-coder for each layer (columns of the pre-coding matrix) is normalized to $\frac{1}{\sqrt{3}}$ or $\frac{1}{2}$.

In such example, $v_m$, $v_n$, and $v_p$ are the rank-1 pre-coders corresponding to Codebook indices m, n, and p respectively.

The rank-3 codebook table is according to at least one of the following alternatives. In one example of Alt 18-0, a subset or all of rank-3 precoding matrices in CB0 and CB3. An example rank-3 codebook table is shown in TABLE 32. In another example of Alt 18-1, a subset or all of rank-3 precoding matrices in CB0, CB2, and CB3. An example rank-3 codebook tables is shown in TABLE 33.

TABLE 32

Codebook for transmission on 4 antenna ports {3000, 3001, 3002, 3003} with v = 3

| Codebook (or TPMI) index | Number of layers v = 3 (ordered from left to right in increasing order of TPMI index) | | | |
|---|---|---|---|---|
| 0-11 | Rank-3 pre-coding matrices in LTE UL 4-Tx Codebook | | | |
| 12-15 | $p_{0,2,8}$ | $p_{0,2,10}$ | $p_{0,8,10}$ | $p_{2,8,10}$ |

TABLE 33

Codebook for transmission on 4 antenna ports {3000, 3001, 3002, 3003} with ν = 3

| Codebook (or TPMI) index | Number of layers ν = 3 (ordered from left to right in increasing order of TPMI index) | | | | | | | |
|---|---|---|---|---|---|---|---|---|
| 0-11 | Rank-3 pre-coding matrices in LTE UL 4-Tx Codebook | | | | | | | |
| 12-19 | $P_{0,2,8}$ | $P_{0,2,10}$ | $P_{0,8,10}$ | $P_{2,8,10}$ | $P_{24,25,26}$ | $P_{24,25,27}$ | $P_{24,26,27}$ | $P_{25,26,27}$ |

In some embodiments 19, the rank 4 codebook comprises at least one of the following four types of codebooks (CB). In one example, CB0 is either a subset or all of rank-4 precoding matrices $$p_{m,n,p,q} = \frac{1}{c}[v_m \quad v_n \quad v_p \quad v_q]$$

in CB0 in embodiment 16/16A/16B/16C, and the example of normalization factor is c=2. In another example, CB1 is either a subset or all of rank-4 precoding matrices $$p_{m,n,p,q} = \frac{1}{c}[v_m \quad v_n \quad v_p \quad v_q]$$

in CB1 in embodiment 16/16A/16B/16C and the example of normalization factor is c=2. In yet another example, CB2 is either a subset or all of rank-4 precoding matrices $$p_{m,n,p,q} = \frac{1}{c}[v_m \quad v_n \quad v_p \quad v_q]$$

in CB2 in embodiment 16/16A/16B/16C and the example of normalization factor is c=2. In yet another example, CB3 is either a subset or all of rank-4 precoding matrices in the LTE UL 4-Tx rank-4 codebook and where the pre-coder for each layer (columns of the pre-coding matrix) is normalized to ½. In such examples, $v_m$, $v_n$, $v_p$, and $v_q$ are the rank-1 pre-coders corresponding to Codebook indices m, n, p, and p respectively.

The rank-4 codebook table is according to at least one of the following alternatives. In one example of Alt 19-0, a subset or all of rank-4 precoding matrices in CB0 and CB3. An example rank-4 codebook table is shown in TABLE 34. In another example of Alt 19-1, a subset or all of rank-4 precoding matrices in CB0, CB1, and CB3. An example rank-4 codebook tables is shown in TABLE 35.

TABLE 34

Codebook for transmission on 4 antenna ports {3000, 3001, 3002, 3003} with ν = 4

| Codebook (or TPMI) index | Number of layers ν = 4 |
|---|---|
| 0 | Rank-4 pre-coding matrix in LTE UL 4-Tx Codebook |
| 1 | $P_{0,2,8,10}$ |

TABLE 35

Codebook for transmission on 4 antenna ports {3000, 3001, 3002, 3003} with ν = 4

| Codebook (or TPMI) index | Number of layers ν = 4 |
|---|---|
| 0 | Rank-4 pre-coding matrix in LTE UL 4-Tx Codebook |
| 1 | $P_{0,2,8,10}$ |
| 2 | $P_{16,17,20,21}$ |

In the aforementioned embodiments 16/17/18/19, the mapping of Codebook index to pre-coders or pre-coding matrices in the codebook tables are for illustration only. The any other mapping is also included in these embodiments.

In some embodiment 20, for N=2, the rank-1 codebook is the LTE UL 2-Tx rank-1 codebook, except the scaling (or power normalization) factor (a) in pre-coders which is either a=1 or a=2 or a=√2. The total number of pre-coders in the rank-1 codebook is 6. The rank-1 codebook can be partitioned into two types of codebooks (CB). In one example of CB0, the first codebook comprises 4 pre-coders that combine 2 ports (both entries in a pre-coder are non-zero). In other words, the pre-coders assume full coherence that 2 ports can be transmitted coherently. In another example of CB1, the second codebook comprises 2 port selection pre-coders that select 1 out of 2 ports (1 entry in a pre-coder is non-zero and the remaining 1 entry is zero). In other words, the pre-coders assume non-coherence that the 2 ports can't be transmitted coherently.

The rank 2 codebook is constructed using all pre-coders in the rank-1 codebook. Similar to rank-1, rank 2 codebook can also be partitioned into two types of codebooks (CB). For example, the total number of rank-2 pre-coding matrices is 3 which can be partitioned as follows. In one example of CB0, the first codebook comprises 2 rank-2 pre-coding matrices that combines all 2 ports per layer (i.e., both entries in a pre-coder for each layer is non-zero). In another example of CB1, the second codebook comprises 1 rank-2 pre-coding matrix that selects 1 out of 2 ports per layer (i.e., 1 entry in a pre-coder for each layer is non-zero and the remaining 1 entry is zero).

An example of the rank-1 and rank-2 codebook is shown in TABLE 36. The scaling factor (a) in rank 1-2 codebook is according to at least one of the following alternatives. In one example of Alt 20A, the scaling factor is the same (e.g., a=√2) regardless of the UL waveform (DFT-S-OFDM or CP-OFDM) used for UL transmission and rank 1-2. In another example of Alt 20B, the scaling factor is the same (e.g., a=√2) regardless of the UL waveform (DFT-S-OFDM or CP-OFDM) used for UL transmission for rank 1 only, and the scaling factor for rank 2 can be different from that for rank 1 (e.g. for CP-OFDM).

For example, a=√n where n is the number of non-zero entries in a column of a pre-coding matrix, which for the codebook in TABLE 36 implies the following. In one instance of Rank 2, a=√2 is used for Codebook index 0-1 and a=1 is used for Codebook index 2 in TABLE 36.

In yet another example of Alt 20C, the scaling factor can be different for the two UL waveforms (DFT-S-OFDM or CP-OFDM) for rank 1. At least one of the following examples is used independently for DFT-S-OFDM and CP-OFDM. In one instance of Ex 20A, a=√2 is used for Codebook index 0-5 in TABLE 36. In one instance of Ex 20B, a=√2 is used for Codebook index 0-3 and a=1 is used for Codebook index 4-5 in TABLE 36. In one instance of Ex 20C, a=√2 is used for Codebook index 0-3 and a=2 is used for Codebook index 4-5 in TABLE 36. For example, Ex 20A or Ex 20C is used for DFT-S-OFDM and Ex 20B is used for CP-OFDM. The scaling factor for rank 2 can be same or different from that for rank 1 (e.g. for CP-OFDM). If the scaling factor is different, then the scaling factor is according to the example in Alt 20B.

It is straightforward to extend to the embodiments (e.g. the aforementioned embodiments 16B/16X/16Y/16Z and their variations) on codebook partition type determination/configuration and codebook subset restriction N=2 ports case.

TABLE 36

Codebook for transmission on 2 antenna ports {3000,3001} and rank v

| Codebook (or TPMI) index | v = 1 | v = 2 |
|---|---|---|
| 0 | $\frac{1}{a}\begin{bmatrix}1\\1\end{bmatrix}$ | $\frac{1}{a\sqrt{2}}\begin{bmatrix}1 & 1\\1 & -1\end{bmatrix}$ |
| 1 | $\frac{1}{a}\begin{bmatrix}1\\-1\end{bmatrix}$ | $\frac{1}{a\sqrt{2}}\begin{bmatrix}1 & 1\\j & -j\end{bmatrix}$ |
| 2 | $\frac{1}{a}\begin{bmatrix}1\\j\end{bmatrix}$ | $\frac{1}{a\sqrt{2}}\begin{bmatrix}1 & 0\\0 & 1\end{bmatrix}$ |
| 3 | $\frac{1}{a}\begin{bmatrix}1\\-j\end{bmatrix}$ | |
| 4 | $\frac{1}{a}\begin{bmatrix}1\\0\end{bmatrix}$ | |
| 5 | $\frac{1}{a}\begin{bmatrix}0\\1\end{bmatrix}$ | |

For 4 antenna ports [port #'s to be added], . . . , and the UE configured with higher layer parameter CodebookType set to 'Type1-SinglePanel', except when the number of layers υ∈{2,3,4}, each PMI value corresponds to three codebook indices $i_{1,1}$, $i_{1,2}$, $i_2$. When the number of layers υ∈{2,3,4}), each PMI value corresponds to four codebook indices $i_{1,1}$, $i_{1,2}$, $i_{1,3}$, $i_2$. The codebooks . . . are given respectively in TABLEs 37A-G. The mapping from $i_{1,3}$ to $k_1$ and $k_2$ for 2-layer reporting is given in TABLE 37B. The mapping from $i_{1,3}$ to $k_1$ and $k_2$ for 3-layer and 4-layer reporting when $P_{CSI-RS}<16$ is given in TABLE 37C. The quantities $\varphi_n$, . . . , $u_m$, $v_{l,m}$, and . . . are given by $$\varphi_n = e^{j\pi n/2}$$

$$u_m = \begin{cases} \begin{bmatrix} 1 & e^{j\frac{2\pi m}{O_2 N_2}} & \cdots & e^{j\frac{2\pi m(N_2-1)}{O_2 N_2}} \end{bmatrix} & N_2 > 1 \\ 1 & N_2 = 1 \end{cases}$$

$$v_{l,m} = \begin{bmatrix} u_m & e^{j\frac{2\pi l}{O_1 N_1}} u_m & \cdots & e^{j\frac{2\pi l(N_1-1)}{O_1 N_1}} u_m \end{bmatrix}^T$$

The values of $N_1$ and $N_2$ are configured with the higher layer parameters CodebookConfig-N1 and CodebookConfig-N2, respectively. The supported configurations of $(N_1, N_2)$ for a given number of CSI-RS ports and the corresponding values of $(O_1, O_2)$ are given in TABLE 37A. The number of CSI-RS ports, $P_{CSI-RS}$, is $2N_1N_2$. A UE may only use $i_{1,2}=0$ and may not report $i_{1,2}$ if the value of CodebookConfig-N2 is set to 1.

TABLE 37A

Supported configurations of $(N_1, N_2)$ and $(O_1, O_2)$

| Number of CSI-RS antenna ports, $P_{CSI-RS}$ | $(N_1, N_2)$ | $(O_1, O_2)$ |
|---|---|---|
| 4 | (2, 1) | (4, 1) |

TABLE 37B

Mapping of $i_{1,3}$ to $k_1$ and $k_2$ for 2-layer CSI reporting

| | $N_1 = 2$, $N_2 = 1$ | |
|---|---|---|
| $i_{1,3}$ | $k_1$ | $k_2$ |
| 0 | 0 | 0 |
| 1 | $O_1$ | 0 |
| 2 | | |
| 3 | | |

TABLE 37C

Mapping of $i_{1,3}$ to $k_1$ and $k_2$ for 3-layer and 4-layer CSI reporting when $P_{CSI-RS} < 16$

| | $N_1 = 2$, $N_2 = 1$ | |
|---|---|---|
| $i_{1,3}$ | $k_1$ | $k_2$ |
| 0 | $O_1$ | 0 |
| 1 | | |
| 2 | | |
| 3 | | |

TABLE 37D

Codebook for 1-layer CSI reporting using antenna ports [3000 to 2999 + $P_{CSI-RS}$]
CodebookMode = 1

| $i_{1,1}$ | $i_{1,2}$ | $i_2$ | |
|---|---|---|---|
| 0, 1, . . . , $N_1O_1 - 1$ | 0, . . . , $N_2O_2 - 1$ | 0, 1, 2, 3 | $W^{(1)}_{i_{1,1},i_{1,2},i_2}$ | where $W^{(1)}_{l,m,n} = \frac{1}{\sqrt{P_{CSI-RS}}} \begin{bmatrix} v_{l,m} \\ \varphi_n v_{l,m} \end{bmatrix}$.

TABLE 37E

Codebook for 2-layer CSI reporting using antenna ports
[3000 to 2999 + $P_{CSI-RS}$]
CodebookMode = 1

| $i_{1,1}$ | $i_{1,2}$ | $i_2$ | |
|---|---|---|---|
| $0, 1, \ldots, N_1O_1 - 1$ | $0, \ldots, N_2O_2 - 1$ | $0, 1$ | $W_{i_{1,1},i_{1,1}+k_1,i_{1,2},i_{1,2}+k_2,i_2}^{(2)}$ | where $W_{l,l',m,m',n}^{(2)} = \dfrac{1}{\sqrt{2P_{CSI-RS}}} \begin{bmatrix} v_{l,m} & v_{l',m'} \\ \varphi_n v_{l,m} & -\varphi_n v_{l',m'} \end{bmatrix}$ and the mapping from $i_{1,3}$ to $k_1$ and $k_2$ is given in TABLE 37B

TABLE 37F

Codebook for 3-layer CSI reporting using antenna ports
[3000 to 2999 + $P_{CSI-RS}$]
CodebookMode = 1-2, $P_{CSI-RS}$ < 16

| $i_{1,1}$ | $i_{1,2}$ | $i_2$ | |
|---|---|---|---|
| $0, \ldots, N_1O_1 - 1$ | $0, 1, \ldots, N_2O_2 - 1$ | $0, 1$ | $W_{i_{1,1},i_{1,1}+k_1,i_{1,2},i_{1,2}+k_2,i_2}^{(3)}$ | where $W_{l,l',m,m',n}^{(3)} = \dfrac{1}{\sqrt{3P_{CSI-RS}}} \begin{bmatrix} v_{l,m} & v_{l',m'} & v_{l,m} \\ \varphi_n v_{l,m} & \varphi_n v_{l',m'} & -\varphi_n v_{l,m} \end{bmatrix}$ and the mapping from $i_{1,3}$ to $k_1$ and $k_2$ is given in TABLE 37C

TABLE 37G

Codebook for 4-layer CSI reporting using antenna ports
[3000 to 2999 + $P_{CSI-RS}$]
CodebookMode = 1-2, $P_{CSI-RS}$ < 16

| $i_{1,1}$ | $i_{1,2}$ | $i_2$ | |
|---|---|---|---|
| $0, \ldots, N_1O_1 - 1$ | $0, 1, \ldots, N_2O_2 - 1$ | $0, 1$ | $W_{i_{1,1},i_{1,1}+k_1,i_{1,2},i_{1,2}+k_2,i_2}^{(4)}$ | where $W_{l,l',m,m',n}^{(4)} = \dfrac{1}{\sqrt{4P_{CSI-RS}}} \begin{bmatrix} v_{l,m} & v_{l',m'} & v_{l,m} & v_{l',m'} \\ \varphi_n v_{l,m} & \varphi_n v_{l',m'} & -\varphi_n v_{l,m} & -\varphi_n v_{l',m'} \end{bmatrix}$ and the mapping from $i_{1,3}$ to $k_1$ and $k_2$ is given in TABLE 37C In some embodiments 21, a UE is indicated with a TPMI via UL-related DCI using a 4-Tx (or 4-port) UL codebook wherein the pre-coders or pre-coding matrices indicated by the TPMI correspond to at least one of full coherence, partial coherence, and non-coherent pre-coders as defined earlier in the present disclosure. The codebook can be partitioned into three subsets of pre-coders or pre-coding matrices for the three coherence types. The details of the rank 1-4 codebook are as follows.

In sub-embodiment 21A, the rank 1 codebook comprises at least one of the following types of pre-coders. In one example of CB0 (full coherence), the pre-coders correspond to transmission from all 4 ports. The scaling factor a to normalize the pre-coders is according to at least one embodiment/alternative mentioned earlier in the present disclosure. For example, a=2. At least one of the three alternatives is used. In one alternative of Alt 21A-0, the pre-coders corresponding to Codebook or TPMI index 0-15 in LTE UL rank-1 4-Tx codebook are used. At least one of the following examples is used. In one example of such alternative, Ex 21A-0-0, there are 16 pre-coders in LTE UL rank-1 4-Tx codebook and all of them are used. In another example of such alternative, Ex 21A-0-1, a subset of the 16 pre-coders is used. For example, 8 out of 16 pre-coders are used where the 8 pre-coders correspond to either Codebook or TPMI index set {i=0-7} or {2i: i=0-7}={0, 2, 4, 6, 8, 10, 12, 14} or {2i+1: i=0-7}={1, 3, 5, 7, 9, 11, 13, 15}.

In another alternative of Alt 21A-1, the pre-coders in NR DL rank-1 4-Tx Type I CSI codebook for single antenna panel with L=1 or CodebookMode=1 are used. At least one of the following examples is used. In one example of such alternative, Ex 21A-1-0, there are 32 pre-coders in NR DL rank-1 4-Tx Type I CSI codebook for single antenna panel with L=1 or CodebookMode=1 and all of them are used. The 32 pre-coders are indicated using a PMI ($i_{1,1}, i_{1,2}, i_2$), where $\{i_{1,1}=0-7\}$, $i_{1,2}=0$, and $\{i_2=0-3\}$. The mapping from a PMI ($i_{1,1}, i_2$) in the NR DL 4-Tx codebook to a TPMI index (k) in the proposed UL codebook is given by k=4$i_{1,1}$+$i_2$. The reverse mapping from a TPMI index (k) in the proposed UL codebook to a PMI ($i_{1,1}, i_2$) in the NR DL 4-Tx codebook is given by $i_2$=k mod 4 and $i_{1,1}$=(k−$i_2$)/4.

In another example of such alternative, Ex 21A-1-1, a subset of the 32 pre-coders is used. For example, 16 out of 32 pre-coders are used, which correspond to $\{i_{1,1}=0, 2, 4, 6\}$, $i_{1,2}=0$, and $\{i_2=0-3\}$ in the NR DL 4-Tx codebook. Note that these pre-coders correspond to the effective oversampling factor $O_1$=2 in the DFT beams $v_{l,m}$. The mapping from a PMI ($i_{1,1}, i_2$) in the NR DL 4-Tx codebook to a TPMI index (k) in the proposed UL codebook is given by k=4*($i_{1,1}$/2)+$i_2$=2$i_{1,1}$+$i_2$. The reverse mapping from a TPMI index (k) in the proposed UL codebook to a PMI ($i_{1,1}, i_2$) in the NR DL 4-Tx codebook is given by $i_2$=k mod 4 and $i_{1,1}$=(k−$i_2$)/2.

In yet another alternative of Alt 21A-2, the pre-coders in LTE specification DL rank-1 Householder codebook are used. At least one of the following examples is used. In one example of such alternative, Ex 21A-2-0, there are 16 pre-coders in LTE specification DL rank-1 Householder codebook and all of them are used. In another example of such alternative, Ex 21A-2-1, a subset of the 16 pre-coders is used. For example, 8 out of 16 pre-coders are used where the 8 pre-coders correspond to either PMI indices {i=0-7} or {2i: i=0-7}=10, 2, 4, 6, 8, 10, 12, 141 or {2i+1: i=0-7}={1, 3, 5, 7, 9, 11, 13, 15}.

In another example of CB1 (partial coherence), the pre-coders correspond to transmission from 2 out of 4 ports. The scaling factor a to normalize the pre-coders is according to at least one embodiment/alternative mentioned earlier in the present disclosure. For example, a=√2. At least one of the alternatives is used. In one alternative of Alt 21A-3, the pre-coders corresponding to Codebook or TPMI index 16-23 in LTE UL rank-1 4-Tx codebook are used. In another alternative of Alt 21A-4, the pre-coders correspond to $$\left\{ [e_i \quad e_j] \begin{bmatrix} 1 \\ \phi_n \end{bmatrix} \right\}$$

where $e_x$ is a 4×1 port selection vector which has a value 1 at entry x and a value 0 at remaining 3 entries, and $$\{\phi_n = e^{\frac{\pi n}{2}} : n = 0 - 3\}.$$

Note that there 6 possible values for the pair (i,j)∈{(0,1), (0,2), (0,3), (1,2), (1,3), (2,3)} where the 4 entries of the vector $e_x$ are numbered as 0, 1, 2, and 3. So, the maximum number of pre-coders is 6×4=24. In yet another alternative of Alt 21A-5, the same as Alt 21A-4 except that (i,j) takes a value from a subset S of {(0,1), (0,2), (0,3), (1,2), (1,3), (2,3)}. For example, S={(0,1), (1,2), (2,3), (0,3)} or S={(0, 2), (1,3), (0,1), (2,3)} or S={(0,2), (1,3)}.

In yet another example of CB2 (non-coherence), the pre-coders correspond to transmission from 1 out of 4 ports. There are 4 such pre-coders as explained in embodiment 16 (Alt 16-2). The scaling factor a to normalize the pre-coders is according to at least one embodiment/alternative mentioned earlier in the present disclosure. For example, a=1.

In sub-embodiment 21B, the rank 2 codebook comprises at least one of the following types of pre-coding matrices. In one example of CB0 (full coherence), the pre-coding matrices correspond to transmission from all 4 ports per layer (where layers correspond to columns of the pre-coding matrices). The scaling factor a to normalize each column of the pre-coding matrices is according to at least one embodiment/alternative mentioned earlier in the present disclosure. For example, a=2. Note that a normalization by $\sqrt{2}$ is applied for the two layers in addition the scaling factor a. At least one of the three alternatives is used. In one alternative of Alt 21B-0, the rank-2 pre-coding matrices are formed using the rank-1 pre-coders in LTE UL rank-1 4-Tx codebook (codebook index 0-15) as proposed in CB0 in Embodiment 16. At least one of the following examples is used. In one instance of Ex 21B-0-0, 8 rank-2 pre-coding matrices are formed. For example, pre-coding matrices corresponding to TPMI indices 0-7 in TABLE 13. In another instance of Ex 21B-0-1, 16 rank-2 pre-coding matrices are formed. For example, For example, pre-coding matrices corresponding to TPMI indices 0-15 in TABLE 13.

In another alternative of Alt 21B-1, the rank-2 pre-coding matrices in NR DL rank-2 4-Tx Type I CSI codebook for single antenna panel with L=1 or CodebookMode=1 are used. At least one of the following examples is used. In one instance of Ex 21B-1-0, there are 32 rank-2 pre-coding matrices in NR DL rank-2 4-Tx Type I CSI codebook for single antenna panel with L=1 or CodebookMode=1 and all of them are used. The 32 rank-2 pre-coding matrices are indicated using a PMI $(i_{1,1}, i_{1,2}, i_{1,3}, i_2)$, where $\{i_{1,1}=0-7\}$, $i_{1,2}=0$, $\{i_{1,3}=0,1\}$, and $\{i_2=0-1\}$. The mapping from a PMI $(i_{1,1}, i_{1,3}, i_2)$ in the NR DL 4-Tx codebook to a TPMI index (k) in the proposed UL codebook is given by $k=4i_{1,1}+2i_{1,3}+i_2$. The reverse mapping from a TPMI index (k) in the proposed UL codebook to a PMI $(i_{1,1}, i_{1,3}, i_2)$ in the NR DL 4-Tx codebook is given by $i_2=k \bmod 2$, $i_{1,3}=(k-i_2)/2 \bmod 2$, and $i_{1,1}=(k-i_2-2i_{1,3})/4$.

In another instance of Ex 21B-1-1, a subset of the 32 pre-coding matrices is used. For example, 8 rank-2 pre-coding matrices are used, which correspond to $\{i_{1,1}=0, 2, 4, 6\}$, $i_{1,2}=i_{1,3}=0$, and $\{i_2=0-1\}$ in the NR DL 4-Tx rank-2 codebook. Note that these pre-coders correspond to the effective oversampling factor $O_1=2$ and $(k_1, k_2)=(0,0)$ in the DFT beams $\upsilon_{l,m}$ and $\upsilon_{l+k_1,m+k_2}$ for two layers. The mapping from a PMI $(i_{1,1}, i_2)$ in the NR DL 4-Tx codebook to a TPMI index (k) in the proposed UL codebook is given by $k=2*(i_{1,1}/2)+i_2=i_{1,1}+i_2$. The reverse mapping from a TPMI index (k) in the proposed UL codebook to a PMI $(i_{1,1}, i_2)$ in the NR DL 4-Tx codebook is given by $i_2=k \bmod 2$ and $i_{1,1}=k-i_2$.

In one instance of Ex 21B-1-2, a subset of the 32 pre-coding matrices is used. For example, 8 rank-2 pre-coding matrices are used, which correspond to $\{i_{1,1}=0, 4\}$, $i_{1,2}=0$, $\{i_{1,3}=0, 1\}$, and $\{i_2=0-1\}$ in the NR DL 4-Tx rank-2 codebook. Note that these pre-coders correspond to the effective oversampling factor $O_1=1$ and $(k_1, k_2)=(0,0)$, $(4,0)$ in the DFT beams $\upsilon_{l,m}$ and $\upsilon_{l+k_1,m+k_2}$ for two layers. The mapping from a PMI $(i_{1,1}, i_{1,3}, i_2)$ in the NR DL 4-Tx codebook to a TPMI index (k) in the proposed UL codebook is given by $k=4*(i_{1,1}/4)+2*i_{1,3}+i_2=i_{1,1}+2i_{1,3}+i_2$. The reverse mapping from a TPMI index (k) in the proposed UL codebook to a PMI $(i_{1,1}, i_{1,3}, i_2)$ in the NR DL 4-Tx codebook is given by $i_2=k \bmod 2$, $i_{1,3}=(k-i_2)/2 \bmod 2$, and $i_{1,1}=k-i_2-2i_{1,3}$.

In another instance of Ex 21B-1-3, a subset of the 32 pre-coding matrices is used. For example, 16 rank-2 pre-coding matrices are used, which correspond to $\{i_{1,1}=0-7\}$, $i_{1,2}=i_{1,3}=0$, and $\{i_2=0-1\}$ in the NR DL 4-Tx rank-2 codebook. Note that these pre-coders correspond to the effective oversampling factor $O_1=2$ and $(k_1, k_2)=(0,0)$ in the DFT beams $\upsilon_{l,m}$ and $\upsilon_{l+k_1,m+k_2}$ for two layers. The mapping from a PMI $(i_{1,1}, i_2)$ in the NR DL 4-Tx codebook to a TPMI index (k) in the proposed UL codebook is given by $k=2i_{1,1}+i_2$. The reverse mapping from a TPMI index (k) in the proposed UL codebook to a PMI $(i_{1,1}, i_2)$ in the NR DL 4-Tx codebook is given by $i_2=k \bmod 2$ and $i_{1,1}=(k-i_2)/2$.

In yet another instance of Ex 21B-1-4, a subset of the 32 pre-coding matrices is used. For example, 16 rank-2 pre-coding matrices are used, which correspond to $\{i_{1,1}=0, 2, 4, 6\}$, $i_{1,2}=0$, $\{i_{1,3}=0, 1\}$, and $\{i_2=0-1\}$ in the NR DL 4-Tx rank-2 codebook. Note that these pre-coders correspond to the effective oversampling factor $O_1=2$ and $(k_1, k_2)=(0,0)$, $(4,0)$ in the DFT beams $\upsilon_{l,m}$ and $\upsilon_{l+k_1,m+k_2}$ for two layers. The mapping from a PMI $(i_{1,1}, i_{1,3}, i_2)$ in the NR DL 4-Tx codebook to a TPMI index (k) in the proposed UL codebook is given by $k=4*(i_{1,1}/2)+2*i_{1,3}+i_2=2i_{1,1}+2i_{1,3}+i_2$. The reverse mapping from a TPMI index (k) in the proposed UL codebook to a PMI $(i_{1,1}, i_{1,3}, i_2)$ in the NR DL 4-Tx codebook is given by $i_2=k \bmod 2$, $i_{1,3}=(k-i_2)/2 \bmod 2$, and $i_{1,1}=(k-i_2-2i_{1,3})/2$.

In another alternative of Alt 21B-2, the rank-2 pre-coding matrices in LTE specification DL rank-2 Householder codebook is used. At least one of the following examples is used. In one instance of Ex21B-2-0, there are 16 rank-2 pre-coding matrices in LTE specification DL rank-2 Householder codebook and all of them are used. In another instance of Ex 21B-2-1, a subset of the 16 pre-coding matrices is used. For example, 8 out of 16 rank-2 pre-coding matrices are used where the 8 pre-coding matrices correspond to either PMI indices {i=0-7} or {2i: i=0-7}={0, 2, 4, 6, 8, 10, 12, 14} or {2i+1: i=0-7}={1, 3, 5, 7, 9, 11, 13, 15}.

In another example of CB1 (partial coherence), the pre-coding matrices correspond to transmission from 2 out of 4 ports per layer. The scaling factor a to normalize each column of the pre-coding matrices is according to at least one embodiment/alternative mentioned earlier in the present disclosure. For example, $a=\sqrt{2}$. Note that a normalization by $\sqrt{2}$ is applied for the two layers in addition the scaling factor a. At least one of the alternatives is used. In one alternative of Alt 21B-3, the pre-coding matrices corresponding to Codebook index 0-15 in LTE UL rank-2 4-Tx codebook are used. In another alternative of Alt 21B-4, the rank-2 pre-coding matrices are formed using the rank-1 pre-coders in LTE UL rank-1 4-Tx codebook (Codebook index 16-23) as proposed in CB1 in embodiment 16. At least one of the following examples is used.

In one instance of Ex 21B-4-0, 8 rank-2 pre-coding matrices are formed. For example, $\{p_{m,n}\}$ where $p_{m,n}$ is defined earlier in the present disclosure, and (m, n)=(16,17), (18,19), (20,21), (22,23), (16,20), (17,21), (18,22), (19,23). In another instance of Ex 21B-4-1, 16 rank-2 pre-coding matrices are formed. For example, $\{p_{m,n}\}$ where $p_{m,n}$ is defined earlier in the present disclosure, and (m, n)=(16,17), (18,19), (20,21), (22,23), (16,20), (17,21), (18,22), (19,23), (16,21), (17,20), (18,23), (19,22), (16,22), (17,23), (18,20), (19,21).

In yet another example of CB2 (non-coherence), the pre-coding matrices correspond to transmission from 1 out of 4 ports per layer. The scaling factor a to normalize each column of the pre-coding matrices is according to at least one embodiment/alternative mentioned earlier in the present disclosure. For example, a=1. Note that a normalization by $\sqrt{2}$ is applied for the two layers in addition the scaling factor a. There are at most 6 such pre-coding matrices as explained in embodiment 16 (Alt 16-2). At least one of the alternatives is used. In one alternative of Alt 21B-5, all 6 pre-coding matrices as explained in Embodiment 16 (Alt 16-2) are given by $$\left\{ \frac{1}{\sqrt{2}}\begin{bmatrix} 1 & 0 \\ 0 & 1 \\ 0 & 0 \\ 0 & 0 \end{bmatrix}, \frac{1}{\sqrt{2}}\begin{bmatrix} 0 & 0 \\ 1 & 0 \\ 0 & 1 \\ 0 & 0 \end{bmatrix}, \frac{1}{\sqrt{2}}\begin{bmatrix} 0 & 0 \\ 1 & 0 \\ 0 & 0 \\ 0 & 1 \end{bmatrix}, \right.$$

$$\left. \frac{1}{\sqrt{2}}\begin{bmatrix} 1 & 0 \\ 0 & 0 \\ 0 & 0 \\ 0 & 1 \end{bmatrix}, \frac{1}{\sqrt{2}}\begin{bmatrix} 0 & 0 \\ 1 & 0 \\ 0 & 0 \\ 0 & 1 \end{bmatrix}, \frac{1}{\sqrt{2}}\begin{bmatrix} 1 & 0 \\ 0 & 0 \\ 0 & 1 \\ 0 & 0 \end{bmatrix} \right\}.$$

In another alternative of Alt 21B-6, a subset of the 6 pre-coding matrices is used. For example, 4 out of 6 pre-coding matrices are used. For example, pre-coding matrices corresponding to TPMI indices 12-15 in TABLE 13.

In sub-embodiment 21C, the rank 3 codebook comprises at least one of the following types of pre-coding matrices. In one example of CB0 (full coherence), the pre-coding matrices correspond to transmission from all 4 ports per layer (where layers correspond to columns of the pre-coding matrices). The scaling factor a to normalize each column of the pre-coding matrices is according to at least one embodiment/alternative mentioned earlier in the present disclosure. For example, a=2. Note that a normalization by $\sqrt{3}$ is applied for the three layers in addition the scaling factor a. At least one of the three alternatives is used.

In one alternative of Alt 21C-0, the rank-3 pre-coding matrices are formed using the rank-1 pre-coders in LTE UL rank-1 4-Tx codebook (Codebook index 0-15) as proposed in CB0 in embodiment 16. At least one of the following examples is used. In one instance of Ex 21C-0-0, 2 rank-3 pre-coding matrices are formed. For example, pre-coding matrices corresponding to TPMI indices 0-1 in TABLE 14. In another instance of Ex 21C-0-1, 4 rank-3 pre-coding matrices are formed. For example, pre-coding matrices corresponding to TPMI indices 0-3 are shown in TABLE 14. In yet another instance of Ex 21C-0-2, 8 rank-3 pre-coding matrices are formed. For example, pre-coding matrices corresponding to TPMI indices 0-7 are shown in TABLE 14.

In another alternative of Alt 21C-1, the rank-3 pre-coding matrices in NR DL rank-3 4-Tx Type I CSI codebook for single antenna panel with L=1 or CodebookMode=1 are used. At least one of the following examples is used. In one instance of Ex 21C-1-0, there are 16 rank-3 pre-coding matrices in NR DL rank-3 4-Tx Type I CSI codebook for single antenna panel with L=1 or CodebookMode=1 and all of them are used. The 16 rank-3 pre-coding matrices are indicated using a PMI $(i_{1,1}, i_{1,2}, i_{1,3}, i_2)$, where $\{i_{1,1}=0\text{-}7\}$, $i_{1,2}=i_{1,3}=0$, and $\{i_2=0\text{-}1\}$. The mapping from a PMI $(i_{1,1}, i_2)$ in the NR DL 4-Tx codebook to a TPMI index (k) in the proposed UL codebook is given by $k=2i_{1,1}+i_2$. The reverse mapping from a TPMI index (k) in the proposed UL codebook to a PMI $(i_{1,1}, i_2)$ in the NR DL 4-Tx codebook is given by $i_2=k \mod 2$ and $i_{1,1}=(k-i_2)/2$.

In another instance of Ex 21C-1-1, a subset of the 16 pre-coding matrices is used. For example, 2 rank-3 pre-coding matrices are used, which correspond to $\{i_{1,1}=0\}$, $i_{1,2}=i_{1,3}=0$, and $\{i_2=0\text{-}1\}$ in the NR DL 4-Tx rank-3 codebook. Note that these pre-coders correspond to the effective oversampling factor $O_1=1$ and $(k_1, k_2)=(4,0)$ in the DFT beams $v_{l,m}$ and $v_{l+k_1,m+k_2}$ for three layers. The mapping from a PMI $i_2$ in the NR DL 4-Tx codebook to a TPMI index (k) in the proposed UL codebook is given by $k=i_2$. The reverse mapping from a TPMI index (k) in the proposed UL codebook to a PMI $(i_2)$ in the NR DL 4-Tx codebook is given by $i_2=k$.

In yet another instance of Ex 21C-1-2, a subset of the 16 pre-coding matrices is used. For example, 4 rank-3 pre-coding matrices are used, which correspond to $\{i_{1,1}=0, 2\}$, $i_{1,2}=i_{1,3}=0$, and $\{i_2=0\text{-}1\}$ in the NR DL 4-Tx rank-3 codebook. Note that these pre-coders correspond to the oversampling factor $O_1=2$ and $(k_1, k_2)=(4,0)$ in the DFT beams $v_{l,m}$ and $v_{l+k_1,m+k_2}$ for three layers. The mapping from a PMI $(i_{1,1}, i_2)$ in the NR DL 4-Tx codebook to a TPMI index (k) in the proposed UL codebook is given by $k=2*(i_{1,1}/2)+i_2=i_{1,1}+i_2$. The reverse mapping from a TPMI index (k) in the proposed UL codebook to a PMI $(i_{1,1}, i_2)$ in the NR DL 4-Tx codebook is given by $i_2=k \mod 2$, and $i_{1,1}=k-i_2$.

In yet another instance of Ex 21C-1-3, a subset of the 16 pre-coding matrices is used. For example, 4 rank-3 pre-coding matrices are used, which correspond to $\{i_{1,1}=0\text{-}3\}$, $i_{1,2}=i_{1,3}=0$, and $\{i_2=0\}$ in the NR DL 4-Tx rank-3 codebook. Note that these pre-coders correspond to the oversampling factor $O_1=4$ and $(k_1, k_2)=(0,0)$ in the DFT beams $v_{l,m}$ and $v_{l+k_1,m+k_2}$ for three layers. The mapping from a PMI $(i_{1,1})$ in the NR DL 4-Tx codebook to a TPMI index (k) in the proposed UL codebook is given by $k=i_{1,1}$. The reverse mapping from a TPMI index (k) in the proposed UL codebook to a PMI $(i_{1,1})$ in the NR DL 4-Tx codebook is given by $i_{1,1}=k$.

In yet another instance of Ex 21C-1-4, a subset of the 16 pre-coding matrices is used. For example, 8 rank-3 pre-coding matrices are used, which correspond to $\{i_{1,1}=0\text{-}3\}$, $i_{1,2}=i_{1,3}=0$, and $\{i_2=0\text{-}1\}$ in the NR DL 4-Tx rank-3 codebook. Note that these pre-coders correspond to the oversampling factor $O_1=4$ and $(k_1, k_2)=(0,0)$ in the DFT beams $v_{l,m}$ and $v_{l+k_1,m+k_2}$ for three layers. The mapping from a PMI $(i_{1,1}, i_2)$ in the NR DL 4-Tx codebook to a TPMI index (k) in the proposed UL codebook is given by $k=2i_{1,1}+i_2$. The reverse mapping from a TPMI index (k) in the proposed UL codebook to a PMI $(i_{1,1}, i_2)$ in the NR DL 4-Tx codebook is given by $i_2=k \mod 2$ and $i_{1,1}=(k-i_2)/2$.

In yet another alternative of Alt 21C-2, the rank-3 pre-coding matrices in LTE specification DL rank-3 Householder codebook is used. At least one of the following examples is used. In one instance of Ex 21C-2-0, there are 16 rank-3 pre-coding matrices in LTE specification DL rank-3 Householder codebook and all of them are used. In another instance of Ex 21C-2-1, a subset of the 16 pre-coding matrices is used. For example, 8 out of 16 rank-3 pre-coding matrices are used where the 8 pre-coding matrices correspond to either PMI indices {i=0-7} or {2i: i=0-7}={0, 2, 4, 6, 8, 10, 12, 14} or {2i+1: i=0-7}={1, 3, 5, 7, 9, 11, 13, 15}.

In yet another example of CB1 (partial coherence), the pre-coding matrices correspond to transmission from 2 out of 4 ports per layer. The scaling factor a to normalize each column the pre-coding matrices is according to at least one embodiment/alternative mentioned earlier in the present disclosure. For example, $a=\sqrt{2}$. Note that a normalization by $\sqrt{3}$ is applied for the three layers in addition the scaling factor a. At least one of the alternatives is used. In one alternative of Alt 21C-3, the pre-coding matrices corresponding to Codebook index 0-11 in LTE UL rank-3 4-Tx codebook are used.

In another alternative of Alt 21C-4, the rank-3 pre-coding matrices are formed using the rank-1 pre-coders in LTE UL rank-1 4-Tx codebook (codebook index 16-23) as proposed in CB1 in the aforementioned embodiment 16. At least one of the following examples is used. In one instance of Ex 21C-4-0, 2 rank-3 pre-coding matrices are formed. For example, pre-coding matrices corresponding to TPMI indices 8-9 are shown in TABLE 14. In one instance of Ex 21C-4-1, 4 rank-3 pre-coding matrices are formed. For example, pre-coding matrices corresponding to TPMI indices 8-11 are shown in TABLE 14. In another instance of Ex 21C-4-2, 8 rank-3 pre-coding matrices are formed. For example, pre-coding matrices corresponding to TPMI indices 8-11 in TABLE 14, and 4 additional pre-coding matrices $p_{m,n,p}$ where (m, n, p)=(16,20,21), (17,20,21), (18,22,23), (19,22,23).

In yet another example of CB2 (non-coherence), the pre-coding matrices correspond to transmission from 1 out of 4 ports per layer. The scaling factor a to normalize each column the pre-coding matrices is according to at least one embodiment/alternative mentioned earlier in the present disclosure. For example, $a=1$. Note that a normalization by $\sqrt{3}$ is applied for the three layers in addition the scaling factor a. There are 4 such pre-coding matrices as explained in the aforementioned embodiment 16 (Alt 16-2).

In sub-embodiment 21D, the rank 4 codebook comprises at least one of the following types of pre-coding matrices. In one example of CB0 (full coherence), the pre-coding matrices correspond to transmission from all 4 ports per layer (where layers correspond to columns of the pre-coding matrices). The scaling factor a to normalize each column of the pre-coding matrices is according to at least one embodiment/alternative mentioned earlier in the present disclosure. For example, $a=2$. Note that a normalization by $\sqrt{4}=2$ is applied for the four layers in addition the scaling factor a. At least one of the three alternatives is used.

In one alternative of Alt 21D-0, the rank-4 pre-coding matrices are formed using the rank-1 pre-coders in LTE UL rank-1 4-Tx codebook (Codebook index 0-15) as proposed in CB0 in the aforementioned embodiment 16. At least one of the following examples is used. In one instance of Ex 21D-0-0, 1 rank-4 pre-coding matrices are formed. For example, pre-coding matrix corresponding to TPMI index 0 is shown in TABLE 15. In another instance of Ex 21D-0-1, 2 rank-4 pre-coding matrices are formed. For example, pre-coding matrices corresponding to TPMI indices 0-1 are shown in TABLE 15. In yet another instance of Ex 21D-0-2, 4 rank-4 pre-coding matrices are formed. For example, pre-coding matrices corresponding to TPMI indices 0-3 are shown in TABLE 15.

In another alternative of Alt 21D-1, the rank-4 pre-coding matrices in NR DL rank-4 4-Tx Type I CSI codebook for single antenna panel with L=1 or CodebookMode=1 are used. At least one of the following examples is used. In one instance of Ex 21D-1-0, there are 16 rank-4 pre-coding matrices in NR DL rank-4 4-Tx Type I CSI codebook for single antenna panel with L=1 or CodebookMode=1 and all of them are used. The 16 rank-4 pre-coding matrices are indicated using a PMI $(i_{1,1}, i_{1,2}, i_{1,3}, i_2)$, where $\{i_{1,1}=0-7\}$, $i_{1,2}=i_{1,3}=0$, and $\{i_2=0-1\}$. The mapping from a PMI $(i_{1,1}, i_2)$ in the NR DL 4-Tx codebook to a TPMI index (k) in the proposed UL codebook is given by $k=2i_{1,1}+i_2$. The reverse mapping from a TPMI index (k) in the proposed UL codebook to a PMI $(i_{1,1}, i_2)$ in the NR DL 4-Tx codebook is given by $i_2=k \bmod 2$ and $i_{1,1}=(k-i_2)/2$.

In another instance of Ex 21D-1-1, a subset of the 16 pre-coding matrices is used. For example, 2 rank-4 pre-coding matrices are used, which correspond to $\{i_{1,1}=0\}$, $i_{1,2}=i_{1,3}=0$, and $\{i_2=0-1\}$ in the NR DL 4-Tx rank-4 codebook. Note that these pre-coders correspond to the effective oversampling factor $O_1=1$ and $(k_1, k_2)=(4,0)$ in the DFT beams $v_{l,m}$ and $v_{l+k_1,m+k_2}$ for four layers. The mapping from a PMI $i_2$ in the NR DL 4-Tx codebook to a TPMI index (k) in the proposed UL codebook is given by $k=i_2$. The reverse mapping from a TPMI index (k) in the proposed UL codebook to a PMI $(i_2)$ in the NR DL 4-Tx codebook is given by $i_2=k$.

In yet another instance of Ex 21D-1-2, a subset of the 16 pre-coding matrices is used. For example, 4 rank-4 pre-coding matrices are used, which correspond to $\{i_{1,1}=0, 2\}$, $i_{1,2}=i_{1,3}=0$, and $\{i_2=0-1\}$ in the NR DL 4-Tx rank-4 codebook. Note that these pre-coders correspond to the oversampling factor $O_1=2$ and $(k_1, k_2)=(4,0)$ in the DFT beams $v_{l,m}$ and $v_{l+k_1,m+k_2}$ for four layers. The mapping from a PMI $(i_{1,1}, i_2)$ in the NR DL 4-Tx codebook to a TPMI index (k) in the proposed UL codebook is given by $k=2*(i_{1,1}/2)+i_2=i_{1,1}+i_2$. The reverse mapping from a TPMI index (k) in the proposed UL codebook to a PMI $(i_{1,1}, i_2)$ in the NR DL 4-Tx codebook is given by $i_2=k \bmod 2$, and $i_{1,1}=k-i_2$.

In yet another instance of Ex 21D-1-3, a subset of the 16 pre-coding matrices is used. For example, 4 rank-4 pre-coding matrices are used, which correspond to $\{i_{1,1}=0-3\}$, $i_{1,2}=i_{1,3}=0$, and $\{i_2=0\}$ in the NR DL 4-Tx rank-4 codebook. Note that these pre-coders correspond to the oversampling factor $O_1=4$ and $(k_1, k_2)=(0,0)$ in the DFT beams $v_{l,m}$ and $v_{l+k_1,m+k_2}$ for four layers. The mapping from a PMI $(i_{1,1})$ in the NR DL 4-Tx codebook to a TPMI index (k) in the proposed UL codebook is given by $k=i_{1,1}$. The reverse mapping from a TPMI index (k) in the proposed UL codebook to a PMI $(i_{1,1})$ in the NR DL 4-Tx codebook is given by $i_{1,1}=k$.

In yet another instance of Ex 21D-1-4, a subset of the 16 pre-coding matrices is used. For example, 8 rank-4 pre-coding matrices are used, which correspond to $\{i_{1,1}=0-3\}$, $i_{1,2}=i_{1,3}=0$, and $\{i_2=0-1\}$ in the NR DL 4-Tx rank-4 codebook. Note that these pre-coders correspond to the oversampling factor $O_1=4$ and $(k_1, k_2)=(0,0)$ in the DFT beams $v_{l,m}$ and $v_{l+k_1,m+k_2}$ for four layers. The mapping from a PMI $(i_{1,1}, i_2)$ in the NR DL 4-Tx codebook to a TPMI index (k) in the proposed UL codebook is given by $k=2i_{1,1}+i_2$. The reverse mapping from a TPMI index (k) in the proposed UL codebook to a PMI $(i_{1,1}, i_2)$ in the NR DL 4-Tx codebook is given by $i_2=k \bmod 2$ and $i_{1,1}=(k-i_2)/2$.

In another alternative of Alt 21D-2, the rank-4 pre-coding matrices in LTE specification DL rank-4 Householder codebook are used. At least one of the following examples is used. In one instance of Ex 21D-2-0, there are 16 rank-4 pre-coding matrices in LTE specification DL rank-4 Householder codebook and all of them are used. In another instance of Ex 21D-2-1, a subset of the 16 pre-coding matrices is used. For example, 8 out of 16 rank-4 pre-coding matrices are used where the 8 pre-coding matrices correspond to either PMI indices {i=0-7} or {2i: i=0-7}={0, 2, 4, 6, 8, 10, 12, 14} or {2i+1: i=0-7}={1, 3, 5, 7, 9, 11, 13, 15}.

In yet another example of CB1 (partial coherence), the pre-coding matrices correspond to transmission from 2 out of 4 ports per layer. The scaling factor a to normalize each column the pre-coding matrices is according to at least one embodiment/alternative mentioned earlier in the present disclosure. For example, a=√2. Note that a normalization by √4=2 is applied for the four layers in addition the scaling factor a. At least one of the alternatives is used. In one alternative of Alt 21D-3, the rank-4 pre-coding matrices are formed using the rank-1 pre-coders in LTE UL rank-1 4-Tx codebook (codebook index 16-23) as proposed in CB1 in Embodiment 16. At least one of the following examples is used.

In one instance of Ex 21D-3-0, 1 rank-4 pre-coding matrices are formed. For example, pre-coding matrix corresponding to TPMI index 4 in TABLE 15. In another instance of Ex 21D-3-1, 2 rank-4 pre-coding matrices are formed. For example, pre-coding matrices corresponding to TPMI indices 4-5 in TABLE 15. In another instance of Ex 21D-3-2, 4 rank-4 pre-coding matrices are formed. For example, pre-coding matrices corresponding to TPMI indices 4-5 in TABLE 15, and 2 additional pre-coding matrices $p_{m,n,p,q}$ where (m, n, p, q)=(16,17,22,23), (18,19,20,21).

In yet another example of CB2 (non-coherence), the pre-coding matrices correspond to transmission from 1 out of 4 ports per layer. The scaling factor a to normalize each column the pre-coding matrices is according to at least one embodiment/alternative mentioned earlier in the present disclosure. For example, a=1. Note that a normalization by √4=2 is applied for the four layers in addition the scaling factor a. There are 4 such pre-coding matrices as explained in Embodiment 16 (Alt 16-2).

An example of rank 1-4 codebook is as follows. The corresponding TPMI/TRI payload (number of bits) is summarized in TABLE 38. In one example, Rank 1 codebook comprises 16+8+4=28 pre-coders of the following three types. In one instance, CB0 (full coherence) comprises 16 pre-coders (indicated by TPMI indices 0-15) according to one of the following: LTE UL codebook (Ex 21A-0-0); NR DL Type I CSI codebook (Ex 21A-1-1); and LTE specification DL Householder codebook (Ex 21A-2-0). In another instance, CB1 (partial coherence) comprises 8 pre-coders (indicated by TPMI indices 16-23) according to Alt 21A-3. In yet another instance, CB2 (non-coherence) comprises 4 pre-coders (indicated by TPMI indices 24-27) according to CB2 in sub-embodiment 21A.

In another example, Rank 2 comprises 8+16+6=30 pre-coding matrices of the following three types. In one instance, CB0 (full coherence) comprises 8 pre-coding matrices (indicated by TPMI indices 0-7) according to one of the following: LTE UL codebook (Ex 21B-0-0); NR DL Type I CSI codebook (Ex 21B-1-1); and LTE specification DL Householder codebook (Ex 21B-2-1). In another instance, CB1 (partial coherence) comprises 16 pre-coding matrices (indicated by TPMI indices 8-23) according to Alt 21B-3. In yet another instance, CB2 (non-coherence): comprises 6 pre-coding matrices (indicated by TPMI indices 24-29) according to Alt 21B-5.

In yet another example, Rank 3 comprises 8+12+4=24 pre-coding matrices of the following three types. In one instance, CB0 (full coherence) comprises 8 pre-coding matrices (indicated by TPMI indices 0-7) according to one of the following: LTE UL codebook (Ex 21C-0-2); NR DL Type I CSI codebook (Ex 21C-1-4); and LTE specification DL Householder codebook (Ex 21C-2-1). In another instance, CB1 (partial coherence) comprises 12 pre-coding matrices (indicated by TPMI indices 8-19) according to Alt 21C-3. In yet another instance, CB2 (non-coherence) comprises 4 pre-coding matrices (indicated by TPMI indices 20-23) according to CB2 in Sub-embodiment 21C.

In yet another example, Rank 4 comprises 4+2+1=7 pre-coding matrices of the following three types. In one instance, CB0 (full coherence): comprises 4 pre-coding matrices (indicated by TPMI indices 0-3) according to one of the following: LTE UL codebook (Ex 21D-0-2); NR DL Type I CSI codebook (Ex 21D-1-3); and LTE specification DL Householder codebook (Ex 21D-2-1). In another instance, CB1 (partial coherence) comprises 2 pre-coding matrices (indicated by TPMI indices 4-5) according to Ex 21D-3-1. In yet another instance, CB2 (non-coherence) comprises 1 pre-coding matrix (indicated by TPMI index 6) according to CB2 in sub-embodiment 21D.

TABLE 38

| Number of bits | | | | | |
|---|---|---|---|---|---|
| Number of pre-coders | | | | Total number of pre-coders/ pre-coding | Number of bits |
| Rank 1 | Rank 2 | Rank 3 | Rank 4 | matrices | (TRI/TPMI) |
| 28 | 30 | 24 | 7 | 89 | 7 |

In all embodiments of the present disclosure, antenna turn-off and antenna selection or antenna port turn-off and antenna port selection have been used interchangeably and they mean the selection of a subset of antennas or antenna ports for transmission, where the antennas or antenna ports that are not selected or that are turned off correspond to a zero value in the pre-coder.

In a variation of the aforementioned embodiment (embodiment 16Z), a codebook subset restriction (CBSR) is configured by a gNB to a UE on an UL codebook (e.g. rank 1-4 codebook in embodiment 16) using a bitmap B or a coherence state configuration S via RRC signaling, where the bitmap or the state configuration restricts the use of a group of pre-coding matrices in the codebook for TPMI indication. For brevity, coherence state is referred to as state in the rest of the present disclosure.

In one example, a pre-coder grouping is explained in embodiment 7, where the first TPMI ($i_1$) is used for pre-coder groups, and the second TPMI ($i_2$) is used for pre-coders in each pre-coder group. The CBSR then restricts the first TPMI ($i_1$). In another example, a pre-coding grouping is shown as follows. The state configuration includes three states S={s1, s2, s3} wherein each of the three states corresponds to a pre-coder group based on coherence types (full coherent transmission, partial coherent transmission, and non-coherent transmission). The definition of the three states are as follows. In one instance, the first state (e.g. s1) corresponds to 'Full+Partial+Non-coherent', i.e., the pre-coder group comprising all pre-coders (TPMIs) in the UL codebook for full coherent, partial coherent, and non-coherent transmission. In another instance, the second state (e.g. s2) corresponds to 'Partial+Non-coherent', i.e., the pre-coder group comprising all pre-coders (TPMIs) in the UL codebook for partial coherent, and non-coherent transmission. In yet another instance, the third state (e.g. s3) corresponds to 'Non-coherent', i.e., the pre-coder group comprising all pre-coders (TPMIs) in the UL codebook for non-coherent transmission.

Note that only one of the three states can be configured among the three states via RRC signaling of parameter ULCodebookSubset. For a UE capable of full coherent transmission, gNB can configure any of the three states. For a UE capable of partial coherent transmission, gNB can only configure the second and the third states (since the first state includes full coherent transmission pre-coders which the UE is not capable to support). Likewise, for a UE capable of non-coherent transmission, gNB can only configure the third state (since the first and the second states include full coherent and partial coherent transmission pre-coders which the UE is not capable to support).

The size of the DCI field for TPMI indication (e.g. number of bits for TPMI) is determined by the configured state. For an example of the number of pre-coders for rank 1-4 and coherence type as shown in TABLE 39, the size of the DCI field for TPMI indication (# bits for TPMI/TRI indication) is 6, 5, and 4, respectively for the three states, which is illustrated in TABLE 40. Note that for state s1, the number of pre-coders is the sum of full, partial, and non-coherent pre-coders. Likewise, for state s2, it is the sum of partial and non-coherent pre-coders.

TABLE 39

An example of the number of pre-coders for 4-Tx UL codebook

| Rank | Number of full coherent pre-coders | Number of partial coherent pre-coders | Number of non-coherent pre-coders |
|---|---|---|---|
| Rank 1 | 16 | 8 | 4 |
| Rank 2 | 8 | 8 | 4 |
| Rank 3 | 4 | 4 | 1 |
| Rank 4 | 4 | 2 | 1 |
| Total | 32 | 22 | 10 |

TABLE 40

Number of #TPMI/TRI bits for the three states

| Rank | State s1: number of pre-coders | State s2: number of pre-coders | State s3: number of pre-coders |
|---|---|---|---|
| 1 | 28 | 12 | 4 |
| 2 | 20 | 12 | 4 |
| 3 | 9 | 5 | 1 |
| 4 | 7 | 3 | 1 |
| Total | 64 | 32 | 10 |
| #TPMI/TRI bits | 6 | 5 | 4 |

In addition to RRC signaling to configure one of the three states, the RRC signaling also include (either separately or jointly with the configuration of one of the three states) configuration for restricting maximum TRI value for TPMI indication via parameter ULmaxRank. For example, for N (2, 4, or 8) SRS ports, $\log_2 N$ bits or N states are used to configure a maximum TRI value. This implies for 2 and 4 ports, 1 and 2 bits or 2 and 4 states are used to restrict the maximum TRI. For 4 SRS ports, an example of separate and joint RRC configuration are shown in TABLE 41 and TABLE 42, respectively. The same for 2 SRS ports are shown in TABLE 43 and TABLE 44, respectively, where the number of rank 1 and rank 2 pre-coders are 4 and 2 for full coherent case, and are 2 and 1 for non-coherent case. Note that partial coherent case does not exist for 2 SRS ports. The details about the bit field in the DCI for the joint indication of precoder information (TPMI) and number of layers for the three coherence states and different ULmaxRank values are summarized in TABLE 42A, TABLE 42B, TABLE 42C, and TABLE 42D for 4 antenna ports and in TABLE 44A and TABLE 44B for 2 antenna ports. Note that if ULmaxRank is not configured via RRC, then the default value of ULmaxRank=number of antenna ports at the UE. Likewise, if ULCodebookSubset of not configured via RRC, then the default value of ULCodebookSubset=the coherence capability reported by the UE.

TABLE 41

States and #TPMI/TRI bits for separate configuration for 4 SRS ports

| | State s1 | | State s2 | | State s3 | |
|---|---|---|---|---|---|---|
| Max TRI | Number of pre-coders | #TPMI/TRI bits | Number of pre-coders | #TPMI/TRI bits | Number of pre-coders | #TPMI/TRI bits |
| 1 | 28 | 5 | 12 | 4 | 4 | 2 |
| 2 | 48 | 6 | 24 | 5 | 8 | 3 |
| 3 | 57 | 6 | 29 | 5 | 9 | 4 |
| 4 | 64 | 6 | 32 | 5 | 10 | 4 |

TABLE 42

States and #TPMI/TRI bits for joint configuration for 4 SRS ports

| States for RRC configuration | State | Max TRI | Number of pre-coders | #TPMI/TRI bits |
|---|---|---|---|---|
| 1 | s1 | 1 | 28 | 5 |
| 2 | | 2 | 48 | 6 |
| 3 | | 3 | 57 | 6 |
| 4 | | 4 | 64 | 6 |

TABLE 42-continued

States and #TPMI/TRI bits for joint configuration for 4 SRS ports

| States for RRC configuration | State | Max TRI | Number of pre-coders | #TPMI/TRI bits |
|---|---|---|---|---|
| 5 | s2 | 1 | 12 | 4 |
| 6 | | 2 | 24 | 5 |
| 7 | | 3 | 29 | 5 |
| 8 | | 4 | 32 | 5 |
| 9 | s3 | 1 | 4 | 2 |
| 10 | | 2 | 8 | 3 |
| 11 | | 3 | 9 | 4 |
| 12 | | 4 | 10 | 4 |

TABLE 42A

Precoding information and number of layers for 4 antenna ports, if ULmaxRank = 1

| Bit field mapped to index (5 bits) | Fully coherent or ULCodebookSubset = 'Full + Partial + Non-coherent' | Bit field mapped to index (4 bits) | Partial coherent or ULCodebookSubset = 'Partial + Non-coherent' | Bit field mapped to index (2 bits) | Non-coherent or ULCodebook Subset = 'Non-coherent' |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| 2 | 1 layer: TPMI = 2 | 2 | 1 layer: TPMI = 2 | 2 | 1 layer: TPMI = 2 |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layer: TPMI = 12 | 12-15 | Reserved | | |
| ... | ... | | | | |
| 27 | 1 layer: TPMI = 27 | | | | |
| 28-31 | Reserved | | | | |

TABLE 42B

Precoding information and number of layers for 4 antenna ports, if ULmaxRank = 2

| Bit field mapped to index (6 bits) | Fully coherent ULCodebookSubset = 'Full + Partial + Non-coherent' | Bit field mapped to index (5 bits) | Partial coherent or ULCodebookSubset = 'Partial + Non-coherent' | Bit field mapped to index (4 bits) | Non-coherent or ULCodebook Subset = 'Non-coherent' |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 1 layer: TPMI = 4 | 10 | 1 layer: TPMI = 4 | 10-15 | Reserved |
| ... | ... | ... | ... | | |
| 17 | 1 layer: TPMI = 11 | 17 | 1 layer: TPMI = 11 | | |
| 18 | 2 layers: TPMI = 6 | 18 | 2 layers: TPMI = 6 | | |
| ... | ... | ... | ... | | |
| 25 | 2 layers: TPMI = 13 | 25 | 2 layers: TPMI = 13 | | |
| 26 | 1 layers: TPMI = 12 | 26-31 | Reserved | | |
| ... | ... | | | | |
| 41 | 1 layers: TPMI = 27 | | | | |
| 42 | 2 layers: TPMI = 14 | | | | |
| ... | ... | | | | |
| 49 | 2 layers: TPMI = 21 | | | | |
| 50-63 | Reserved | | | | |

TABLE 42C

Precoding information and number of layers for 4 antenna ports, if ULmaxRank = 3

| Bit field mapped to index (6 bits) | Fully coherent ULCodebookSubset = 'Full + Partial + Non-coherent' | Bit field mapped to index (5 bits) | Partial coherent or ULCodebookSubset = 'Partial + Non-coherent' | Bit field mapped to index (4 bits) | Non-coherent or ULCodebook Subset = 'Non-coherent' |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 1 layer: TPMI = 4 | 11 | 1 layer: TPMI = 4 | 11-15 | Reserved |
| ... | ... | ... | ... | | |
| 18 | 1 layer: TPMI = 11 | 18 | 1 layer: TPMI = 11 | | |
| 19 | 2 layers: TPMI = 6 | 19 | 2 layers: TPMI = 6 | | |
| ... | ... | ... | ... | | |
| 26 | 2 layers: TPMI = 13 | 26 | 2 layers: TPMI = 13 | | |
| 27 | 3 layers: TPMI = 1 | 27 | 3 layers: TPMI = 1 | | |
| 28 | 3 layers: TPMI = 2 | 28 | 3 layers: TPMI = 2 | | |
| 29 | 1 layers: TPMI = 12 | 29-31 | Reserved | | |
| ... | ... | | | | |
| 44 | 1 layers: TPMI = 27 | | | | |
| 45 | 2 layers: TPMI = 14 | | | | |
| ... | ... | | | | |
| 52 | 2 layers: TPMI = 21 | | | | |
| 53 | 3 layers: TPMI = 3 | | | | |
| ... | ... | | | | |
| 56 | 3 layers: TPMI = 6 | | | | |
| 57-63 | Reserved | | | | |

TABLE 42D

Precoding information and number of layers for 4 antenna ports, if ULmaxRank = 4

| Bit field mapped to index (6 bits) | Fully coherent ULCodebookSubset = 'Full + Partial + Non-coherent' | Bit field mapped to index (5 bits) | Partial coherent or ULCodebookSubset = 'Partial + Non-coherent' | Bit field mapped to index (4 bits) | Non-coherent or ULCodebook Subset = 'Non-coherent' |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | Reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |

TABLE 42D-continued

Precoding information and number of layers for 4 antenna ports, if ULmaxRank = 4

| Bit field mapped to index (6 bits) | Fully coherent ULCodebookSubset = 'Full + Partial + Non-coherent' | Bit field mapped to index (5 bits) | Partial coherent or ULCodebookSubset = 'Partial + Non-coherent' | Bit field mapped to index (4 bits) | Non-coherent or ULCodebook Subset = 'Non-coherent' |
|---|---|---|---|---|---|
| . . . | . . . | | | | |
| 55 | 2 layers: TPMI = 21 | | | | |
| 56 | 3 layers: TPMI = 3 | | | | |
| . . . | . . . | | | | |
| 59 | 3 layers: TPMI = 6 | | | | |
| 60 | 4 layers: TPMI = 3 | | | | |
| 61 | 4 layers: TPMI = 4 | | | | |
| 62-63 | Reserved | | | | |

TABLE 43

States and #TPMI/TRI bits for separate configuration for 2 SRS ports

| | State s1 | | State s3 | |
|---|---|---|---|---|
| Max TRI | Number of pre-coders | #TPMI/TRI bits | Number of pre-coders | #TPMI/TRI bits |
| 1 | 6 | 3 | 2 | 1 |
| 2 | 9 | 4 | 3 | 2 |

TABLE 44

States and #TPMI/TRI bits for joint configuration for 2 SRS ports

| States for RRC configuration | State | Max TRI | Number of pre-coders | #TPMI/TRI bits |
|---|---|---|---|---|
| 1 | s1 | 1 | 6 | 3 |
| 2 | | 2 | 9 | 4 |
| 3 | s3 | 1 | 2 | 1 |
| 4 | | 2 | 3 | 2 |

TABLE 44A

Precoding information and number of layers for 2 antenna ports, if ULmaxRank = 1

| Bit field mapped to index (3 bits) | Fully coherent ULCodebookSubset = 'Full + Partial + Non-coherent' | Bit field mapped to index (1 bit) | Non-coherent or ULCodebookSubset = 'Non-coherent' |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | Reserved | | |

TABLE 44B

Precoding information and number of layers for 2 antenna ports, if ULmaxRank = 2

| Bit field mapped to index (4 bits) | Fully coherent ULCodebookSubset = 'Full + Partial + Non-coherent' | Bit field mapped to index (2 bits) | Non-coherent or ULCodebookSubset = 'Non-coherent' |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | Reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | Reserved | | |

In some embodiments 22, a UE is configured/indicated with a WB TPMI in DCI for CP-OFDM based UL MIMO transmission using a 4-Tx UL codebook (codebook for 4 SRS ports) wherein the codebook comprises rank 1-4 pre-coders/pre-coding matrices according to at least one (or a combination) of the following alternatives. In one alternative of Alt 22-0, the number of TPMIs and corresponding pre-coders/pre-coding matrices are according to TABLE 45. In another alternative of Alt 22-1, the number of TPMIs and corresponding pre-coders/pre-coding matrices are according to TABLE 45 except that the 4 pre-coding matrices for rank 3 and partial coherent case are replaced with the 4 pre-coding matrices for rank 3 and partial coherent case in TABLE 46.

In yet another alternative of Alt 22-2, the number of TPMIs and corresponding pre-coders/pre-coding matrices are according to TABLE 45 except that the 4 pre-coding matrices for rank 3 and partial coherent case are replaced with the 4 pre-coding matrices for rank 3 and partial coherent case in TABLE 46. In yet another alternative of Alt 22-3, the number of TPMIs and corresponding pre-coders/pre-coding matrices are according to TABLE 45 except that the 4 pre-coding matrices for rank 3 and partial coherent case are replaced with the 4 pre-coding matrices for rank 3 and partial coherent case in TABLE 48. In yet another alternative of Alt 22-4, the number of TPMIs and corresponding pre-coders/pre-coding matrices are according to TABLE 46. In yet another alternative of Alt 22-5, the number of TPMIs and corresponding pre-coders/pre-coding matrices are according to TABLE 47. In yet another alternative of Alt 22-6, the number of TPMIs and corresponding pre-coders/pre-coding matrices are according to TABLE 48. In yet another alternative of Alt 22-7, the same as TABLE 46 or TABLE 47 or TABLE 48 except that for rank 4. In such instance, for full coherent: 2 TPMIs are used that correspond to (i11=0,1; i2=0). In such instance, for partial coherent, 2 TPMIs are used that correspond to $$\frac{1}{a}\begin{bmatrix} 1 & 1 & 0 & 0 \\ 0 & 0 & 1 & 1 \\ 1 & -1 & 0 & 0 \\ 0 & 0 & 1 & -1 \end{bmatrix}, \frac{1}{a}\begin{bmatrix} 1 & 1 & 0 & 0 \\ 0 & 0 & 1 & 1 \\ j & -j & 0 & 0 \\ 0 & 0 & j & -j \end{bmatrix}$$

where a=2 or a=√8=2√2. In yet another alternative of Alt 22-8, the number of TPMIs and corresponding pre-coders/pre-coding matrices are according to TABLE 58.

The number of TPMIs depends on the UE capability (reported by the UE) as follows. In one example, if the UE is capable of full coherent transmission (reports in UE capability report), then the UE can be configured/indicated with a TPMI corresponding to any of the full coherent, partial coherent, or non-coherent pre-coders/pre-coding matrices. So, the number of bits required for TPMI indication for a given rank is $\lceil \log_2 B \rceil$ where B is the total number of full coherent, partial coherent, and non-coherent pre-coding matrices.

In another example, if the UE is capable of partial coherent transmission (reports in UE capability report), then the UE can be configured/indicated with a TPMI corresponding to any of the partial coherent, or non-coherent pre-coders/pre-coding matrices. So, the number of bits required for TPMI indication for a given rank is $\lceil \log_2 B \rceil$ where B is the total number of partial coherent, and non-coherent pre-coding matrices.

In yet another example, if the UE is capable of non-coherent transmission (reports in UE capability report), then the UE can be configured/indicated with a TPMI corresponding to only non-coherent pre-coders/pre-coding matrices. So, the number of bits required for TPMI indication for a given rank is $\lceil \log_2 B \rceil$ where B is the total number of non-coherent pre-coding matrices.

TABLE 45

TPMIs and number of pre-coders/pre-coding matrices for each rank, and UE coherence capability

| Rank | Full coherent | Partial coherent | Non-coherent |
|---|---|---|---|
| 1 | NR specification DL Type I, rank 1 codebook with CodeBookMode = 1, but with O1 = 2 (i11 = 0,1,2,3; i2 = 0,1,2,3) (16 TPMIs) | LTE specification, TPMI index = 16 – 23 (8 TPMIs) | 4 identity pre-coders (each selecting one of the 4 antennas) (4 TPMIs) |
| 2 | NR specification DL Type I, rank 2 codebook with CodeBookMode = 1, but with O1 = 2 and i1,3 = 0 (i11 = 0,1,2,3; i2 = 0,1) (8 TPMIs) | LTE specification, TPMI index = 0 – 7, but with $2^{nd}$ and $3^{rd}$ ports swapped. (8 TPMIs) | 6 identity pre-coder pairs: (1,2), (1,3), (1,4), (2,3), (2,4), (3,4) (6 TPMIs) |
| 3 | NR specification DL Type I, rank 3 codebook for < 16 ports with CodeBookMode = 1-2, but with O1 = 2 (i11 = 0,1,2,3; i2 = 0,1) (8 TPMIs) | 4 precoders, each having one of the two forms: $\frac{1}{\sqrt{N}}\begin{bmatrix} x_1 & x_3 & 0 \\ 0 & 0 & x_5 \\ x_2 & x_4 & 0 \\ 0 & 0 & x_6 \end{bmatrix}; \frac{1}{\sqrt{N}}\begin{bmatrix} x_1 & 0 & 0 \\ 0 & x_3 & x_5 \\ x_2 & 0 & 0 \\ 0 & x_4 & x_6 \end{bmatrix}$ where $x_i \in \{1, -1, j, -j\}$ or $x_i \in \{1, -1\}$ N = 6 or other value (4 TPMIs) | 1 identity pre-coder triple: (1,2,3) (1 TPMI) |
| 4 | 0 TPMI | 0 TPMI | Identity matrix (1 TPMI) |

TABLE 46

TPMIs and number of pre-coders/pre-coding matrices for each rank, and UE coherence capability

| Rank | Full coherent | Partial coherent | Non-coherent |
|---|---|---|---|
| 1 | Same as TABLE 45 | Same as TABLE 45 | Same as TABLE 45 |
| 2 | Same as TABLE 45 | Same as TABLE 45 | Same as TABLE 45 |

TABLE 46-continued

TPMIs and number of pre-coders/pre-coding matrices for each rank, and UE coherence capability

| Rank | Full coherent | Partial coherent | Non-coherent |
|---|---|---|---|
| 3 | NR specification DL Type I, rank 3 codebook for < 16 ports with CodeBookMode = 1-2, but with O1 = 2, (i11 = 0,1; and i2 = 0,1) (4 TPMIs) | $\frac{1}{\sqrt{6}}\begin{bmatrix} 1 & 1 & 0 \\ 0 & 0 & 1 \\ 1 & -1 & 0 \\ 0 & 0 & 1 \end{bmatrix}, \frac{1}{\sqrt{6}}\begin{bmatrix} 1 & 1 & 0 \\ 0 & 0 & 1 \\ 1 & -1 & 0 \\ 0 & 0 & -1 \end{bmatrix},$ $\frac{1}{\sqrt{6}}\begin{bmatrix} 1 & 0 & 0 \\ 0 & 1 & 1 \\ 1 & 0 & 0 \\ 0 & 1 & -1 \end{bmatrix}, \frac{1}{\sqrt{6}}\begin{bmatrix} 1 & 0 & 0 \\ 0 & 1 & 1 \\ -1 & 0 & 0 \\ 0 & 1 & -1 \end{bmatrix}$ (4 TPMIs) | 1 identity pre-coder triple: (1,2,3) (1 TPMI) |
| 4 | NR specification DL Type I, rank 4 codebook for < 16 ports with CodeBookMode = 1-2, but with O1 = 2, (i11 = 0,1; and i2 = 0,1) (4 TPMIs) | 0 TPMI | Identity matrix (1 TPMI) |

TABLE 47

TPMIs and number of pre-coders/pre-coding matrices for each rank, and UE coherence capability

| Rank | Full coherent | Partial coherent | Non-coherent |
|---|---|---|---|
| 1 | Same as TABLE 45 | Same as TABLE 45 | Same as TABLE 45 |
| 2 | Same as TABLE 45 | Same as TABLE 45 | Same as TABLE 45 |
| 3 | NR specification DL Type I, rank 3 codebook for < 16 ports with CodeBookMode = 1-2, but with O1 = 2, (i11 = 0,1; and i2 = 0,1) (4 TPMIs) | $\frac{1}{2}\begin{bmatrix} \frac{1}{\sqrt{2}} & \frac{1}{\sqrt{2}} & 0 \\ 0 & 0 & 1 \\ \frac{1}{\sqrt{2}} & -\frac{1}{\sqrt{2}} & 0 \\ 0 & 0 & 1 \end{bmatrix},$ $\frac{1}{2}\begin{bmatrix} \frac{1}{\sqrt{2}} & \frac{1}{\sqrt{2}} & 0 \\ 0 & 0 & 1 \\ \frac{1}{\sqrt{2}} & -\frac{1}{\sqrt{2}} & 0 \\ 0 & 0 & -1 \end{bmatrix},$ $\frac{1}{2}\begin{bmatrix} 1 & 0 & 0 \\ 0 & \frac{1}{\sqrt{2}} & \frac{1}{\sqrt{2}} \\ 1 & 0 & 0 \\ 0 & \frac{1}{\sqrt{2}} & -\frac{1}{\sqrt{2}} \end{bmatrix},$ $\frac{1}{2}\begin{bmatrix} 1 & 0 & 0 \\ 0 & \frac{1}{\sqrt{2}} & \frac{1}{\sqrt{2}} \\ -1 & 0 & 0 \\ 0 & \frac{1}{\sqrt{2}} & -\frac{1}{\sqrt{2}} \end{bmatrix}$ (4 TPMIs) | 1 identity pre-coder triple: (1,2,3) (1 TPMI) |

TABLE 47-continued

TPMIs and number of pre-coders/pre-coding matrices for each rank, and UE coherence capability

| Rank | Full coherent | Partial coherent | Non-coherent |
|---|---|---|---|
| 4 | NR specification DL Type I, rank 4 codebook for < 16 ports with CodeBookMode = 1-2, but with O1 = 2, (i11 = 0,1; and i2 = 0,1) (4 TPMIs) | 0 TPMI | Identity matrix (1 TPMI) |

TABLE 48

TPMIs and number of pre-coders/pre-coding matrices for each rank, and UE coherence capability

| Rank | Full coherent | Partial coherent | Non-coherent |
|---|---|---|---|
| 1 | Same as TABLE 45 | Same as TABLE 45 | Same as TABLE 45 |
| 2 | Same as TABLE 45 | Same as TABLE 45 | Same as TABLE 45 |
| 3 | NR specification DL Type I, rank 3 codebook for < 16 ports with CodeBookMode = 1-2, but with O1 = 2, (i11 = 0,1; and i2 = 0,1) (4 TPMIs) | $\frac{1}{2}\begin{bmatrix}1&0&0\\0&0&1\\0&1&0\\0&0&1\end{bmatrix}, \frac{1}{2}\begin{bmatrix}1&0&0\\0&0&1\\0&1&0\\0&0&-1\end{bmatrix},$ $\frac{1}{2}\begin{bmatrix}1&0&0\\0&1&0\\1&0&0\\0&0&1\end{bmatrix}, \frac{1}{2}\begin{bmatrix}1&0&0\\0&1&0\\-1&0&0\\0&0&1\end{bmatrix}$ (4 TPMIs) | 1 identity pre-coder triple: (1,2,3) (1 TPMI) |
| 4 | NR specification DL Type I, rank 4 codebook for < 16 ports with CodeBookMode = 1-2, but with O1 = 2, (i11 = 0,1; and i2 = 0,1) (4 TPMIs) | 0 TPMI | Identity matrix (1 TPMI) |

TABLE 49

Codebook for transmission on antenna ports {40,41,42,43} with v = 1

| TPMI index | | Number of layers v = 1 |
|---|---|---|
| Numbering scheme 1 | Numbering scheme 2 | (ordered from left to right in increasing order of TPMI index) |
| 12-19 | 0-7 | $\frac{1}{2}\begin{bmatrix}1\\1\\1\\1\end{bmatrix} \frac{1}{2}\begin{bmatrix}1\\1\\j\\j\end{bmatrix} \frac{1}{2}\begin{bmatrix}1\\1\\-1\\-1\end{bmatrix} \frac{1}{2}\begin{bmatrix}1\\1\\-j\\-j\end{bmatrix} \frac{1}{2}\begin{bmatrix}1\\j\\1\\j\end{bmatrix} \frac{1}{2}\begin{bmatrix}1\\j\\j\\-1\end{bmatrix} \frac{1}{2}\begin{bmatrix}1\\j\\-1\\-j\end{bmatrix} \frac{1}{2}\begin{bmatrix}1\\j\\-j\\1\end{bmatrix}$ |
| 20-27 | 8-15 | $\frac{1}{2}\begin{bmatrix}1\\-1\\1\\-1\end{bmatrix} \frac{1}{2}\begin{bmatrix}1\\-1\\j\\-j\end{bmatrix} \frac{1}{2}\begin{bmatrix}1\\-1\\-1\\1\end{bmatrix} \frac{1}{2}\begin{bmatrix}1\\-1\\-j\\j\end{bmatrix} \frac{1}{2}\begin{bmatrix}1\\-j\\1\\-j\end{bmatrix} \frac{1}{2}\begin{bmatrix}1\\-j\\j\\1\end{bmatrix} \frac{1}{2}\begin{bmatrix}1\\-j\\-1\\j\end{bmatrix} \frac{1}{2}\begin{bmatrix}1\\-j\\-j\\-1\end{bmatrix}$ |

TABLE 49-continued

Codebook for transmission on antenna ports {40,41,42,43} with v = 1

| TPMI index | | Number of layers v = 1 |
|---|---|---|
| Numbering scheme 1 | Numbering scheme 2 | (ordered from left to right in increasing order of TPMI index) |
| 4-11 | 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 0-3 | 24-27 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ |

In some embodiments, rank indicator or transmit rank indicator (RI or TRI) is equivalently referred to as number of layers. For example, RI or TRI=1 is equivalent to number of layers=1, RI or TRI=2 is equivalent to number of layers=2, RI or TRI=3 is equivalent to number of layers=3, and RI or TRI=4 is equivalent to number of layers=4.

In sub-embodiment 22A, the rank 1-4 codebook table according to Alt 22-4 (or TABLE 46) is as shown in TABLE 49-TABLE 52. The corresponding TRI/TPMI indication payload (bits) is shown in TABLE 53. For a given TRI value or number of layers, precoders in the UL codebook are indexed by TPMI indices according to at least one of the following schemes. In numbering scheme 1, TPMI indices for non-coherent precoders are numbered first starting from index 0 to index N1−1, where N1 is the number of non-coherent precoders, TPMI indices for partial coherent precoders are numbered next starting from index N1 to index N1+N2−1, where N2 is the number of partial coherent precoders, and finally TPMI indices for full coherent precoders are numbered starting from index N1+N2 to index N1+N2+N3−1, where N3 is the number of full coherent precoders. In numbering scheme 2, TPMI indices for full coherent precoders are numbered first starting from index 0 to index N3−1, TPMI indices for partial coherent precoders are numbered next starting from index N3 to index N2+N3−1, and finally TPMI indices for non-coherent precoders are numbered starting from index N2+N3 to index N1+N2+N3−1. The TPMI indices according to the two numbering schemes are shown in TABLE 49-TABLE 52.

In sub-embodiment 22B, the rank 1-4 codebook table according to Alt 22-4 (or TABLE 46) is as shown in TABLE 49-TABLE 52 except that the precoding scaling factor $$\left(\frac{1}{a}\right)$$

in the beginning of the pre-coder expressions are replaced with—for all rank and coherence types.

TABLE 50

Codebook for transmission on antenna ports {40,41,42,43} with v = 2

| TPMI index | | Number of layers v = 2 |
|---|---|---|
| Numbering scheme 1 | Numbering scheme 2 | (ordered from left to right in increasing order of TPMI index) |
| 14-17 | 0-3 | $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ |
| 18-21 | 4-7 | $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ |
| 6-9 | 8-11 | $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ |

TABLE 50-continued

Codebook for transmission on antenna ports {40,41,42,43} with v = 2

| TPMI index | | Number of layers v = 2 |
|---|---|---|
| Numbering scheme 1 | Numbering scheme 2 | (ordered from left to right in increasing order of TPMI index) |
| 10-13 | 12-15 | $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & 1\end{bmatrix}$ |
| 0-3 | 16-19 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-5 | 20-21 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ |

TABLE 51

Codebook for transmission on antenna ports {40,41,42,43} with v = 3

| TPMI index | | Number of layers v = 3 |
|---|---|---|
| Numbering scheme 1 | Numbering scheme 2 | (ordered from left to right in increasing order of TPMI index) |
| 5-8 | 0-3 | $\frac{1}{2\sqrt{3}}\begin{bmatrix}1 & 1 & 1\\1 & -1 & 1\\1 & 1 & -1\\1 & -1 & -1\end{bmatrix}$ $\frac{1}{2\sqrt{3}}\begin{bmatrix}1 & 1 & 1\\1 & -1 & 1\\j & j & -j\\j & -j & -j\end{bmatrix}$ $\frac{1}{2\sqrt{3}}\begin{bmatrix}1 & 1 & 1\\1 & -j & j\\1 & 1 & -1\\j & -j & -j\end{bmatrix}$ $\frac{1}{2\sqrt{3}}\begin{bmatrix}1 & 1 & 1\\j & -j & j\\j & j & -j\\-1 & 1 & 1\end{bmatrix}$ |
| 1-4 | 4-7 | $\frac{1}{\sqrt{6}}\begin{bmatrix}1 & 0 & 0\\0 & 1 & 1\\1 & 0 & 0\\0 & 1 & -1\end{bmatrix}$ $\frac{1}{\sqrt{6}}\begin{bmatrix}1 & 0 & 0\\0 & 1 & 1\\-1 & 0 & 0\\0 & 1 & -1\end{bmatrix}$ $\frac{1}{\sqrt{6}}\begin{bmatrix}0 & 1 & 1\\1 & 0 & 0\\0 & 1 & -1\\1 & 0 & 0\end{bmatrix}$ $\frac{1}{\sqrt{6}}\begin{bmatrix}0 & 1 & 1\\1 & 0 & 0\\0 & 1 & -1\\-1 & 0 & 0\end{bmatrix}$ |
| 0 | 8 | $\frac{1}{2}\begin{bmatrix}1 & 0 & 0\\0 & 1 & 0\\0 & 0 & 1\\0 & 0 & 0\end{bmatrix}$ |

TABLE 52

Codebook for transmission on antenna ports {40,41,42,43} with v = 4

| TPMI index | | Number of layers v = 4 |
|---|---|---|
| Numbering scheme 1 | Numbering scheme 2 | (ordered from left to right in increasing order of TPMI index) |
| 1-4 | 0-3 | $\frac{1}{4}\begin{bmatrix}1 & 1 & 1 & 1\\1 & -1 & 1 & -1\\1 & 1 & -1 & -1\\1 & -1 & -1 & 1\end{bmatrix}$ $\frac{1}{4}\begin{bmatrix}1 & 1 & 1 & 1\\1 & -1 & 1 & -1\\j & j & -j & -j\\j & -j & -j & j\end{bmatrix}$ $\frac{1}{4}\begin{bmatrix}1 & 1 & 1 & 1\\j & -j & j & -j\\1 & 1 & -1 & -1\\j & -j & -j & j\end{bmatrix}$ $\frac{1}{4}\begin{bmatrix}1 & 1 & 1 & 1\\j & -j & j & -j\\j & j & -j & -j\\-1 & 1 & 1 & -1\end{bmatrix}$ |

TABLE 52-continued

Codebook for transmission on antenna ports {40,41,42,43} with v = 4

| TPMI index | | Number of layers v = 4 |
|---|---|---|
| Numbering scheme 1 | Numbering scheme 2 | (ordered from left to right in increasing order of TPMI index) |
| 0 | 4 | $\frac{1}{4}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 53

TPMI/TRI indication payload (bits)

| | Full coherent | | Partial coherent | | Non coherent | |
|---|---|---|---|---|---|---|
| Rank | #pre-coding matrices | #TPMI bits | #pre-coding matrices | #TPMI bits | #pre-coding matrices | #TPMI bits |
| 1 | 16 + 8 + 4 = 28 | 5 | 8 + 4 = 12 | 4 | 4 | 2 |
| 2 | 8 + 8 + 6 = 22 | 5 | 8 + 6 = 14 | 4 | 6 | 3 |
| 3 | 4 + 4 + 1 = 9 | 4 | 4 + 1 = 5 | 3 | 1 | 0 |
| 4 | 4 + 0 + 1 = 5 | 3 | 0 + 1 = 1 | 0 | 1 | 0 |
| Total | 64 | 6 (if TRI/TPMI are indicated jointly) | 32 | 5 (if TRI/TPMI are indicated jointly) | 12 | 4 (if TRI/TPMI are indicated jointly) |

In sub-embodiment 22C, the rank 1-4 codebook table is as shown in TABLE 54-TABLE 57. Note that the pre-coders/pre-coding matrices for rank 1, rank 2, and rank 4 and full-coherent case are identical to (TPMI 0-15), (TPMI 0-7, and (TPMI 0-3) in TABLE 49, TABLE 50, and TABLE 52, respectively. For rank 3 and full-coherent, the 4 pre-coding matrices for (TPMI 0-3) are $$\frac{1}{2\sqrt{3}}\begin{bmatrix} 1 & 1 & 1 \\ 1 & -1 & 1 \\ 1 & 1 & -1 \\ 1 & -1 & -1 \end{bmatrix}, \frac{1}{2\sqrt{3}}\begin{bmatrix} 1 & 1 & 1 \\ 1 & -1 & 1 \\ j & j & -j \\ j & -j & -j \end{bmatrix},$$

$$\frac{1}{2\sqrt{3}}\begin{bmatrix} 1 & 1 & 1 \\ -1 & 1 & -1 \\ 1 & 1 & -1 \\ -1 & 1 & 1 \end{bmatrix}, \text{ and } \frac{1}{2\sqrt{3}}\begin{bmatrix} 1 & 1 & 1 \\ -1 & 1 & -1 \\ j & j & -j \\ -j & j & j \end{bmatrix}.$$

TABLE 54

Codebook for transmission on antenna ports {40,41,42,43} with v = 1

| # TPMIs (TPMI index) | Number of layers v = 1 (ordered from left to right in increasing order of TPMI index) | Minimum Coherence Capability |
|---|---|---|
| 16 (0-15) | NR Rel. 15 4 port DL Type I codebook with CodeBookMode = 1, and $O_1 = 2$ | Fully Coherent |
| 8 (16-23) | $\frac{1}{2}\begin{bmatrix}1\\0\\1\\0\end{bmatrix} \frac{1}{2}\begin{bmatrix}1\\0\\-1\\0\end{bmatrix} \frac{1}{2}\begin{bmatrix}1\\0\\j\\0\end{bmatrix} \frac{1}{2}\begin{bmatrix}1\\0\\-j\\0\end{bmatrix} \frac{1}{2}\begin{bmatrix}0\\1\\0\\1\end{bmatrix} \frac{1}{2}\begin{bmatrix}0\\1\\0\\-1\end{bmatrix} \frac{1}{2}\begin{bmatrix}0\\1\\0\\j\end{bmatrix} \frac{1}{2}\begin{bmatrix}0\\1\\0\\-j\end{bmatrix}$ | Partially Coherent |

TABLE 54-continued

Codebook for transmission on antenna ports {40,41,42,43} with v = 1

| # TPMIs (TPMI index) | Number of layers v = 1 (ordered from left to right in increasing order of TPMI index) | Minimum Coherence Capability |
|---|---|---|
| 4 (24-27) | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ | Non-Coherent |

TABLE 55

Codebook for transmission on antenna ports {40,41,42,43} with v = 2

| # TPMIs (TPMI index) | Number of layers v = 2 (ordered from left to right in increasing order of TPMI index) | Minimum Coherence Capability |
|---|---|---|
| 8 (0-7) | NR specification 4 port DL Type I codebook with CodeBookMode = 1, $O_1 = 2$ and $i_{1,3} = 0$ | Fully Coherent |
| 8 (8-15) | $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ | Partially Coherent |
| 4 (16-19) | $\frac{1}{2}\begin{bmatrix}1&0\\0&1\\0&0\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ $\frac{1}{2}\begin{bmatrix}0&0\\0&0\\1&0\\0&1\end{bmatrix}$ | Non-Coherent |

TABLE 56

Codebook for transmission on antenna ports {40,41,42,43} with v = 3

| # TPMIs (TPMI index) | Number of layers v = 3 (ordered from left to right in increasing order of TPMI index) | Minimum Coherence Capability |
|---|---|---|
| 4 (0-3) | NR specification 4 port DL Type I codebook with CodeBookMode = 1-2, $O_1 = 2$; $i_{1,1} \in \{0,2\}$; $i_{1,3} = 0$ | Fully Coherent |
| 4 (4-7) | $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ | Partially Coherent |
| 1 (8) | $\frac{1}{2}\begin{bmatrix}1&0&0\\0&1&0\\0&0&1\\0&0&0\end{bmatrix}$ | Non-Coherent |

TABLE 57

Codebook for transmission on antenna ports {40,41,42,43} with v = 4

| # TPMIs (TPMI index) | Number of layers v = 4 (ordered from left to right in increasing order of TPMI index) | Minimum Coherence Capability |
|---|---|---|
| 4 (0-3) | NR specification 4 port DL Type I codebook with CodeBookMode = 1-2, $O_1 = 2$; $i_{1,1} \in \{0,1\}$; $i_{1,3} = 0$ | Fully Coherent |
| 2 (4-5) | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | Partially Coherent |
| 1 (6) | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | Non-Coherent |

TABLE 58

TPMIs and number of pre-coders/pre-coding matrices for each rank, and UE coherence capability

| Rank | Full coherent | Partial coherent | Non-coherent |
|---|---|---|---|
| 1 | Same as TBALE 45 | Same as TBALE 45 | Same as TBALE 45 |
| 2 | Same as TABLE 45 | Same as TBALE 45 | Same as TBALE 45 |
| 3 | NR Rel. 15 DL Type I, rank 3 codebook for < 16 ports with CodeBookMode = 1-2, but with O1 = 2, (i11 = 0,2; and i2 = 0,1) (4 TPMIs) | $\frac{1}{2}\begin{bmatrix} 1 & 0 & 0 \\ 0 & 1 & 0 \\ 1 & 0 & 0 \\ 0 & 0 & 1 \end{bmatrix}$, $\frac{1}{2}\begin{bmatrix} 1 & 0 & 0 \\ 0 & 1 & 0 \\ -1 & 0 & 0 \\ 0 & 0 & 1 \end{bmatrix}$ (2 TPMIs) | 1 identity pre-coder triple: (1,2,3) (1 TPMI) |
| 4 | NR Rel. 15 DL Type I, rank 4 codebook for < 16 ports with CodeBookMode = 1-2, but with O1 = 2, (i11 = 0; and i2 = 0,1) (2 TPMIs) | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$, $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ (2 TPMI) | Identity matrix (1 TPMI) |

In sub-embodiment 22D, the 4-Tx UL codebook is according to Alt 22-8. In particular, the rank 1 codebook is according to TABLE 49. The rank 2 codebook is according to TABLE 50. The rank 3 codebook is according to one of TABLE 59 or TABLE 60. The rank 4 codebook is according to one of TABLE 61 or TABLE 62. The corresponding TRI/TPMI indication payload (bits) is shown in TABLE 63.

TABLE 59

Codebook for transmission on antenna ports {40,41,42,43} with v = 3

| TPMI index | | Number of layers v = 3 (ordered from left to right in increasing order of TPMI index) |
|---|---|---|
| Numbering scheme 1 | Numbering scheme 2 | |
| 3-6 | 0-3 | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ $\frac{1}{2\sqrt{3}}\begin{bmatrix} 1 & 1 & 1 \\ 1 & -1 & 1 \\ j & j & -j \\ j & -j & -j \end{bmatrix}$ $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ $\frac{1}{2\sqrt{3}}\begin{bmatrix} 1 & 1 & 1 \\ -1 & 1 & -1 \\ j & j & -j \\ -j & j & j \end{bmatrix}$ |

TABLE 59-continued

Codebook for transmission on antenna ports {40,41,42,43} with v = 3

| TPMI index | | Number of layers v = 3 |
| Numbering scheme 1 | Numbering scheme 2 | (ordered from left to right in increasing order of TPMI index) |
| --- | --- | --- |
| 1-2 | 4-5 | $\frac{1}{2}\begin{bmatrix} 1 & 0 & 0 \\ 0 & 1 & 0 \\ 1 & 0 & 0 \\ 0 & 0 & 1 \end{bmatrix}$  $\frac{1}{2}\begin{bmatrix} 1 & 0 & 0 \\ 0 & 1 & 0 \\ -1 & 0 & 0 \\ 0 & 0 & 1 \end{bmatrix}$ |
| 0 | 6 | $\frac{1}{2}\begin{bmatrix} 1 & 0 & 0 \\ 0 & 1 & 0 \\ 0 & 0 & 1 \\ 0 & 0 & 0 \end{bmatrix}$ |

TABLE 60

Codebook for transmission on antenna ports {40,41,42,43} with v = 3

| TPMI index | | Number of layers v = 3 |
| Numbering scheme 1 | Numbering scheme 2 | (ordered from left to right in increasing order of TPMI index) |
| --- | --- | --- |
| 3-6 | 0-3 | $\frac{1}{2\sqrt{3}}\begin{bmatrix} 1 & 1 & 1 \\ 1 & 1 & -1 \\ 1 & -1 & 1 \\ 1 & -1 & -1 \end{bmatrix}$  $\frac{1}{2\sqrt{3}}\begin{bmatrix} 1 & 1 & 1 \\ 1 & 1 & -1 \\ j & -j & j \\ j & -j & -j \end{bmatrix}$  $\frac{1}{2\sqrt{3}}\begin{bmatrix} 1 & 1 & 1 \\ -1 & -1 & 1 \\ 1 & -1 & 1 \\ -1 & 1 & 1 \end{bmatrix}$  $\frac{1}{2\sqrt{3}}\begin{bmatrix} 1 & 1 & 1 \\ -1 & -1 & 1 \\ j & -j & j \\ -j & j & j \end{bmatrix}$ |
| 1-2 | 4-5 | $\frac{1}{2}\begin{bmatrix} 1 & 0 & 0 \\ 0 & 1 & 0 \\ 1 & 0 & 0 \\ 0 & 0 & 1 \end{bmatrix}$  $\frac{1}{2}\begin{bmatrix} 1 & 0 & 0 \\ 0 & 1 & 0 \\ -1 & 0 & 0 \\ 0 & 0 & 1 \end{bmatrix}$ |
| 0 | 6 | $\frac{1}{2}\begin{bmatrix} 1 & 0 & 0 \\ 0 & 1 & 0 \\ 0 & 0 & 1 \\ 0 & 0 & 0 \end{bmatrix}$ |

TABLE 61

Codebook for transmission on antenna ports {40, 41, 42, 43} with v = 4

| TPMI index | | Number of layers v = 4 |
| Numbering scheme 1 | Numbering scheme 2 | (ordered from left to right in increasing order of TPMI index) |
| --- | --- | --- |
| 3-4 | 0-1 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$  $\frac{1}{4}\begin{bmatrix} 1 & 1 & 1 & 1 \\ 1 & -1 & 1 & -1 \\ j & j & -j & -j \\ j & -j & -j & j \end{bmatrix}$ |
| 1-2 | 2-3 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$  $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ |
| 0 | 4 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 62

Codebook for transmission on antenna ports {40, 41, 42, 43} with v = 4

| TPMI index | | Number of layers v = 4 |
|---|---|---|
| Numbering scheme 1 | Numbering scheme 2 | (ordered from left to right in increasing order of TPMI index) |
| 3-4 | 0-1 | $\frac{1}{4}\begin{bmatrix} 1 & 1 & 1 & 1 \\ 1 & 1 & -1 & -1 \\ 1 & -1 & 1 & -1 \\ 1 & -1 & -1 & 1 \end{bmatrix} \quad \frac{1}{4}\begin{bmatrix} 1 & 1 & 1 & 1 \\ 1 & 1 & -1 & -1 \\ j & -j & j & -j \\ j & -j & -j & j \end{bmatrix}$ |
| 1-2 | 2-3 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix} \quad \frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ |
| 0 | 4 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

TABLE 63

TPMI/TRI indication payload (bits)

| | Full coherent | | Partial coherent | | Non coherent | |
|---|---|---|---|---|---|---|
| Rank | #pre-coding matrices | #TPMI bits | #pre-coding matrices | #TPMI bits | #pre-coding matrices | #TPMI bits |
| 1 | 16 + 8 + 4 = 28 | 5 | 8 + 4 = 12 | 4 | 4 | 2 |
| 2 | 8 + 8 + 6 = 22 | 5 | 8 + 6 = 14 | 4 | 6 | 3 |
| 3 | 4 + 2 + 1 = 7 | 4 | 2 + 1 = 3 | 3 | 1 | 0 |
| 4 | 2 + 2 + 1 = 5 | 3 | 2 + 1 = 3 | 0 | 1 | 0 |
| Total | 62 | 6 (if TRI/TPMI are indicated jointly) | 32 | 5 (if TRI/TPMI are indicated jointly) | 12 | 4 (if TRI/TPMI are indicated jointly) |

Figure 10:
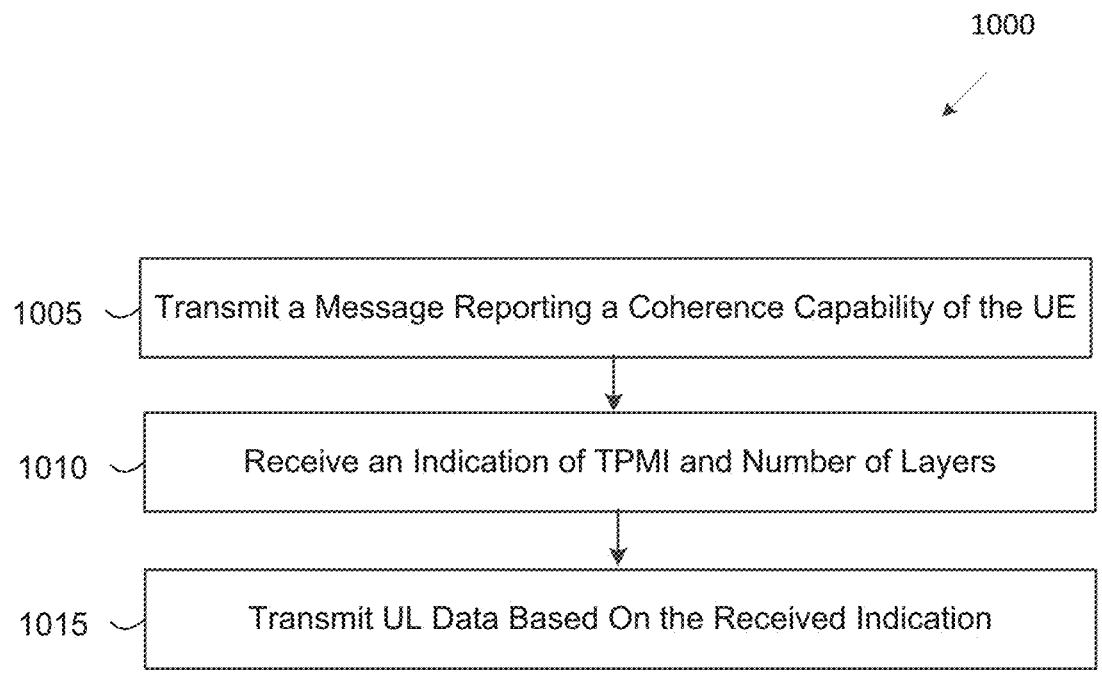
FIG. 10 illustrates a flowchart of a method for uplink MIMO codebook operation according to embodiments of the present disclosure.

FIG. 10 illustrates a flowchart of a method 1000 for uplink MIMO codebook operation, as may be performed by a UE, such as UE 300 in FIG. 3, according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

The process begins with the UE transmitting a message reporting a coherence capability (step 1005). For example, in step 1005, the UE may report the UE's coherence capability for an indication of a TPMI and a number of layers to the BS. For example, the UE may have 2, 4, or 8 antenna ports and may be able to transmit and/or receive on all, some, or only one of the antenna ports. In these scenarios, the UE may report full, partial, and non-coherency, respectively.

The UE then receives an indication of the TPMI and the number of layers (step 1010). For example, in step 1010, the UE receive the indication via DCI signaling. Here, the number of bits in the DCI signaling for the indication is determined by a coherence state that depends on the coherence capability reported by the UE. For example, the BS may configure a one of three coherence states from among full, partial, or non-coherence states where each coherence state corresponds to a subset of an UL codebook for the indication of the TPMI and the number of layers. The coherence state is configured for the UE by the BS based on and not to exceed the coherence capability reported by the UE. For example, if the UE reports full coherence, the BS may configure any of the full, partial, or non-coherence states such that the UE uses/is configured for: any of the full, partial, or non-coherence precoders for the full coherence state; partial or non-coherence precoders for the partial coherence state; and only non-coherence precoders for the non-coherence coherence state. In this manner, the BS may save bits in DCI signaling by configuring the not-too-exceed state rather than always configuring and signaling the full coherence state. In one embodiment, the UE may also receive ULCodebookSubset and ULmaxRank via higher-layer, radio-resource-control (RRC) signaling where ULCodebookSubset indicates the configured coherence state and ULmaxRank indicates a value for a maximum number of the number of layers. Here, the UE may determine the coherence state and the value for the maximum number layers and the number of bits in the DCI signaling for the indication is determined by the coherence state and the value for the maximum number of layers.

Thereafter, the UE transmits UL data based on the received indication of the TPMI and the number of layers (step 1015). For example, in step 1015, the UE selects the precoder according to the configured state and then precodes and transmits the precoded data via PUSCH.

Although FIG. 10 illustrates an example of method for uplink MIMO codebook operation by a UE various changes could be made to FIG. 10. For example, while shown as a series of steps, various steps in each figure could overlap, occur in parallel, occur in a different order, occur multiple times, or not be performed in one or more embodiments. In another embodiment, the method can be implemented by a BS such as the BS 200 in FIG. 2, but from the opposite perspective, i.e., receiving what the UE transmits and transmitting what the UE receives as described in connection with FIG. 10.

In the rest of the present disclosure, UL antenna ports refer to SRS ports. In some embodiments, a UE reports its coherence capability for UL MIMO transmission. As an example, the UE can be capable of at least one of the following UL transmission. In one example of full coherence, all ports can be transmitted coherently. In another example of partial coherence, port pairs can be transmitted coherently. In yet another example of non-coherence, no port pairs can be transmitted coherently.

An N-Tx codebook for N ports in at least one resource ins proposed where the higher rank (rank>1) codebook is designed using all or a subset of pre-coders in the rank-1 (or 1 layer) codebook. In one example, for DL, N∈{2,4,8,12, 16,24,32} and the at least one resource corresponds to CSI-RS resource. In another example, for UL, N∈{2,4,8} and the at least one resource corresponds to SRS resource. For UL, the N ports correspond to one or more SRS resources according to at least one of the following alternatives: a single SRS resource comprising N ports; N/2 SRS resources each comprising 2 ports; and N SRS resources each comprising 1 port.

The rank 1-4 codebook can be partitioned into two (CB0, CB1) or three (CB0, CB1, CB2) types of codebooks (CB). In one example of CB0, the first codebook comprises pre-coders that combine all N ports (all N entries in a pre-coder are non-zero). In other words, the pre-coders assume full coherence that all ports can be transmitted coherently. In another example of CB1, the second codebook comprises pre-coders that combine N/2 ports (N/2 entries in a pre-coder are non-zero and the remaining N/2 entries are zero). In other words, the pre-coders assume partial coherence that port pairs can be transmitted coherently. In yet another example of CB2, the third codebook comprises N port selection pre-coders that select 1 out of N ports (1 entry in a pre-coder is non-zero and the remaining N−1 entries are zero). In other words, the pre-coders assume non-coherence that no port pairs can be transmitted coherently.

For N=2, as an example, the rank 1 and rank-2 codebook tables are obtained by selecting a subset of pre-coding matrices (or a subset of Codebook-indices) in TABLE 64. For N=4, as an example, the rank 1, rank 2, rank-3, and rank-4 codebook tables are obtained by selecting a subset of pre-coding matrices (or a subset of Codebook-indices) in TABLE 65, TABLE 66, TABLE 67, and TABLE 68, respectively.

In some embodiments, the scaling factor a in the UL codebook is either fixed or configured via higher layer (e.g. RRC) or MAC CE based or DCI based signaling.

TABLE 64

Codebook for transmission on 2 antenna ports {3000, 3001} and rank v

| Codebook (or TPMI) index | v = 1 | v = 2 |
|---|---|---|
| 0 | $\frac{1}{a}\begin{bmatrix}1\\1\end{bmatrix}$ | $\frac{1}{a\sqrt{2}}\begin{bmatrix}1 & 1\\1 & -1\end{bmatrix}$ |
| 1 | $\frac{1}{a}\begin{bmatrix}1\\-1\end{bmatrix}$ | $\frac{1}{a\sqrt{2}}\begin{bmatrix}1 & 1\\j & -j\end{bmatrix}$ |
| 2 | $\frac{1}{a}\begin{bmatrix}1\\j\end{bmatrix}$ | $\frac{1}{a\sqrt{2}}\begin{bmatrix}1 & 0\\0 & 1\end{bmatrix}$ |
| 3 | $\frac{1}{a}\begin{bmatrix}1\\-j\end{bmatrix}$ | |
| 4 | $\frac{1}{a}\begin{bmatrix}1\\0\end{bmatrix}$ | |
| 5 | $\frac{1}{a}\begin{bmatrix}0\\1\end{bmatrix}$ | |

TABLE 65

Codebook for transmission on 4 antenna ports {3000, 3001, 3002, 3003} with v = 1

| Codebook (or TPMI) index | Number of layers v = 1 (ordered from left to right in increasing order of TPMI index) |
|---|---|
| 0-7 | $\frac{1}{a}\begin{bmatrix}1\\1\\1\\-1\end{bmatrix}$ $\frac{1}{a}\begin{bmatrix}1\\1\\j\\j\end{bmatrix}$ $\frac{1}{a}\begin{bmatrix}1\\1\\-1\\1\end{bmatrix}$ $\frac{1}{a}\begin{bmatrix}1\\1\\-j\\-j\end{bmatrix}$ $\frac{1}{a}\begin{bmatrix}1\\j\\1\\j\end{bmatrix}$ $\frac{1}{a}\begin{bmatrix}1\\j\\j\\1\end{bmatrix}$ $\frac{1}{a}\begin{bmatrix}1\\j\\-1\\-j\end{bmatrix}$ $\frac{1}{a}\begin{bmatrix}1\\j\\-j\\-1\end{bmatrix}$ |
| 8-15 | $\frac{1}{a}\begin{bmatrix}1\\-1\\1\\1\end{bmatrix}$ $\frac{1}{a}\begin{bmatrix}1\\-1\\j\\-j\end{bmatrix}$ $\frac{1}{a}\begin{bmatrix}1\\-1\\-1\\-1\end{bmatrix}$ $\frac{1}{a}\begin{bmatrix}1\\-1\\-j\\j\end{bmatrix}$ $\frac{1}{a}\begin{bmatrix}1\\-j\\1\\-j\end{bmatrix}$ $\frac{1}{a}\begin{bmatrix}1\\-j\\j\\-1\end{bmatrix}$ $\frac{1}{a}\begin{bmatrix}1\\-j\\-1\\j\end{bmatrix}$ $\frac{1}{a}\begin{bmatrix}1\\-j\\-j\\1\end{bmatrix}$ |

TABLE 65-continued

Codebook for transmission on 4 antenna ports {3000, 3001, 3002, 3003} with v = 1

| Codebook (or TPMI) index | Number of layers v = 1 (ordered from left to right in increasing order of TPMI index) |
|---|---|
| 16-23 | $\frac{1}{a}\begin{bmatrix}1\\0\\1\\0\end{bmatrix}$ $\frac{1}{a}\begin{bmatrix}1\\0\\-1\\0\end{bmatrix}$ $\frac{1}{a}\begin{bmatrix}1\\0\\j\\0\end{bmatrix}$ $\frac{1}{a}\begin{bmatrix}1\\0\\-j\\0\end{bmatrix}$ $\frac{1}{a}\begin{bmatrix}0\\1\\0\\1\end{bmatrix}$ $\frac{1}{a}\begin{bmatrix}0\\1\\0\\-1\end{bmatrix}$ $\frac{1}{a}\begin{bmatrix}0\\1\\0\\j\end{bmatrix}$ $\frac{1}{a}\begin{bmatrix}0\\1\\0\\-j\end{bmatrix}$ |
| 24-27 | $\frac{1}{a}\begin{bmatrix}1\\0\\0\\0\end{bmatrix}$ $\frac{1}{a}\begin{bmatrix}0\\1\\0\\0\end{bmatrix}$ $\frac{1}{a}\begin{bmatrix}0\\0\\1\\0\end{bmatrix}$ $\frac{1}{a}\begin{bmatrix}0\\0\\0\\1\end{bmatrix}$ |

TABLE 66

Codebook for transmission on 4 antenna ports {3000, 3001, 3002, 3003} with v = 2

| Codebook (or TPMI) index | Number of layers v = 2 (ordered from left to right in increasing order of TPMI index) |
|---|---|
| 0-7<br>8-15 | $p_{0,2}$ $p_{1,3}$ $p_{4,6}$ $p_{5,7}$ $p_{8,10}$ $p_{9,11}$ $p_{12,14}$ $p_{13,15}$<br>$p_{16,17}$ $p_{18,19}$ $p_{20,21}$ $p_{22,23}$ $p_{24,25}$ $p_{25,26}$ $p_{25,27}$ $p_{24,27}$ | where $p_{m,n} = \frac{1}{\sqrt{2}}[v_m \ v_n]$ and $v_m$ and $v_n$ are the rank-1 pre-coders corresponding to Codebook indices m and n, respectively in TABLE 65

TABLE 67

Codebook for transmission on 4 antenna ports {3000, 3001, 3002, 3003} with v = 3

| Codebook (or TPMI) index | Number of layers v = 3 (ordered from left to right in increasing order of TPMI index) |
|---|---|
| 0-7<br>8-15 | $p_{0,2,8}$ $p_{0,2,10}$ $p_{1,3,9}$ $p_{1,3,11}$ $p_{4,6,12}$ $p_{4,6,14}$ $p_{5,7,13}$ $p_{5,7,15}$<br>$p_{16,17,20}$ $p_{16,17,21}$ $p_{18,19,22}$ $p_{18,19,23}$ $p_{24,25,26}$ $p_{24,25,27}$ $p_{24,26,27}$ $p_{25,26,27}$ | where $p_{m,n,p} = \frac{1}{\sqrt{3}}[v_m \ v_n \ v_p]$ and $v_m$, $v_n$, and $v_p$ are the rank-1 pre-coders corresponding to Codebook indices m, n, and p, respectively in TABLE 65

TABLE 68

Codebook for transmission on antenna ports {3000, 3001, 3002, 3003} with v = 4

| Codebook (or TPMI) index | Number of layers v = 4 (ordered from left to right in increasing order of TPMI index) |
|---|---|
| 0-6 | $p_{0,2,8,10}$ $p_{1,3,9,11}$ $p_{4,6,12,14}$ $p_{5,7,13,15}$ $p_{16,17,20,21}$ $p_{18,19,22,23}$ $p_{24,25,26,27}$ | where $p_{m,n,p,q} = \frac{1}{2}[v_m \ v_n \ v_p \ v_q]$ and $v_m$, $v_n$, $v_p$, and $v_q$ are the rank-1 pre-coders corresponding to Codebook indices m, n, p, and q, respectively in TBALE 65

In the present disclosure, codebook index and rank are referred to as transmit PMI (TPMI), and transmit RI (TRI), respectively. In case of multiple SRS resources configured to a UE, the UE is configured/indicated with at least one SRS resource indicator (SRI) that selects the at least one SRS resource via UL-related DCI. The present disclosure includes embodiments related to codebook subset restriction for the N-port UL codebook.

In some embodiments 23, a UE is configured with a CBSR on the UL codebook via higher-layer signaling (e.g. RRC) to restrict the precoding matrices for TPMI/TRI/SRI indication (via UL-related DCI signaling) to a subset of all pre-coding matrices in the UL codebook. In case of multiple SRS resources configured to a UE, the SRI indication can include a single SRI or multiple SRIs. Similarly, the TPMI indication can include a single TPMI or multiple TPMIs, and TRI indication can include a single TRI or multiple TRIs. The CBSR restricts at least one of coherence or codebook partition types, or TRI values.

The subset of precoding matrices for TPMI/TRI/SRI indication is determined and/or configured according to at least one of the following alternatives. In one alternative of Alt 23-0, neither coherence or codebook partition types nor TRI values are restricted. That is, there is no CBSR via RRC signaling. In one alternative of Alt 23-1, the CBSR restricts coherence or codebook partition types but not TRI values, where $L=\lceil \log_2(2^{M_N}-1)\rceil$ bits bitmap $B=b_0 \ldots b_{L-1}$ is used to restrict the coherence or codebook partition types for an N-port UL codebook, where $M_N$ is number of coherence or codebook partition types. Note that $M_2=2$ for N=2 which corresponds to (CB0, CB2), and $M_4=3$ for N=4 which corresponds to (CB0, CB1, CB2). Hence, for example, for N=2, L=2 bits are used, and for N=4, L=3 bits are used. Here, the restriction is common for all rank or TRI values. In a variation, the CBSR restricts coherence or codebook partition types independently for each rank or TRI value, wherein $L=N \lceil\log_2(2^{M_N}-1)\rceil$ bits are used to restrict the coherence or codebook partition types for an N-port UL codebook. For example, for N=2, L=4 bits are used, and for N=4, L=12 bits are used.

In one alternative of Alt 23-2, the CBSR restricts TRI values but not coherence or codebook partition types, where L=N bits bitmap $B=b_0 \ldots b_{L-1}$ is used to restrict the TRI values for an N-port UL codebook. For example, for N=2, L=2 bits are used, and for N=4, L=4 bits are used.

In one alternative of Alt 23-2-0, when TRI and TPMI are separately encoded and/or indicated, then the number of bits for TRI indication is adjusted based on the CBSR on TRI values. For example, for N=4, CBSR restricts the TRI values to {1, 2}, then 1-bit indication is used to indicate a TRI value in the UL-related DCI signaling in addition to TPMI/SRI indication. Note that 1-bit is saved in the TRI indication in the UL-related DCI due to the CBSR on TRI values. The DCI payload (number of bits) either remains the same regardless of the CBSR or is reduced by the number of bits that is saved by CBSR on TRI value. If the DCI payload remains the same, then zero padding is used to keep the payload the same where zero(s) are padded either as LSBs or MSBs bits.

In one alternative of Alt 23-2-1, when TRI and TPMI are jointly encoded and/or indicated, then the TRI/TPMI payload (number of bits) either remains the same regardless of the CBSR or is reduced to the number of bits that is required to indicate the TRI/TPMI using the precoders that are not restricted via CBSR on RI values. Likewise, the DCI payload (number of bits) either remains the same regardless of the CBSR or is reduced by the number of bits that is saved by CBSR. If the TRI/TPMI or DCI payload remain the same, then zero padding is used to keep the payload the same where zero(s) are padded either as LSBs or MSBs bits.

In one alternative of Alt 23-3, the CBSR restricts both coherence or codebook partition types and TRI values, where $L=L_1+L_2$ bits bitmap $B=B_1B_2$ or $B_1B_2=b_0 \ldots b_{L_1-1} b_{L_1} \ldots b_{L_1+L_2-1}$ or $b_0 \ldots b_{L_2-1}b_{L_2} \ldots b_{L_1+L_2-1}$ is used to restrict the coherence or codebook partition types and TRI values for an N-port UL codebook, where $L_1=\lceil\log_2(2^{M_N}-1)\rceil$ bits are used for CBSR on coherence or codebook partition types and $L_2=N$ bits are used for CBSR on TRI values For example, for N=2, L=2+2=4 bits are used, and for N=4, L=3+4=7 bits are used.

In one alternative of 23-3-0, when TRI and TPMI are separately encoded/indicated, then the number of bits for TRI and TPMI indication are adjusted based on the CBSR on TRI values. For example, for N=4, CBSR restricts the TRI values to {1, 2} and coherence or codebook partition type to CB0, then 1-bit indication is used to indicate a TRI value and 4-bit indication is used to indicate a TPMI value from TABLE 65 (if TRI=1) in the UL-related DCI signaling in addition to TPMI/SRI indication. Note that 1-bit is saved in the TRI indication and 1-bit is saved in the TPMI indication in the UL-related DCI due to the CBSR on TRI values and coherence or codebook partition types. The DCI payload (number of bits) either remains the same regardless of the CBSR or is reduced by the number of bits that is saved by CBSR on TRI value and coherence or codebook partition types. If the DCI payload remains the same, then zero padding is used to keep the payload the same where zero(s) are padded either as LSBs or MSBs bits.

In one alternative of 23-3-1, when TRI and TPMI are jointly encoded/indicated, then the TRI/TPMI payload (number of bits) either remains the same regardless of the CBSR or is reduced to the number of bits that is required to indicate the TRI/TPMI using the precoders that are not restricted via CBSR on RI values and coherence or codebook partition types. Likewise, the DCI payload (number of bits) either remains the same regardless of the CBSR or is reduced by the number of bits that is saved by CBSR. If the TRI/TPMI or DCI payload remain the same, then zero padding is used to keep the payload the same where zero(s) are padded either as LSBs or MSBs bits. In the bitmap $B=b_0 \ldots b_{L-1}$, the bit $b_0$ is the least significant bit (LSB) and the bit $b_{L-1}$ is the most significant bit (MSB). Alternatively, the bit $b_0$ is the MSB and the bit $b_{L-1}$ is the LSB)

The bitmap or a part of the bitmap B for CBSR to restrict coherence or codebook partition types is according to at least one of the following. In one alternative of Alt 23-4, 2-bit bitmap $B=b_0b_1$ is used for the codebook partition type pair (CBx, CBy), where (x, y) is either (0,1), (1,2), or (1,2), where either $b_0$ is the most significant bit (MSB) and $b_1$ is the least significant bit (LSB) or $b_0$ is the LSB and $b_1$ is the MSB. In one alternative of Alt 23-5, 3-bit bitmap $B=b_0b_1b_2$ is used the codebook partition type triple (CB0, CB1, CB2), where either $b_0$ is the MSB and $b_2$ is the LSB or $b_0$ is the LSB and $b_2$ is the MSB.

If a bit $b_1=0$, then the corresponding codebook partition type CBi is not used for TPMI indication, and if a bit $b_1=1$, then the corresponding codebook partition type CBi is used for TPMI indication. Alternatively, if a bit $b_1=1$, then the corresponding codebook partition type CBi is not used for TPMI indication, and if a bit $b_1=0$, then the corresponding codebook partition type CBi is used for TPMI indication.

If the bitmap B is independent for all or a subset of rank 1-4, then the bitmap B is a concatenation of R bitmaps $B_0 \ldots B_{R-1}$, where R is the number of rank values that we have independent bitmap for. For example, R=4, then the bitmap B is a concatenation of 4 bitmaps $B_0 \ldots B_3$, where $B_0$ is the bitmap for rank value 1, and $B_3$ is the bitmap for rank value 4, or, $B_0$ is the bitmap for rank value 4, and $B_3$ is the bitmap for rank value 1. The explanation of the bitmap $B=b_0 \ldots b_{L-1}$ to restrict TRI values is similar.

An example TPMI and transmit rank indicator (TRI) payload size table (assuming CB0, CB1, CB2 can be used for TPMI indication) is shown in TABLE 69 where the rank 1-4 codebooks are assumed to be TABLE 65, TABLE 66, TABLE 67, and TABLE 68. If any two of CB0, CB1, or CB2 can be used for TPMI indication, then the table reduces to 3 rows from TABLE 69 (2 for one of the two codebook partition types and 1 for both codebook partition types).

TABLE 69

TPMI and TRI payload

| Bitmap | | | Separate TPMI and TRI indication bits (2 bits for TRI) | | | | Joint TPMI and TRI indication bits |
| --- | --- | --- | --- | --- | --- | --- | --- |
| CB2 | CB1 | CB0 | Rank 1 | Rank 2 | Rank 3 | Rank 4 | |
| 0 | 0 | 1 | $\lceil \log_2(16) \rceil = 4$ | $\lceil \log_2(8) \rceil = 3$ | $\lceil \log_2(8) \rceil = 3$ | $\lceil \log_2(4) \rceil = 2$ | $\lceil \log_2(16 + 8 + 8 + 4) \rceil = 5$ |
| 0 | 1 | 0 | $\lceil \log_2(8) \rceil = 3$ | $\lceil \log_2(4) \rceil = 2$ | $\lceil \log_2(4) \rceil = 2$ | $\lceil \log_2(2) \rceil = 1$ | $\lceil \log_2(8 + 4 + 4 + 2) \rceil = 5$ |
| 1 | 0 | 0 | $\lceil \log_2(4) \rceil = 2$ | $\lceil \log_2(4) \rceil = 2$ | $\lceil \log_2(4) \rceil = 2$ | $\lceil \log_2(1) \rceil = 0$ | $\lceil \log_2(4 + 4 + 4 + 1) \rceil = 4$ |
| 0 | 1 | 1 | $\lceil \log_2(16 + 8) \rceil = 5$ | $\lceil \log_2(8 + 4) \rceil = 4$ | $\lceil \log_2(8 + 4) \rceil = 4$ | $\lceil \log_2(4 + 2) \rceil = 3$ | $\lceil \log_2(24 + 12 + 12 + 6) \rceil = 6$ |
| 1 | 0 | 1 | $\lceil \log_2(16 + 4) \rceil = 5$ | $\lceil \log_2(8 + 4) \rceil = 4$ | $\lceil \log_2(8 + 4) \rceil = 4$ | $\lceil \log_2(4 + 1) \rceil = 3$ | $\lceil \log_2(20 + 12 + 12 + 5) \rceil = 6$ |
| 1 | 1 | 0 | $\lceil \log_2(8 + 4) \rceil = 4$ | $\lceil \log_2(4 + 4) \rceil = 3$ | $\lceil \log_2(4 + 4) \rceil = 3$ | $\lceil \log_2(2 + 1) \rceil = 2$ | $\lceil \log_2(12 + 8 + 8 + 3) \rceil = 5$ |
| 1 | 1 | 1 | $\lceil \log_2(16 + 8 + 4) \rceil = 5$ | $\lceil \log_2(8 + 4 + 4) \rceil = 4$ | $\lceil \log_2(8 + 4 + 4) \rceil = 4$ | $\lceil \log_2(4 + 2 + 1) \rceil = 3$ | $\lceil \log_2(28 + 16 + 16 + 7) \rceil = 7$ |

In some embodiments 24, the bitmap $B=B_1B_2$ is used CBSR on coherence or codebook partition types and TRI values, where the part $B_1$ of the bitmap is used for coherence or codebook partition types and the part $B_2$ of the bitmap is used for TRI values. Alternatively, the part $B_2$ of the bitmap is used for coherence or codebook partition types and the part $B_1$ of the bitmap is used for TRI values. Also, either $B_1$ corresponds to MSB bits and $B_2$ corresponds to LSB bits or $B_1$ corresponds to LSB bits and $B_2$ corresponds to MSB bits. A length-N bitmap is used for CBSR on TRI values, and at least one of the following alternatives is used for CBSR on coherence or codebook partition types.

In one alternative of Alt 24-0, if the UE is capable of full coherence, then it is also capable of partial coherence and non-coherence. Therefore, a 3-bit bitmap B can be used to configure one of the 7 possible sets of pre-coders (or codebook partition type combinations). Two example tables for this configuration and corresponding TPMI overhead (number of bits) are shown in TABLE 70 and TABLE 71. Alternatively, a 2-bit field F is used to configure one of the three codebook partition types (CB0, CB1, and CB2) where, for example, CB0, CB1, and CB2 are indicated by F=00, 01, 10, or 10, 01, 00, respectively.

If the UE is capable of partial coherence, then it is also capable of non-coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 72 and TABLE 73. Alternatively, a 1-bit field F is used to configure one of the two codebook partition types (CB1 and CB2) where, for example, CB1 and CB2 are indicated by F=0 and 1 or 1 and 0, respectively.

If the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case

TABLE 70

Codebook configuration and TPMI payload

| | Bitmap for TPMI index (TABLE 70) | | | |
| --- | --- | --- | --- | --- |
| CBSR bitmap field | CB2: 24-27 | CB1: 16-23 | CB0: 0-15 | TPMI bits |
| 0 | 0 | 0 | 1 | 4 |
| 1 | 0 | 1 | 0 | 3 |
| 2 | 1 | 0 | 0 | 2 |
| 3 | 0 | 1 | 1 | 5 |
| 4 | 1 | 0 | 1 | 5 |
| 5 | 1 | 1 | 0 | 4 |
| 6 | 1 | 1 | 1 | 5 |

TABLE 71

Codebook configuration and TPMI payload

| | Bitmap for TPMI index (TABLE 70) | | | |
| --- | --- | --- | --- | --- |
| CBSR bitmap field | CB0: 0-15 | CB1: 16-23 | CB2: 24-27 | TPMI bits |
| 0 | 0 | 0 | 1 | 2 |
| 1 | 0 | 1 | 0 | 3 |
| 2 | 1 | 0 | 0 | 4 |
| 3 | 0 | 1 | 1 | 4 |
| 4 | 1 | 0 | 1 | 5 |
| 5 | 1 | 1 | 0 | 5 |
| 6 | 1 | 1 | 1 | 5 |

TABLE 72

Codebook configuration and TPMI payload

| CBSR bitmap field | Bitmap for TPMI index (TABLE 70) | | TPMI bits |
|---|---|---|---|
| | CB2: 24-27 | CB1: 16-23 | |
| 0 | 0 | 1 | 3 |
| 1 | 1 | 0 | 2 |
| 2 | 1 | 1 | 4 |

TABLE 73

Codebook configuration and TPMI payload

| CBSR bitmap field | Bitmap for TPMI index (TABLE 65.) | | TPMI bits |
|---|---|---|---|
| | CB1: 16-23 | CB2: 24-27 | |
| 0 | 0 | 1 | 2 |
| 1 | 1 | 0 | 3 |
| 2 | 1 | 1 | 4 |

In one alternative of Alt 24-1, if the UE is capable of full coherence, then it is also capable of partial coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 74 and TABLE 75. Alternatively, a 1-bit field F is used to configure one of the two codebook partition types (CB0 and CB1) where, for example, CB0 and CB1 are indicated by F=0 and 1 or 1 and 0, respectively.

If the UE is capable of partial coherence, then it is also capable of non-coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 72 and TABLE 73. Alternatively, a 1-bit field F is used to configure one of the two codebook partition types (CB1 and CB2) where, for example, CB1 and CB2 are indicated by F=0 and 1 or 1 and 0, respectively.

If the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

TABLE 74

Codebook configuration and TPMI payload

| CBSR bitmap field | Bitmap for TPMI index (TABLE 70) | | TPMI bits |
|---|---|---|---|
| | CB1: 16-23 | CB0: 0-15 | |
| 0 | 0 | 1 | 4 |
| 1 | 1 | 0 | 3 |
| 2 | 1 | 1 | 5 |

TABLE 75

Codebook configuration and TPMI payload

| CBSR bitmap field | Bitmap for TPMI index (TABLE 70) | | TPMI bits |
|---|---|---|---|
| | CB0: 0-15 | CB1: 16-23 | |
| 0 | 0 | 1 | 3 |
| 1 | 1 | 0 | 4 |
| 2 | 1 | 1 | 5 |

In one alternative of Alt 24-2, if the UE is capable of full coherence, then it is also capable of partial coherence. Therefore, a 2-bit bitmap B can be used to configure one of the 3 possible sets of pre-coders (or codebook partition type combinations). Two example tables for this configuration and corresponding TPMI overhead (number of bits) are shown in TABLE 74 and TABLE 75. Alternatively, a 1-bit field F is used to configure one of the two codebook partition types (CB0 and CB1) where, for example, CB0 and CB1 are indicated by F=0 and 1 or 1 and 0, respectively.

If the UE is capable of partial coherence, then it is only capable of partial coherence. Hence, the set of pre-coders (or codebook partition type) is fixed (CB1), and there is no need for additional signaling for codebook or partition type configuration via RRC. Note that TPMI payload is 3 bits in this case.

If the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

In one alternative of Alt 24-3, if the UE is capable of partial coherence, then it is also capable of non-coherence. Therefore, a 2-bit bitmap B can be used to configure one of the 3 possible sets of precoders (or codebook partition type combinations). Two example tables for this configuration and corresponding TPMI overhead (number of bits) are shown in TABLE 72 and TABLE 73. Alternatively, a 1-bit field F is used to configure one of the two codebook partition types (CB1 and CB2) where, for example, CB1 and CB2 are indicated by F=0 and 1 or 1 and 0, respectively.

If the UE is capable of full coherence, then it is only capable of full coherence. Hence, the set of pre-coders (or codebook partition type) is fixed (CB0), and there is no need for additional signaling for codebook or partition type configuration via RRC. Note that TPMI payload is 4 bits in this case.

If the UE is capable of non-coherence, then it is only capable of non-coherence. Hence, the set of pre-coders (or codebook partition type) is fixed (CB2), and there is no need for additional signaling for codebook or partition type configuration via RRC. Note that TPMI payload is 2 bits in this case.

In some embodiments 25, in addition to CBSR on coherence or codebook partition types and TRI values according to at least one of Alt 23-0 through Alt 23-3 (e.g. embodiments 23), CBSR also restricts the use of each pre-coding matrix in the UL codebook. For example, a bitmap $B_3$ is used where the bitmap $B_3$ is a concatenation of R bitmaps $B_0 \ldots B_{R-1}$, where R is the number of rank values that we have CBSR for. For example, R=4, then the bitmap B is a concatenation of 4 bitmaps $B_{3,0} \ldots B_{3,3}$, where $B_{3,0}$ is the bitmap for rank value 1, and $B_{3,3}$ is the bitmap for rank value 4, or, $B_{3,0}$ is the bitmap for rank value 4, and $B_{3,3}$ is the bitmap for rank value 1. So, the total length of the bitmap is $N=\Sigma_{i=1}^{4}N_i$ where $N_i$ is the number of pre-coding matrices in rank-i codebook.

TPMI-related signaling field size (number of bits) in an UL-related DCI is determined according to the number of pre-coding matrices after applying the codebook subset restriction to the UL codebook.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE), the UE comprising
a processor; and
a transceiver operably connected to the processor, the transceiver configured to:
transmit, to a base station (BS), a message reporting a coherence capability of the UE for an indication of a transmit precoding matrix indicator (TPMI) and a number of layers,
receive, from the BS, ULCodebookSubset and ULmaxRank via higher-layer, radio-resource-control (RRC) signaling, where ULCodebookSubset indicates a codebook for a coherence state and is based on the coherence capability reported by the UE and where ULmaxRank indicates a maximum value for the number of layers,
receive, from the BS, the indication of the TPMI and the number of layers via downlink control information (DCI) signaling, and
transmit, to the BS, uplink (UL) data via a physical uplink shared channel (PUSCH) based on the received indication of the TPMI and the number of layers,
wherein a number of bits in the DCI signaling for the indication of the TPMI and the number of layers is based on the codebook and the maximum value for the number of layers.

2. The UE of claim 1, wherein the processor is configured to determine the coherence state and the maximum value for the number of layers.

3. The UE of claim 1, wherein:
the coherence state is one of three coherence states where each coherence state corresponds to a subset of an UL codebook for the indication of the TPMI and the number of layers;
the coherence state is configured for the UE by the BS based on and not to exceed the coherence capability reported by the UE;
the coherence capability reported by the UE is one of full, partial, or non-coherence;
for a first of the three coherence states, the subset of the UL codebook includes full, partial, and non-coherent precoders;
for a second of the three coherence states, the subset of the UL codebook includes only the partial and non-coherent precoders; and
for a third of the three coherence states, the subset of the UL codebook includes only the non-coherent precoders.

4. The UE of claim 1, wherein for four antenna ports at the UE, an UL codebook for the indication of the TPMI includes port selection precoders $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \text{ and } \frac{1}{2}\begin{bmatrix}0\\0\\0\\1\end{bmatrix}.$$

5. The UE of claim 1, wherein, when the number of layers=1, a precoder for UL transmission using four antenna ports by the UE is determined based on a TPMI index in the indication of the TPMI and the number of layers according to:

| TPMI index | Number of layers v = 1 (ordered from left to right in increasing order of TPMI index) |
|---|---|
| 12-19 | $\frac{1}{2}\begin{bmatrix}1\\1\\1\\1\end{bmatrix}, \frac{1}{2}\begin{bmatrix}1\\1\\j\\j\end{bmatrix}, \frac{1}{2}\begin{bmatrix}1\\1\\-1\\-1\end{bmatrix}, \frac{1}{2}\begin{bmatrix}1\\1\\-j\\-j\end{bmatrix}, \frac{1}{2}\begin{bmatrix}1\\j\\1\\j\end{bmatrix}, \frac{1}{2}\begin{bmatrix}1\\j\\j\\-1\end{bmatrix}, \frac{1}{2}\begin{bmatrix}1\\j\\-1\\-j\end{bmatrix}, \frac{1}{2}\begin{bmatrix}1\\j\\-j\\1\end{bmatrix}$ |
| 20-27 | $\frac{1}{2}\begin{bmatrix}1\\-1\\1\\-1\end{bmatrix}, \frac{1}{2}\begin{bmatrix}1\\-1\\j\\-j\end{bmatrix}, \frac{1}{2}\begin{bmatrix}1\\-1\\-1\\1\end{bmatrix}, \frac{1}{2}\begin{bmatrix}1\\-1\\-j\\j\end{bmatrix}, \frac{1}{2}\begin{bmatrix}1\\-j\\1\\-j\end{bmatrix}, \frac{1}{2}\begin{bmatrix}1\\-j\\j\\1\end{bmatrix}, \frac{1}{2}\begin{bmatrix}1\\-j\\-1\\j\end{bmatrix}, \frac{1}{2}\begin{bmatrix}1\\-j\\-j\\-1\end{bmatrix}$ |
| 4-11 | $\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}, \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}$ |

| TPMI index | Number of layers v = 1 (ordered from left to right in increasing order of TPMI index) |
|---|---|
| 0-3 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$. |

6. The UE of claim 1, wherein, when the number of layers=2, a precoder for UL transmission using four antenna ports by the UE is determined based on a TPMI index in the indication of the TPMI and the number of layers according to:

| TPMI index | Number of layers v = 2 (ordered from left to right in increasing order of TPMI index) |
|---|---|
| 14-17 | $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ |
| 18-21 | $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ |
| 6-9 | $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ |
| 10-13 | $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ |
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-5 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$. |

7. The UE of claim 1, wherein, when the number of layers=3, a precoder for UL transmission using four antenna ports by the UE is determined based on a TPMI index in the indication of the TPMI and the number of layers according to:

| TPMI index | Number of layers v = 3 (ordered from left to right in increasing order of TPMI index) |
|---|---|
| 3-6 | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$, $\frac{1}{2\sqrt{3}}\begin{bmatrix} 1 & 1 & 1 \\ 1 & -1 & 1 \\ j & j & -j \\ j & -j & -j \end{bmatrix}$, $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$, $\frac{1}{2\sqrt{3}}\begin{bmatrix} 1 & 1 & 1 \\ -1 & 1 & -1 \\ j & j & -j \\ -j & j & j \end{bmatrix}$ |
| 1-2 | $\frac{1}{2}\begin{bmatrix} 1 & 0 & 0 \\ 0 & 1 & 0 \\ 1 & 0 & 0 \\ 0 & 0 & 1 \end{bmatrix}$, $\frac{1}{2}\begin{bmatrix} 1 & 0 & 0 \\ 0 & 1 & 0 \\ -1 & 0 & 0 \\ 0 & 0 & 1 \end{bmatrix}$ |
| 0 | $\frac{1}{2}\begin{bmatrix} 1 & 0 & 0 \\ 0 & 1 & 0 \\ 0 & 0 & 1 \\ 0 & 0 & 0 \end{bmatrix}$. |

8. The UE of claim 1, wherein, when the number of layers=4, a precoder for UL transmission using four antenna ports by the UE is determined based on a TPMI index in the indication of the TPMI and the number of layers according to:

| TPMI index | Number of layers v = 4 (ordered from left to right in increasing order of TPMI index) |
|---|---|
| 3-4 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$, $\frac{1}{4}\begin{bmatrix} 1 & 1 & 1 & 1 \\ 1 & -1 & 1 & -1 \\ j & j & -j & -j \\ j & -j & -j & j \end{bmatrix}$ |
| 1-2 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$, $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ |
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$. |

9. A base station (BS), the BS comprising
a processor; and
a transceiver operably connected to the processor, the transceiver configured to:
receive, from a user equipment (UE), a message reporting a coherence capability of the UE for an indication of a transmit precoding matrix indicator (TPMI) and a number of layers,
transmit, to the UE, ULCodebookSubset and ULmaxRank via higher-layer, radio-resource-control (RRC) signaling, where ULCodebookSubset indicates a codebook for a coherence state and is based on the coherence capability reported by the UE and where ULmaxRank indicates a maximum value for the number of layers,
transmit, to the UE, the indication of the TPMI and the number of layers via downlink control information (DCI) signaling, and
receive, from the UE, uplink (UL) data via a physical uplink shared channel (PUSCH) based on the transmitted indication of the TPMI and the number of layers,
wherein a number of bits in the DCI signaling for the indication of the TPMI and the number of layers is based on the codebook and the maximum value for the number of layers.

10. The BS of claim 9, wherein:
the coherence state is one of three coherence states where each coherence state corresponds to a subset of an UL codebook for the indication of the TPMI and the number of layers;
the coherence state is configured for the UE by the BS based on and not to exceed the coherence capability reported by the UE;
the coherence capability reported by the UE is one of full, partial, or non-coherence;
for a first of the three coherence states, the subset of the UL codebook includes full, partial, and non-coherent precoders;
for a second of the three coherence states, the subset of the UL codebook includes only the partial and non-coherent precoders; and
for a third of the three coherence states, the subset of the UL codebook includes only the non-coherent precoders.

11. The BS of claim 9, wherein for four antenna ports at the UE, an UL codebook for the indication of the TPMI includes port selection precoders $$\frac{1}{2}\begin{bmatrix} 1 \\ 0 \\ 0 \\ 0 \end{bmatrix}, \frac{1}{2}\begin{bmatrix} 0 \\ 1 \\ 0 \\ 0 \end{bmatrix}, \frac{1}{2}\begin{bmatrix} 0 \\ 0 \\ 1 \\ 0 \end{bmatrix}, \text{ and } \frac{1}{2}\begin{bmatrix} 0 \\ 0 \\ 0 \\ 1 \end{bmatrix}.$$

12. The BS of claim 9, wherein, when the number of layers=1, a precoder for UL transmission using four antenna ports by the UE is determined based on a TPMI index in the indication of the TPMI and the number of layers according to:

| TPMI index | Number of layers v = 1 (ordered from left to right in increasing order of TPMI index) |
|---|---|
| 12-19 | $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ |
| 20-27 | $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ |
| 4-11 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 0-3 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$. |

13. The BS of claim 9, wherein, when the number of layers=2, a precoder for UL transmission using four antenna ports by the UE is determined based on a TPMI index in the indication of the TPMI and the number of layers according to:

| TPMI index | Number of layers v = 2 (ordered from left to right in increasing order of TPMI index) |
|---|---|
| 14-17 | $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ |
| 18-21 | $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ |
| 6-9 | $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ |
| 10-13 | $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ |

-continued

| TPMI index | Number of layers v = 2 (ordered from left to right in increasing order of TPMI index) |
|---|---|
| 0-3 | $\frac{1}{2}\begin{bmatrix} 1 & 0 \\ 0 & 1 \\ 0 & 0 \\ 0 & 0 \end{bmatrix}$ $\frac{1}{2}\begin{bmatrix} 1 & 0 \\ 0 & 0 \\ 0 & 1 \\ 0 & 0 \end{bmatrix}$ $\frac{1}{2}\begin{bmatrix} 1 & 0 \\ 0 & 0 \\ 0 & 0 \\ 0 & 1 \end{bmatrix}$ $\frac{1}{2}\begin{bmatrix} 0 & 0 \\ 1 & 0 \\ 0 & 1 \\ 0 & 0 \end{bmatrix}$ |
| 4-5 | $\frac{1}{2}\begin{bmatrix} 0 & 0 \\ 1 & 0 \\ 0 & 0 \\ 0 & 1 \end{bmatrix}$ $\frac{1}{2}\begin{bmatrix} 0 & 0 \\ 0 & 0 \\ 1 & 0 \\ 0 & 1 \end{bmatrix}$. |

14. The BS of claim 9, wherein, when the number of layers=3, a precoder for UL transmission using four antenna ports by the UE is determined based on a TPMI index in the indication of the TPMI and the number of layers according to:

| TPMI index | Number of layers v = 3 (ordered from left to right in increasing order of TPMI index) |
|---|---|
| 3-6 | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ $\frac{1}{2\sqrt{3}}\begin{bmatrix} 1 & 1 & 1 \\ 1 & -1 & 1 \\ j & j & -j \\ j & -j & -j \end{bmatrix}$ $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ $\frac{1}{2\sqrt{3}}\begin{bmatrix} 1 & 1 & 1 \\ -1 & 1 & -1 \\ j & j & -j \\ -j & j & j \end{bmatrix}$ |
| 1-2 | $\frac{1}{2}\begin{bmatrix} 1 & 0 & 0 \\ 0 & 1 & 0 \\ 1 & 0 & 0 \\ 0 & 0 & 1 \end{bmatrix}$ $\frac{1}{2}\begin{bmatrix} 1 & 0 & 0 \\ 0 & 1 & 0 \\ -1 & 0 & 0 \\ 0 & 0 & 1 \end{bmatrix}$ |
| 0 | $\frac{1}{2}\begin{bmatrix} 1 & 0 & 0 \\ 0 & 1 & 0 \\ 0 & 0 & 1 \\ 0 & 0 & 0 \end{bmatrix}$. |

15. The BS of claim 9, wherein, when the number of layers=4, a precoder for UL transmission using four antenna ports by the UE is determined based on a TPMI index in the indication of the TPMI and the number of layers according to:

| TPMI index | Number of layers v = 4 (ordered from left to right in increasing order of TPMI index) |
|---|---|
| 3-4 | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ $\frac{1}{4}\begin{bmatrix} 1 & 1 & 1 & 1 \\ 1 & -1 & 1 & -1 \\ j & j & -j & -j \\ j & -j & -j & j \end{bmatrix}$ |
| 1-2 | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ |

-continued

| TPMI index | Number of layers v = 4 (ordered from left to right in increasing order of TPMI index) |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$. |

16. A method for operating a user equipment (UE), the method comprising:
transmitting, to a base station (BS), a message reporting a coherence capability of the UE for an indication of a transmit precoding matrix indicator (TPMI) and a number of layers;
receiving, from the BS, ULCodebookSubset and ULmaxRank via higher-layer, radio-resource-control (RRC) signaling, where ULCodebookSubset indicates a codebook for a coherence state and is based on the coherence capability reported by the UE and where ULmaxRank indicates a maximum value for the number of layers;

receiving, from the BS, the indication of the TPMI and the number of layers via downlink control information (DCI) signaling; and transmitting, to the BS, uplink (UL) data via a physical uplink shared channel (PUSCH) based on the received indication of the TPMI and the number of layers, wherein a number of bits in the DCI signaling for the indication of the TPMI and the number of layers is based on the codebook and the maximum value for the number of layers.

17. The method of claim 16, further comprising:

determining the coherence state and the maximum value for the number of layers.

18. The method of claim 16, wherein:

the coherence state is one of three coherence states where each coherence state corresponds to a subset of an UL codebook for the indication of the TPMI and the number of layers;

the coherence state is configured for the UE by the BS based on and not to exceed the coherence capability reported by the UE;

the coherence capability reported by the UE is one of full, partial, or non-coherence;

for a first of the three coherence states, the subset of the UL codebook includes full, partial, and non-coherent precoders;

for a second of the three coherence states, the subset of the UL codebook includes only the partial and non-coherent precoders; and for a third of the three coherence states, the subset of the UL codebook includes only the non-coherent precoders.

19. The method of claim 16, wherein for four antenna ports at the UE, an UL codebook for the indication of the TPMI includes port selection precoders $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \text{and } \frac{1}{2}\begin{bmatrix}0\\0\\0\\1\end{bmatrix}.$$

* * * * *